United States Patent [19]
Sasaki et al.

[11] Patent Number: 5,392,159
[45] Date of Patent: Feb. 21, 1995

[54] ZOOM LENS DEVICE OF TWO-LENS GROUP STRUCTURE AND DRIVING DEVICE OF VARIFOCAL LENS OF TWO-LENS GROUP STRUCTURE

[75] Inventors: Saburo Sasaki, Tokyo; Ikuya Tsurukawa, Yokohama; Hiroshi Terui, Tokyo; Takashi Hongo, Kawasaki, all of Japan

[73] Assignee: Ricoh Company, Ltd., Tokyo, Japan

[21] Appl. No.: 855,512

[22] Filed: Mar. 20, 1992

Related U.S. Application Data

[63] Continuation-in-part of Ser. No. 817,369, Jan. 6, 1992, Pat. No. 5,267,085.

Foreign Application Priority Data

Jan. 18, 1991 [JP] Japan .................................. 3-004539
Jun. 8, 1991 [JP] Japan .................................. 3-163559

[51] Int. Cl.$^6$ .............................................. G02B 15/14
[52] U.S. Cl. ............................... 359/691; 359/694; 359/696; 359/823; 354/400
[58] Field of Search ........................... 359/691–694, 359/696–698, 823; 354/400, 402, 404, 409, 195.12; 358/225, 227

[56] References Cited

U.S. PATENT DOCUMENTS 4,950,061 8/1990 Tsurukawa et al. ............... 359/696
5,005,956 4/1991 Kaneda et al. ..................... 359/698

Primary Examiner—Loha Ben
Assistant Examiner—James Phan
Attorney, Agent, or Firm—Oblon, Spivak, McClelland, Maier, & Neustadt

[57] ABSTRACT

In a zoom lens device of a two-lens group structure, positive and negative lens groups are sequentially arranged from a photographing field side. The zoom lens device has a controller for controlling a rear focusing operation for moving the negative lens group on a high magnification side. The controller also controls one of an entire drawing-out focusing operation for moving the positive and negative lens groups, and a front focusing operation for moving the positive lens group on a low magnification side. The high and low magnification sides are respectively set to telescopic and wide angle sides. A focal length of the zoom lens device is increased on the high magnification side and is decreased on the low magnification side. Thus, a zoom ratio is increased and a lens drawing-out amount is reduced on the telescopic side so that the zoom lens device can be made compact. A driving device of a varifocal lens having a two-lens group structure has a base frame and a rear group holding frame for respectively holding front and rear lens groups and moved in accordance with zooming and focusing control states of the varifocal lens.

4 Claims, 16 Drawing Sheets

ZOOM LENS DEVICE OF TWO-LENS GROUP STRUCTURE AND DRIVING DEVICE OF VARIFOCAL LENS OF TWO-LENS GROUP STRUCTURE

CROSS-REFERENCE TO RELATED APPLICATION

The present application is a continuation-in-part of application Ser. No. 817,369, filed on Jan. 6, 1992, U.S. Pat. No. 5,267,085.

BACKGROUND OF THE INVENTION

1. Field of the Invention

The present invention relates to a zoom lens device of a two-lens group structure used in a still camera, a video camera, etc.

The present invention also relates to an improvement of a driving device of a varifocal lens having a two-lens group structure in which a focal length of the varifocal lens can be changed by displacing each of front and rear lens groups constituting a zooming optical system along a photographing optical axis.

2. Description of the Related Art

In a general known zoom lens device of a two-lens group structure, the construction of a zooming optical system is simplified and the zooming optical system is made compact.

A zoom lens of a two-lens group structure has various kinds of constructions. There is a zoom lens of a two-lens group structure in which positive and negative lens groups are sequentially arranged from the side of a photographing field. Such a zoom lens can be generally classified into the following three focusing systems in accordance with a difference in focusing operation.

A first focusing system is a front focusing system. In this front focusing system, a positive lens group is moved to control a focusing operation while a negative lens group is stopped in a position in which the negative lens group is located at a zooming time.

A second focusing system is a rear focusing system. In this rear focusing system, the negative lens group is moved to control a focusing operation while the positive lens group is stopped in a position in which the positive lens group is located at the zooming time.

A third focusing system is an entire drawing-out focusing system. In this entire drawing-out focusing system, the positive and negative lens groups are moved to control a focusing operation.

It is important to make a camera compact and increase a zoom ratio so as to improve the portability of a camera and enlarge a photographing condition. It is concretely considered that the camera is made compact and the zoom ratio is increased by reducing a length from a film face within the camera to a front end of a photographing lens.

In the front focusing system and the entire drawing-out focusing system, the positive lens group is further drawn out at the zooming and telescopic times in the ease of a most proximate photographing operation. Accordingly, a length from a film face to the front end of the photographing lens including the length at the focusing time is increased.

In contrast to this, in the rear focusing system, no positive lens group is drawn out. When a distance between a film face and the negative lens group including the distance at the focusing time is equal to zero, the length from the front end of the photographing lens to the film face is set as a minimum limit.

In the front focusing system and the entire drawing-out focusing system, a drawing-out amount of the positive lens group on a telescopic side is reduced when the lengths from the front end of the photographing lens to the film face in the above three focusing systems are equal to each other. Thus, distances between the positive and negative lens groups are increased in the front focusing system and the entire drawing-out focusing system. Accordingly, it is impossible to set a focal length longer than that provided in the rear focusing system.

For example, when the camera is concretely designed without considering a macro photograph, a zoom lens capable of performing a zooming operation in the region of a focal length from 38 to 80 mm fulfills an additional function in which the macro photographing operation can be performed in an entire zooming region. In this case, the size of a zooming region on a wide angle side is reduced to secure a moving amount of the negative lens group on a side of the film face so that only a zooming region of the focal length from 40 to 80 mm is set.

As mentioned above, in the rear focusing system, the zooming region on the wide angle side at a normal photographing time is reduced in size to perform the macro photographing operation of low frequency in use. When the lengths from the front end of the photographing lens to the film face in the above three focusing systems are equal to each other, it is impossible to set a shorter focal length on the wide angle side in comparison with the front focusing system and the entire drawing-out focusing system.

A varifocal lens of a two-lens group structure using the front focusing system and having a lens group moving mechanism with a base frame has the following problems when the varifocal lens is actually manufactured as goods.

In a first problem, the structure of a head portion of the varifocal lens is large-sized since a focusing mechanism portion is disposed in the head portion of the varifocal lens in the front focusing system. Therefore, such a structure of the head portion constitutes a great drawback in structure when the varifocal lens is made compact.

In a second problem, when the focusing mechanism portion is disposed in the head portion of the varifocal lens, it is necessary to protect this focusing mechanism portion from external force applied from the exterior of the focusing mechanism portion. Therefore, the entire length of a lens body tube is increased in the direction of an optical axis so that it is difficult to make the varifocal lens compact.

In a third problem, the varifocal lens is large-sized in the direction of the optical axis in accordance with the moving amounts of front and rear lens groups in the front focusing system.

The third problem is also caused in a simultaneous lens moving system as the entire drawing-out focusing system. In addition to the third problem, the moving amounts of the lens groups are increased and continuously changed at a focusing time in accordance with a realized focal length. Accordingly, it is difficult to make the varifocal lens compact by using the simultaneous lens moving system.

In the general varifocal lens, a zooming region at a normal photographing time is sacrificed for a macroscopic photographing operation having a low frequency in use, or an increase in proximate range for enabling a photographing operation on a wide angle side. Further, it is impossible to increase a zoom ratio of the varifocal lens as much as possible. Accordingly, in accordance with a general idea of the varifocal lens, it is theoretically impossible to increase a field angle at the normal photographing time while a proximate or macroscopic photograph on the wide angle side can be taken.

It is further desirable to set most proximate photographing positions in both photographing modes to positions nearer than most proximate photographing positions provided in the general average varifocal lens.

A mechanical feeding means such as feeding mechanisms of a lead screw system and a gear system has a clearance in engagement between a driving lead screw and a lead nut screwed onto the driving lead screw. Further, there is usually a backlash between driving and driven gears. To realize a high accuracy in operation by using these feeding mechanisms, it is necessary to remove the above engagement clearance and the backlash as much as possible by precisely processing and assembling parts of the feeding mechanisms. In the following description, the engagement clearance and the backlash are generally called a mechanical feeding play.

If the base frame and a frame for holding the rear lens group are moved in a state in which this mechanical feeding play is caused, an error in stopping position is caused in accordance with this feeding play when these two frames are stopped in respective target positions set at an optical designing stage. Accordingly, no positions of the frames can be exactly set and there is a possibility that no predetermined optical performance can be obtained.

However, many operations are required to process and assemble parts of the mechanical feeding means such that the mechanical feeding play can be removed, thereby greatly increasing cost of the varifocal lens.

SUMMARY OF THE INVENTION

It is therefore a first object of the present invention to provide a zoom lens device of a two-lens group structure in which the zoom lens device is made compact and a zoom ratio is increased.

A second object of the present invention is to provide a driving device of a varifocal lens of a two-lens group structure in which a most proximate photographing distance can be set to be shorter than that in the general average varifocal lens while the width of a zooming region is increased on a wide angle side.

A third object of the present invention is to provide a driving device of a varifocal lens of a two-lens group structure in which the size of a body tube of the varifocal lens in the direction of an optical axis can be reduced as much as possible when the body tube is stored.

A fourth object of the present invention is to provide a driving device of a varifocal lens of a two-lens group structure in which the feeding play of a driving transmission system can be removed by improving an accuracy in stopping position of each of a base frame and a rear group holding frame with respect to a target position.

The above first object of the present invention can be achieved by a zoom lens device of a two-lens group structure in which positive and negative lens groups are sequentially arranged from a photographing field side, the zoom lens device comprising control means for controlling a rear focusing operation for moving the negative lens group on a high magnification side; the control means controlling one of an entire drawing-out focusing operation for moving the positive and negative lens groups, and a front focusing operation for moving the positive lens group on a low magnification side. The focusing controls are switched when a lens moving amount in the rear focusing operation is larger than that in the entire drawing-out focusing operation.

In the above structure, zooming and focusing operations are performed by a rear focusing system on a telescopic side. The zooming and focusing operations are performed by a front focusing system or an entire drawing-out focusing system on a wide angle side. Accordingly, a focal length of the zoom lens device can be increased on the telescopic side and can be decreased on the wide angle side. Therefore, a zoom ratio of the zoom lens device can be increased as a whole. Further, a lens drawing-out amount is reduced on the telescopic side so that the zoom lens device can be made compact.

The focusing control systems are switched when the lens moving amount in the rear focusing system is larger than that in the entire drawing-out focusing system. Accordingly, it is possible to reduce a time for performing the focusing operation.

In accordance with a second structure of the present invention, the above second object can be achieved by a driving device of a varifocal lens having a two-lens group structure for changing a focal length of the varifocal lens by displacing each of a front lens group and a rear lens group constituting a zooming optical system along a photographing optical axis, the driving device comprising a base frame for fixedly holding the front lens group in a front portion thereof; the base frame being movable forward and backward along the photographing optical axis with respect to a body tube section; and a rear group holding frame for holding the rear lens group and arranged in a rear portion of the base frame such that the rear group holding frame can be moved forward and backward along the photographing optical axis with respect to the base frame; the driving device being constructed such that the base frame can be moved in accordance with a moving line at a zooming time of the front lens group, and the rear group holding frame can be moved in accordance with a moving line at a zooming time of the rear lens group in an entire zooming region when the varifocal lens is in a zooming control state; the driving device being constructed such that, when the varifocal lens is in a focusing control state, the base frame can be moved toward a photographing field from a standby position by an amount required to perform a focusing operation at this time in a state in which a relative axial distance between the front and rear lens groups is constantly held in plural zooming steps set on the side of a short focal length in a portion of the entire zooming region; and the driving device being constructed such that only the rear group holding frame can be moved from a standby position toward a film face by an amount required to perform the focusing operation in a state in which the base frame is stopped in a position provided at a completing time of a zooming operation in the other plural zooming steps set in the remaining portion of the entire zooming region.

The above third object can be achieved by a third structure of the present invention. In this third structure, when an operating state of the varifocal lens is switched from a using state to an unusing state, the length of a body tube in the varifocal lens can be shortened by moving the base frame onto a side of the film face together with the rear group holding frame after the rear group holding frame is moved to a position near a side of the photographing field within the base frame.

The above fourth object can be achieved by a fourth structure of the present invention. In this fourth structure, in the plural zooming steps on the side of the short focal length after an arbitrary photographing frame is photographed, the base frame is moved to a standby position near a film face side close to the zooming steps on the side of the short focal length at a previous photographing time, and the rear group holding frame can be moved to an infinite distance position in the zooming steps on the side of the short focal length at the previous photographing time when the next photographing frame is photographed.

The above fifth object can be achieved by a fifth structure of the present invention. In this fifth structure, in the remaining plural zooming steps after an arbitrary photographing frame is photographed, the base frame is stopped in an infinite distance position in the remaining zooming steps at a previous photographing time, and only the rear group holding frame can be moved to a standby position near a photographing field side close to the remaining zooming steps at the previous photographing time when the next photographing frame is photographed.

In the driving device of the varifocal lens having a two-lens group structure in accordance with each of the second to fifth structures of the present invention, a zooming system of a photographing optical system is set as a step zooming system for realizing a focal length of the varifocal lens at plural stages. The entire zooming region is divided into a partial zooming region on a wide angle side and the remaining zooming region. In the partial zooming region, a focusing operation is con,-rolled by a simultaneous lens moving system. In the remaining zooming region, the focusing operation is controlled by a so-called rear focusing system.

Thus, when the focal length of the varifocal lens is increased at a wide angle end thereof, a required moving amount of a photographing optical system toward a film face can be set to be large as much as possible. In the remaining zooming region, no base frame for holding the front lens group is excessively projected at a focusing time. Accordingly, it is possible to make the varifocal lens compact when the varifocal lens is used.

In a lens group moving mechanism, the front lens group is directly fixed to the base frame. The rear group holding frame can be relatively moved within the base frame. Further, a storing position of the rear group holding frame is set to a position near a photographing field side within the base frame. When the length of a body tube is shortened, the rear group holding frame is moved from an optically designed position to the storing position near the photographing field. Then, the base frame is moved onto a film face side together with the rear group holding frame.

Thus, the projecting amount of a rear portion of the rear group holding frame toward the film face from a rear end portion of the base frame can be reduced as much as possible when the length of the body tube is shortened. Accordingly, the base frame can be also moved onto a storing side. Therefore, the varifocal lens can be made compact when no varifocal lens is used.

When the varifocal lens is in a focusing control state, a relative axial distance between the front and rear lens groups is constantly held in plural zooming steps on the side of a short focal length set in a portion of the entire zooming region on the short focal length side. In this state, the base frame can be moved from a standby position toward the photographing field by an amount required to perform a focusing operation at this time.

In the remaining plural zooming steps set in the remaining portion of the entire zooming region, only the rear group holding frame is moved from a standby position toward the film face by an amount required to perform the focusing operation in a state in which the base frame is stopped in a position provided at a completing time of a zooming operation.

Thus, it is possible to improve an accuracy in stopping position of each of the base frame and the rear group holding frame with respect to a target position so that a mechanical feeding play can be removed.

Further objects and advantages of the present invention will be apparent from the following description of the preferred embodiments of the present invention as illustrated in the accompanying drawings.

DESCRIPTION OF THE PREFERRED EMBODIMENTS

The preferred embodiments of a zoom lens device of a two-lens group structure and a driving device of a varifocal lens having a two-lens group structure in the present invention will next be described in detail with reference to the accompanying drawings.

A zoom lens of a two-lens group structure has various kinds of constructions. There is a zoom lens of a two-lens group structure in which positive and negative lens groups are sequentially arranged from the side of a photographing field. Such a zoom lens can be generally classified into the following three focusing systems in accordance with a difference in focusing operation.

A first focusing system is a front focusing system which is called a front system in the following description. In this front focusing system, a positive lens group is moved to control a focusing operation while a negative lens group is stopped in a position in which the negative lens group is located at a zooming time.

Figure 1:
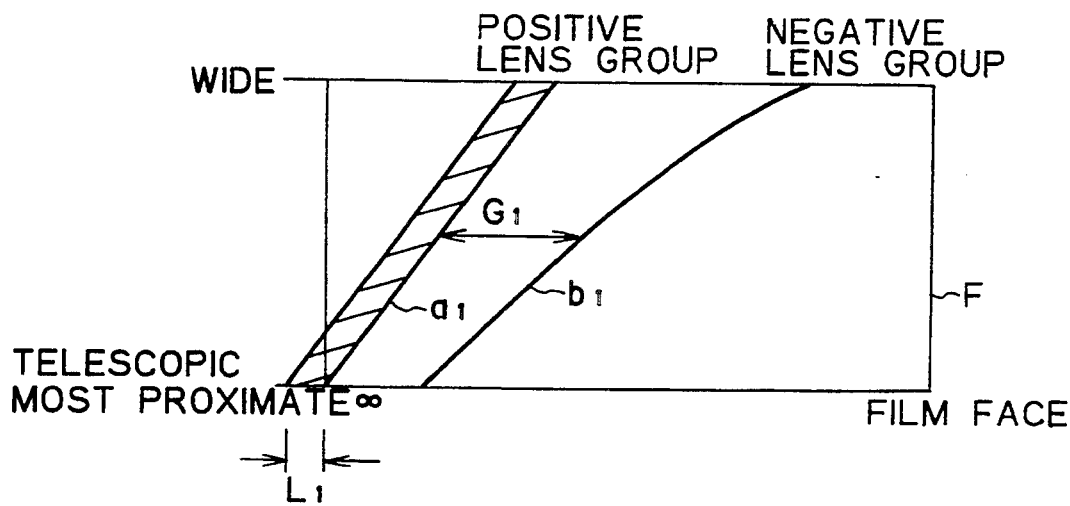
FIG. 1 is a diagram showing moving lines of lens groups in a front focusing system.

In this front focusing system, the positive lens group is moved at the zooming time in accordance with a moving curve $a_1$ shown in FIG. 1 and provided at the time of an infinite distance ($\infty$). Simultaneously, the negative lens group is moved in accordance with a moving curve $b_1$. Thus, a focal length of the zoom lens is set to an arbitrary focal length from a low magnification side to a high magnification side. The low and high magnification sides are respectively equal to wide angle and telescopic sides. At a focusing time, while the negative lens group is stopped in a zooming position, only the positive lens group is moved between a position at the time of the infinite distance and a position at the time of a most proximate distance. Namely, the positive lens group is moved in a range of the moving curve $a_1$ shown by hatching in FIG. 1, thereby performing a focusing operation.

A second focusing system is a rear focusing system which is called a rear system in the following description. In this rear focusing system, the negative lens group is moved to control a focusing operation while the positive lens group is stopped in a position in which the positive lens group is located at the zooming time.

Figure 2:
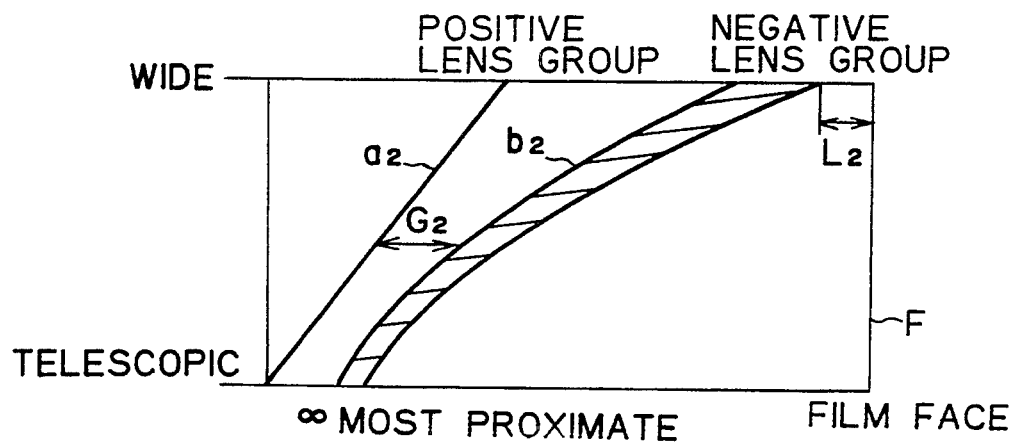
FIG. 2 is a diagram showing moving lines of lens groups in a rear focusing system.

In this rear focusing system, as shown in FIG. 2, the positive lens group is moved at the zooming time in accordance with a moving curve $a_2$ and the negative lens group is moved at the zooming time in accordance with a moving curve $b_2$. Thus, the focal length of the zoom lens is set to an arbitrary focal length. At a focusing time, only the negative lens group is moved between a position at the time of an infinite distance and a position at the time of a most proximate distance. Namely, the negative lens group is moved in a range of the moving curve $b_2$ shown by hatching in FIG. 2, thereby performing a focusing operation.

A third focusing system is an entire drawing-out focusing system which is called an entire drawing-out system in the following description. In this entire drawing-out focusing system, the positive and negative lens groups are moved to control a focusing operation.

Figure 3:
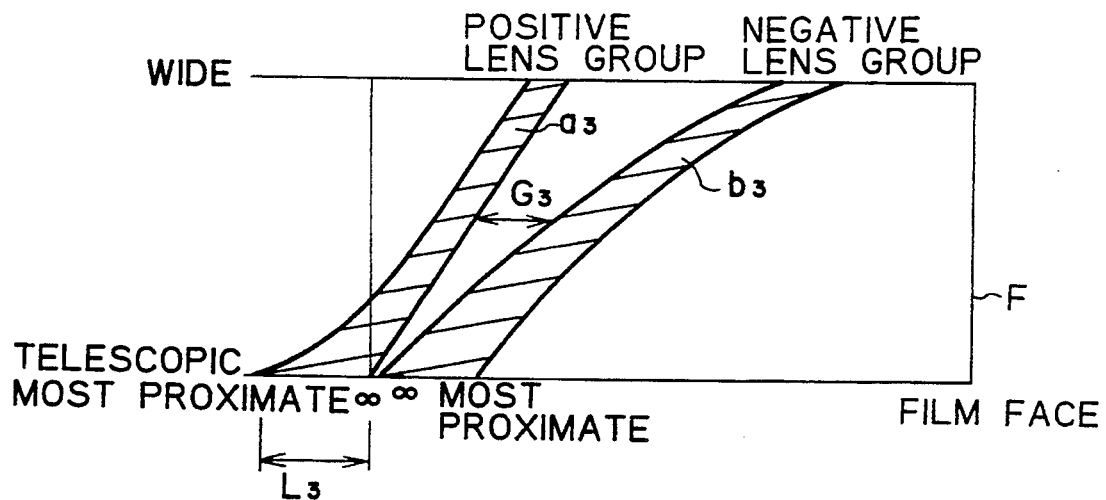
FIG. 3 is a diagram showing moving lines of lens groups in an entire drawing-out focusing system.

In this entire drawing-out focusing system, as shown in FIG. 3, the positive lens group is moved at the zooming time in accordance with a moving curve $a_3$ and the negative lens group is moved at the zooming time in accordance with a moving curve $b_3$. Thus, the focal length of the zoom lens is set to an arbitrary focal length. At a focusing time, each of the positive and negative lens groups is moved between a position at the time of an infinite distance and a position at the time of a most proximate distance. Namely, the positive and negative lens groups are respectively moved in ranges of the moving curves $a_3$ and $b_3$ shown by hatching in FIG. 3, thereby performing a focusing operation.

It is important to make a camera compact and increase a zoom ratio so as to improve portability of the camera and enlarge a photographing condition. It is concretely considered that the camera is made compact and the zoom ratio is increased by reducing a length from a film face within the camera to a front end of a photographing lens.

In the front focusing system and the entire drawing-out focusing system, the positive lens group is further drawn out as shown by reference numerals $L_1$ and $L_3$ in FIGS. 1 and 3 at the zooming and telescopic times in the case of a most proximate photographing operation. Accordingly, a length from a film face F to the front end of the photographing lens including the length at the focusing time is increased.

In contrast to this, in the rear focusing system, no positive lens group is drawn out. As shown in FIG. 2, when a distance $L_2$ between a film face F and the negative lens group including the distance at the focusing time is equal to zero, the length from the front end of the photographing lens to the film face F is set as a minimum limit.

In the front focusing system and the entire drawing-out focusing system, a drawing-out amount of the positive lens group on a telescopic side is reduced when the lengths from the front end of the photographing lens to the film face F in the above three focusing systems are equal to each other. Thus, distances $G_1$ and $G_3$ between the positive and negative lens groups are increased in the front focusing system and the entire drawing-out focusing system. Accordingly, it is impossible to set a focal length longer than that provided in the rear focusing system.

In contrast to this, in the rear focusing system, the camera can be set at a wider angle as the negative lens group approaches the film face. Namely, the camera can be set at a wider angle as the distance $L_2$ is reduced. In this case, when the camera has a macro function, a focusing amount of the camera at the most proximate distance is changed in accordance with the importance of a macro or normal photograph. For example, when the focusing amount at the time of a macro photographing operation is set to be large, a most proximate photographing position in a normal photographing operation must be set to a position far from the film face F so that the distance $L_2$ must be increased.

For example, when the camera is concretely designed without considering the macro photograph, a zoom lens capable of performing a zooming operation in the region of a focal length from 38 to 80 mm fulfills an additional function in which the macro photographing operation can be performed in an entire zooming region. In this case, the size of a zooming region on a wide angle side is reduced to secure a moving amount of the negative lens group on a side of the film face F so that only a zooming region of the focal length from 40 to 80 mm is set.

As mentioned above, in the rear focusing system, the zooming region on the wide angle side at the normal photographing time is reduced in size to perform the macro photographing operation of low frequency in use. When the lengths from the front end of the photographing lens to the film face F in the above three focusing systems are equal to each other, it is impossible to set a shorter focal length on the wide angle side in comparison with the front focusing system and the entire drawing-out focusing system.

A varifocal lens of a two-lens group structure is of a varifocal type which is considered to make an optical system compact. This varifocal type is known as a preferable type when the varifocal lens is made compact.

Similar to the above zoom lens, the varifocal lens of such a two-lens group structure is constructed by lens groups having positive and negative refracting powers and sequentially arranged from the side of a photographing field. In the following description, this varifocal lens of a two-lens group structure is called a varifocal lens of a two-lens group structure having positive and negative lens arrangements.

Figure 9:
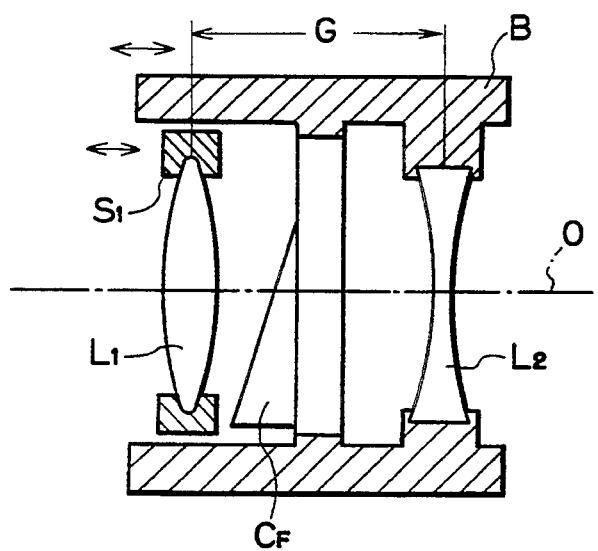
FIG. 9 is a typical view for explaining the construction of a general lens group moving mechanism having a base frame.

FIG. 9 shows the varifocal lens of a two-lens group structure having the positive and negative lens arrangements. In FIG. 9, a front lens group $L_1$ as a positive lens group and a rear lens group $L_2$ as a negative lens group are moved along respective moving curves at the time of an infinite distance to change a focal length of the varifocal lens, thereby performing a zooming operation. In this varifocal lens, it is sufficient to use only two moving curves for prescribing the movements of the lens groups at a zooming time. Further, a lens structure on the side of a long focal length, i.e., on the side of a telescopic field angle can be made compact.

Therefore, the varifocal lens of this type is constructed in accordance with the above-mentioned idea of making a zooming optical system compact.

Similar to the above zoom lens, the varifocal lens of a two-lens group structure is generally classified into the following three focusing systems.

Figure 5:
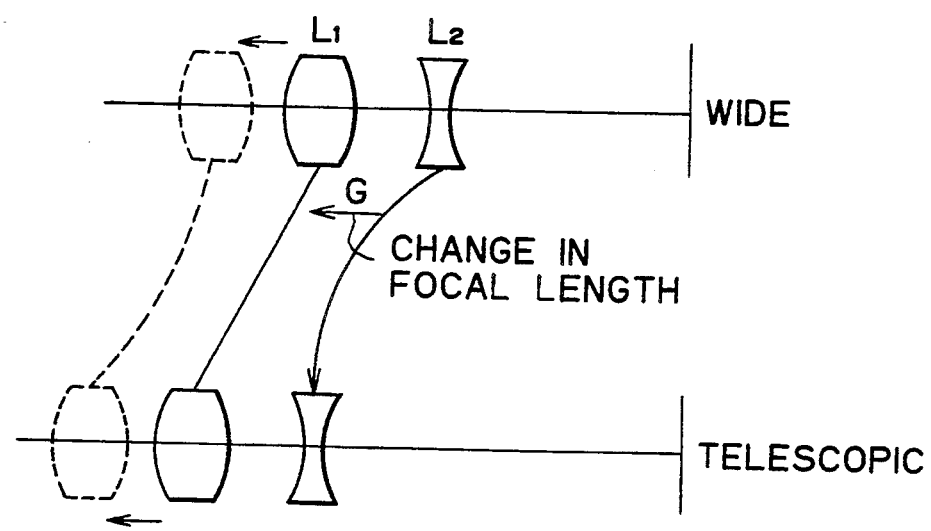
FIG. 5 is a typical constructional view for explaining a focusing operation of the front focusing system.

In a front focusing system, as shown in FIG. 5, a focusing operation is performed by moving only the front lens group $L_1$ from a lens position at the time of an infinite distance to a photographing field in a forward direction.

Figure 6:
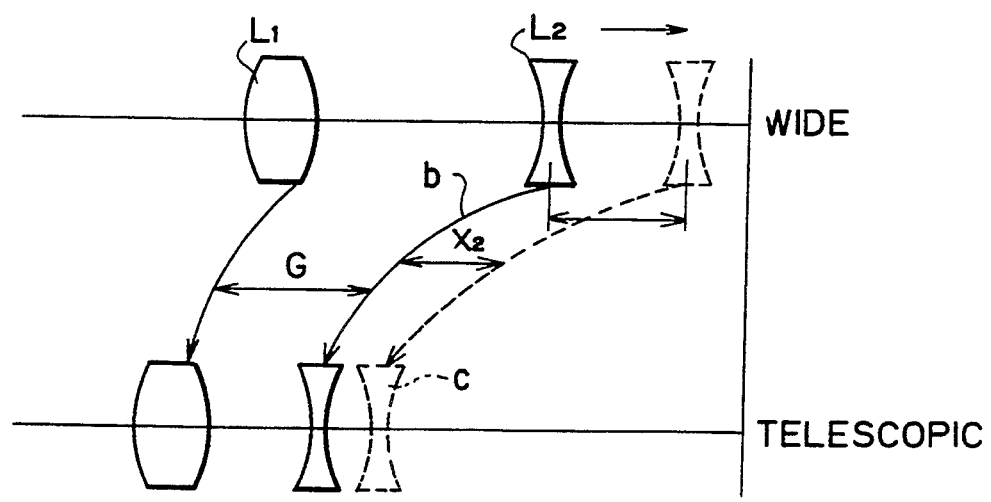
FIG. 6 is a typical constructional view for explaining a focusing operation of the rear focusing system.

In a rear focusing system, as shown in FIG. 6, a focusing operation is performed by moving only the rear lens group $L_2$ from a lens position at the time of the infinite distance to a film face in a backward direction.

Figure 7:
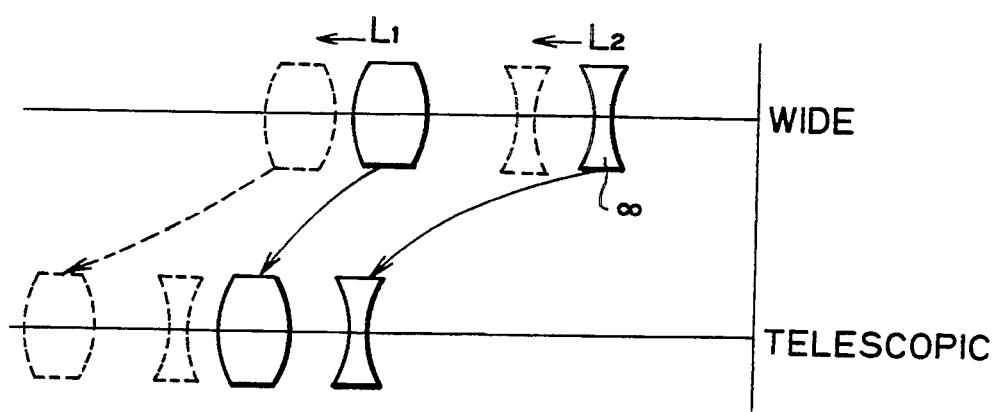
FIG. 7 is a typical constructional view for explaining a focusing operation of a simultaneous lens moving system as the entire drawing-out focusing system.
Figure 8:
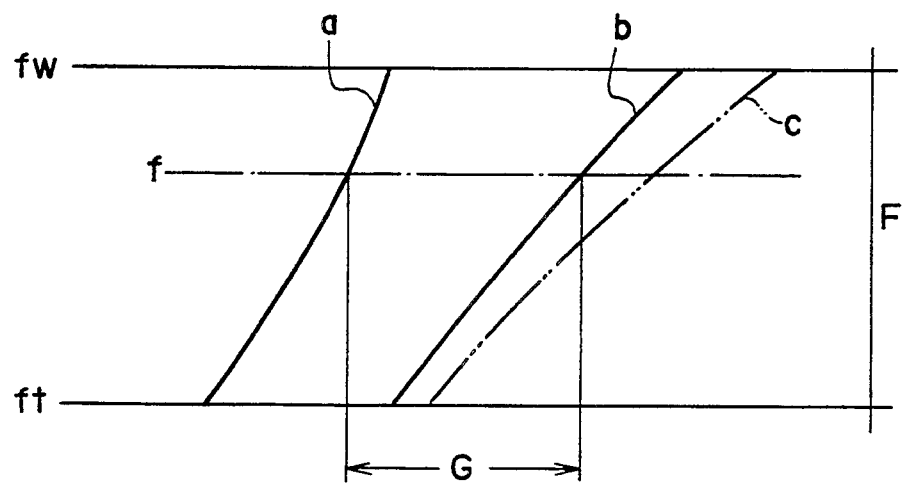
FIG. 8 is a view for explaining a detailed movement of the rear lens group in the focusing operation of the rear focusing system.

In an entire drawing-out focusing system as a simultaneous lens moving system, as shown in FIG. 7, a focusing operation is performed by simultaneously moving the front lens group $L_1$ and the rear lens group $L_2$ toward the photographing field.

These three focusing systems will next be compared with each other in view of simplicity in mechanical structure required to perform the focusing operation and easiness in focusing operation and control.

In the case of the front focusing system, it is sufficient to move only the front lens group by an equal drawing-out amount in the focusing operation irrespective of a focal length at the same distance of a photographed object. Accordingly, the focusing operation can be performed by a simple control relation. Therefore, the front focusing system is considered to be generally advantageous in comparison with the other focusing systems.

Namely, in this front focusing system, the two lens groups $L_1$ and $L_2$ are simultaneously moved to set a distance G between the lens groups for realizing a desirable focal length. In the focusing operation, as mentioned above, only the front lens group $L_1$ is moved toward the photographing field from this distance setting state. At this time, a moving amount $x_1$ of the front lens group $L_1$ is calculated from the following simple relation.

$$x_1 = f(D)$$

In this relation, reference numeral D designates a distance from the varifocal lens to a photographed object at a photographing time. Namely, no moving amount $x_1$ of the front lens group $L_1$ is changed irrespective of a focal length f in the focusing operation. Accordingly, the structure of a control system of the varifocal lens is simplified and this simplification is very advantageous.

In the rear focusing system, a distance G between the lens groups for realizing a desirable focal length is provided at a zooming time by performing a zooming operation similar to that in the front focusing system. As shown in FIG. 6, in the focusing operation, only the rear lens group $L_2$ in this distance state is moved from a lens position shown by a moving line b at the time of an infinite distance to a lens position shown by a moving line c at the time of a most proximate distance.

In this rear focusing system, each of the two lens groups $L_1$ and $L_2$ is naturally moved as a movable lens group in the varifocal lens. Further, it is possible to omit a cam $C_F$ for focusing used in the front focusing system as shown in FIG. 9 so that it is effective to make the varifocal lens compact.

In the simultaneous lens moving system or the entire drawing-out focusing system, a zooming operation is similar to that in each of the above front and real focusing systems. In the focusing operation, the two lens groups $L_1$ and $L_2$ are integrally moved toward the photographing field while a distance G between the lens groups for realizing a desirable focal length is held.

In this drawing-out focusing system, the moving amount of a lens group is large at a focusing time in comparison with the other two focusing systems. Further, this moving amount at the focusing time is continuously changed in accordance with a realized value of the focal length. However, in this drawing-out focusing system, the two lens groups $L_1$ and $L_2$ are moved in a direction in which these lens groups are separated from a film face F in an integral state. Accordingly, the structure of a mechanism for moving the lens groups at the focusing time is simplified and a control operation of this moving mechanism is easy in comparison with the front and rear focusing systems. Further, it is possible to arrange the rear lens group $L_2$ such that this rear lens group is very close to the film face F.

The mechanism for moving the lens groups in the varifocal lens of a two-lens group structure is improved as follows.

In a general lens group moving mechanism, the front lens group $L_1$ and the rear lens group $L_2$ are moved by different moving amounts by using two sets of cam mechanisms having different rotating amounts in the zooming operation. In the focusing operation, lens groups for focusing are moved by a lens group moving mechanism separated from these cam mechanisms. However, a lens group moving mechanism of a new type has recently been developed.

For example, this lens group moving mechanism is shown in Japanese Patent Application Laying Open (KOKAI) No. 63-220208 and is designed as a lens group moving mechanism for the varifocal lens of a two-lens group structure using the front focusing system.

In the lens group moving mechanism of a new type, as shown in FIG. 9, a base frame B is disposed inside a body tube section as a fixed body tube and can be moved forward and backward along a photographing optical axis O. A rear lens group $L_2$ is fixedly attached to a rear inside portion of this base frame B.

A front lens group $L_1$ is fitted into a front inside portion of the base frame B in a state in which the front lens group $L_1$ can be moved along the photographing optical axis O with respect to the rear lens group $L_2$.

At a zooming time, the base frame B is moved to set a position of the rear lens group $L_2$ on the optical axis O. Further, the front lens group $L_1$ is moved within the base frame B in a predetermined direction. Thus, a distance G between the lens groups $L_1$ and $L_2$ required to realize a predetermined focal length f of the varifocal lens is obtained.

At a focusing time, only the front lens group $L_1$ is moved toward the photographing field by a moving amount required to perform the focusing operation in a state in which each of the base frame B and the rear lens group $L_2$ is stopped in a position provided at a completing time of the zooming operation.

Figure 4:
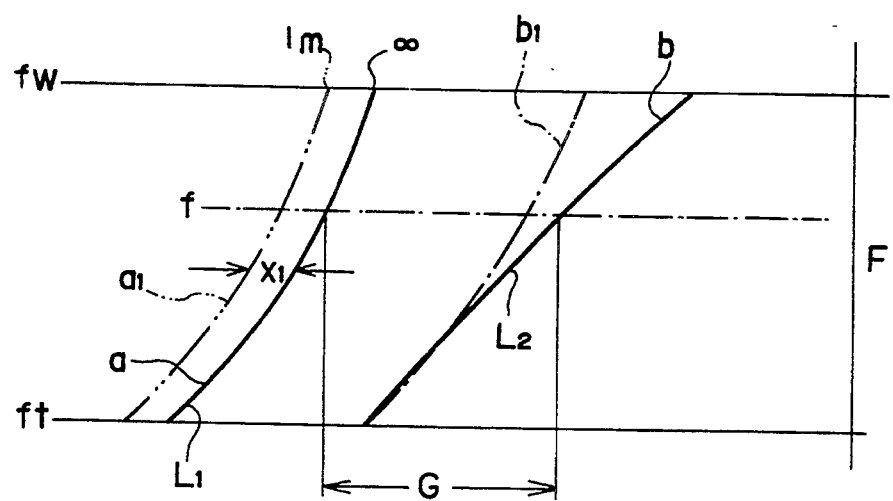
FIG. 4 is a view for explaining moving curves of a front lens group $L_1$ and a rear lens group $L_2$ in a varifocal lens of a two-lens group structure having positive and negative lens arrangements.

In this case, when no measures for stopping the movement of the rear lens group are taken, the rear lens group $L_2$ is moved together with the front lens group $L_1$ when the front lens group $L_1$ is moved from a lens position shown by a moving line a in FIG. 4 to a lens position shown by a moving line $a_1$ in the focusing operation. Therefore, this lens group moving mechanism has a cam $C_F$ for focusing on the base frame B to independently move only the front lens group $L_1$ by a predetermined moving amount when the focusing operation is performed.

The structure of this lens group moving mechanism having the base frame is very simplified in comparison with that of the general lens group moving mechanism mentioned above. Further, it is possible to use a lead screw system in a driving mechanism of the lens groups, thereby providing a great advantage. Therefore, it is very advantageous to make the varifocal lens of a two-lens group structure compact if the front focusing system having the above-mentioned features is used as a focusing system and the lens group moving mechanism having the base frame is used as a mechanism for moving the lens groups.

However, the varifocal lens of a two-lens group structure using the front focusing system and having the lens group moving mechanism with the base frame having such advantages has the following problems when this varifocal lens is actually manufactured as goods.

In a first problem, the structure of a head portion of the varifocal lens is large-sized since a focusing mechanism portion is disposed in the head portion of the varifocal lens in the front focusing system. Therefore, such a structure of the head portion constitutes a great drawback in structure when the varifocal lens is made compact.

In a second problem, when the focusing mechanism portion is disposed in the head portion of the varifocal lens, it is necessary to protect this focusing mechanism portion from external force applied from the exterior of the focusing mechanism portion. Therefore, the entire length of a lens body tube is increased in the direction of an optical axis so that it is difficult to make the varifocal lens compact.

As mentioned above, the focusing mechanism portion is disposed in the head portion of the varifocal lens in the front focusing system. If there is no cover member such as the lens body tube for covering the varifocal lens until this head portion, the focusing mechanism portion requiring an exact accuracy in operation is projected on a photographing field side in the focusing operation. Therefore, there is a possibility that an operator's hand comes in direct contact with this focusing mechanism portion from the exterior thereof.

Such a situation is not preferable in view of an accuracy in operation of the varifocal lens. Accordingly, when the varifocal lens is commercially manufactured and sold, the focusing mechanism portion is commonly surrounded by a protecting member such as the lens body tube such that no external force is applied to this focusing mechanism portion.

In this case, the protecting member for surrounding and protecting the focusing mechanism portion must be constructed such that no frame for holding the front lens group $L_1$ is projected from an end portion thereof even when the front lens group $L_1$ is projected at its maximum toward the photographing field.

However, in such a structure, the length of the lens body tube is increased in the direction of the optical axis so that it is difficult to make the varifocal lens compact.

The length of the lens body tube is increased as a focusing amount of the front lens group $L_1$ is increased. In particular, a great problem is caused when it is desirable to take a macroscopic photograph.

In a third problem, the varifocal lens is large-sized in the direction of the optical axis in accordance with moving amounts of the two lens groups in the front focusing system.

Namely, as shown in FIG. 4, in the varifocal lens of a two-lens group structure having positive and negative lens arrangements, the distance G between the front lens group $L_1$ and the rear lens group $L_2$ is widened at a wide angle end of the varifocal lens and is narrowed at a telescopic end of the varifocal lens. Further, in a zooming operation, the two lens groups $L_1$ and $L_2$ are drawn out as a whole toward the photographing field from the film face F. Accordingly, a moving amount of the rear lens group $L_2$ with respect to the film face F is greater than that of the front lens group $L_1$.

Therefore, the general lens group moving mechanism having a base frame and shown in Japanese Patent Application Laying Open (KOKAI) No. 63-220208 is used and a feeding mechanism of a lead screw system is also used to reciprocate the base frame B along the optical axis O. In this case, the length of a lead screw member for moving the base frame B is greatly increased. In particular, the length of a screw portion in this lead screw member is greatly increased. Drawbacks in cost and structure are caused by such problems when the varifocal lens is made compact in the direction of the optical axis.

Namely, to manufacture an extremely elongated lead screw member, it is necessary to form an precise lead screw in a wide range of a thin bar-shaped member. When such a lead screw member is manufactured, many operations are required when the lead screw member is processed and assembled, thereby increasing cost of the varifocal lens.

Further, such a thin elongated lead screw member must be supported in a state in which the base frame B can be moved precisely and smoothly. Therefore, the structure of the varifocal lens is complicated.

In particular, the structure of a body tube is excessively complicated by the latter problem so that it is difficult to make the lens structure compact.

The third problem is also caused in the simultaneous lens moving system. In addition to the third problem, as mentioned above, the moving amounts of the lens groups are increased and continuously changed at the focusing time in accordance with a realized focal length. Accordingly, it is difficult to make the varifocal lens compact by using the simultaneous lens moving system.

As mentioned above, there are various kinds of problems about compactness of the varifocal lens when the lens group moving mechanism having the base frame and using the front focusing system is used and the simultaneous lens moving system is used as a focusing system. Therefore, it is reconsidered to make the varifocal lens compact by using the rear focusing system.

In particular, when it is also necessary to consider a macroscopic photograph, it is advantageous to use the rear focusing system.

Namely, as mentioned above, the two lens groups $L_1$ and $L_2$ are naturally moved in the rear focusing system. Further, it is possible to omit the cam $C_F$ for focusing used in the front focusing system. If the rear focusing system can be combined with the lens group moving mechanism having the base frame, it is very preferable to make the varifocal lens compact.

Figure 10:
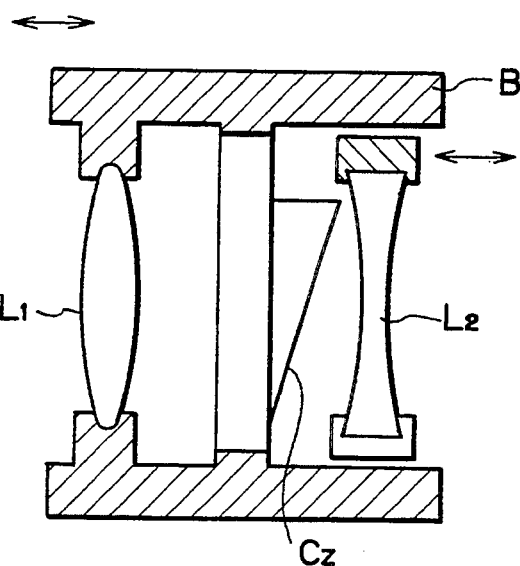
FIG. 10 is a typical constructional view for explaining the merits of a combination of the rear focusing system and the lens group moving mechanism having the base frame.

In accordance with this idea, for example, as shown in FIG. 10, the front lens group $L_1$ is fixedly attached into a front portion of the base frame B. The rear lens group $L_2$ is fitted into a rear portion of the base frame B such that the rear lens group $L_2$ can be moved with respect to the front lens group $L_1$.

In such a structure, a moving amount of the base frame B with respect to a body tube portion is partially provided by a moving amount of the front lens group $L_1$ smaller than that of the rear lens group $L_2$. Accordingly, it is possible to reduce the length of a screw portion of the lead screw member even when the feeding mechanism of a lead screw system is used to move the base frame B.

The proposal of a combination of the rear focusing system and the lens group moving mechanism having the base frame seems very advantageous when the structure of the varifocal lens is made compact. However, when this proposal is realized by using general design and processing techniques, the following problems are caused with respect to manufacture and quality control so that no varifocal lens can be finally made compact by using this proposal.

Namely, in the rear focusing system, a moving amount $x_2$ of the rear lens group $L_2$ in the focusing operation is different every focal length. Further, this moving amount $x_2$ is different in accordance with a photographing distance at a focusing time. Accordingly, the rear lens group $L_2$ is moved by varifocal control at the focusing time. It is not easy to provide a structure for realizing this varifocal control.

Namely, in the varifocal control, it is necessary to prepare a moving line of the rear lens group $L_2$ in the focusing operation every focal length. Therefore, much time and high approximate control are required to preferably adjust and control these many moving lines when the varifocal lens is manufactured, thereby causing a great problem.

Figure 11:
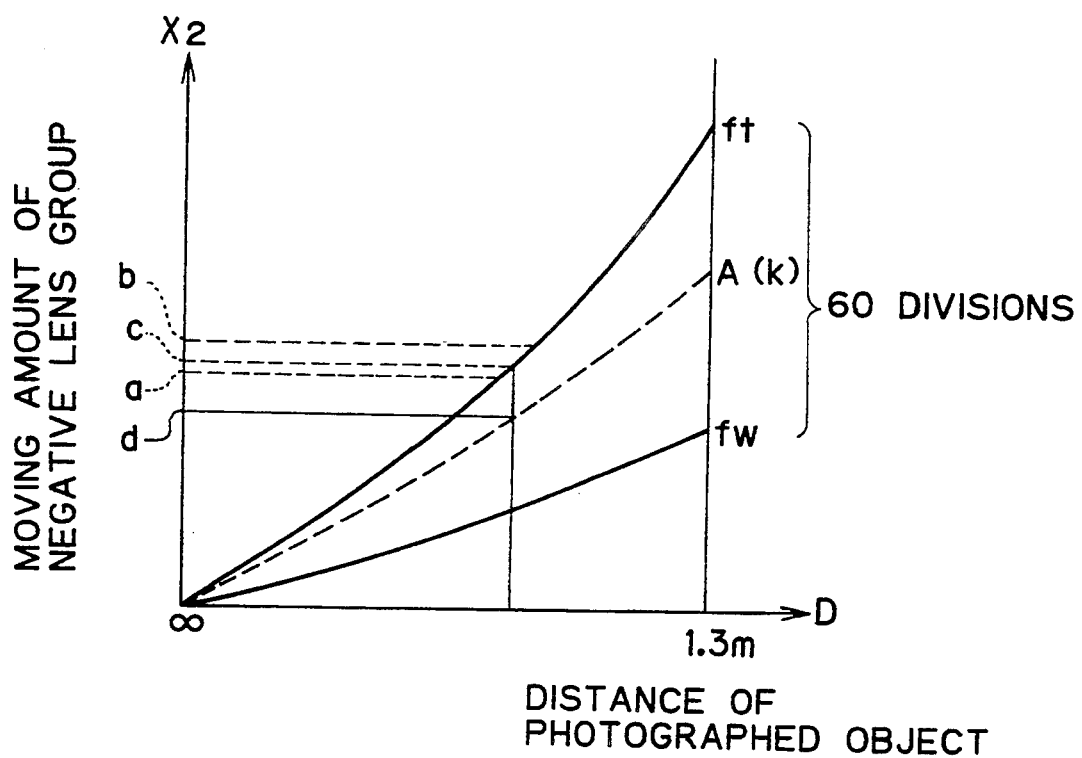
FIG. 11 is a graph showing an example of a method for making a moving curve of the rear lens group in general varifocal control.

It is not easy to preferably adjust and control these many moving lines as illustrated in FIG. 11 showing a general example.

In this general example, the varifocal lens of a two-lens group structure has a rear lens group $L_2$ moved by the operation of an electric pulse driving system and has a focal length 38 mm to 105 mm.

In this example, when complicated moving lines are realized, 20 points corresponding to preset distances D of a photographed object are set on moving lines at a telescopic end ft of the varifocal lens. Further, 60 curve coefficients $k_1$ to $k_{60}$ required to realize respective focal lengths f are set within a zooming region from the telescopic end ft to a wide angle end fw of the varifocal lens. These points and curve coefficients are stored to a memory means.

In the focusing operation, the 20 points on the moving lines at the telescopic end ft are set to reference points. Most approximate values a and b are detected with the 20 points as reference points to calculate an interpolating value c. In a subsequent zooming operation, a specified coefficient $k_x$ required to realize a desirable focal length is selected from the 60 curve coefficients $k_1$ to $k_{60}$ and is read out of the memory means.

The read coefficient $k_x$ is multiplied by the interpolating value c to calculate a final driving pulse value d of the rear lens group $L_2$. A stepless cam $C_z$ shown in FIG. 10 is pulse-driven on the basis of the driving pulse value d so that an operation of this cam is controlled in 200 steps at its maximum. The moving lines are realized by using such a complicated method.

In this case, when a normal memory method is used, a very large memory amount of $60 \times 20 = 1800$ points must be stored to the memory. Therefore, in this general example, 60 kinds of focal lengths to be stored are represented by A(K) to reduce the memory amount.

However, complicated manufacturing control at a high level is required to control the 60 moving lines even when such an improvement is made.

Therefore, since many moving lines must be preferably controlled, no rear focusing system is combined with the lens group moving mechanism having the base frame to make the varifocal lens of a two-lens group structure compact.

However, the inventors in this patent application succeeded in effectively solving all of these problems. In our proposal, the rear focusing system and a lens group moving mechanism having a base frame are used. Further, it is possible to simplify a moving control line of the front lens group at a zooming time and a moving control line of the rear lens group at a focusing time. A zoom lens of a two-lens group structure using a new focusing system in accordance with out proposal is proposed in Japanese Patent Application No. 2-219924 filed on Aug. 23, in 1990.

In the varifocal lens of a two-lens group structure made compact by combining the rear focusing system with the lens group moving mechanism having a base frame, a new problem different from the above-mentioned problems is caused when a wide angle is increased and a macroscopic photographing function is added to the varifocal lens without using a closeup lens.

Namely, when the wide angle is increased, a focusing amount at a most proximate photographing distance is increased by an increase in field angle. Therefore, another focusing amount is required and added to a focusing amount at the most proximate distance at the normal photographing time.

As a result, when the wide angle is increased, a moving amount of the rear lens group $L_2$ toward the film face F is naturally increased.

Namely, when the wide angle is increased, it is usually desirable for an operator to photograph objects until a near object as much as possible. A moving amount of the rear lens group $L_2$ is greatly increased when the varifocal lens of a two-lens group structure is designed in accordance with such an idea. Therefore, the rear lens group $L_2$ unlimitedly approaches the film face F.

As mentioned above, in the varifocal lens of a two-lens group structure having positive and negative lens arrangements, an optical system is designed such that the axial distance G between the front lens group $L_1$ and the rear lens group $L_2$ set at the zooming time is longest at the wide angle end and is shortest at the telescopic end. Accordingly, a movable amount of the rear lens group $L_2$ until the film face F is smallest at the wide angle end.

In contrast to this, in the rear focusing system, a final moving position of the rear lens group $L_2$ at the focusing time is limited by the film face F. Accordingly, when the wide angle is increased in the varifocal lens of a two-lens group structure having positive and negative lens arrangements and using the rear focusing system, a limit of the most proximate photographing distance is determined by the movable amount of the rear lens group $L_2$ at the wide angle end.

However, the moving amounts of the front lens group $L_1$ and the rear lens group $L_2$ are set in consideration of an allowable value of aberration at a designing stage of the optical system and a mechanical structure of the lens body tube. Such a set movable amount of the rear lens group $L_2$ is used as a focusing amount at the normal photographing time, or is used to increase the wide angle in accordance with a commercial idea of the varifocal lens.

In this case, the following different problems are caused in accordance with a selection of the uses of the movable amount of the rear lens group $L_2$.

Namely, when a large movable amount of the rear lens group $L_2$ is used as a focusing amount for a macroscopic photograph, a most proximate photographing position at a macroscopic photographing time can be set to a position considerably close to a photographing position suitable for the macroscopic photograph. However, a most proximate photographing position on a wide angle side at the normal photographing time is far from a photographing position provided in a varifocal lens having an average photographing performance. In contrast to this, when the large movable amount of the rear lens group $L_2$ is used as a focusing amount on a most proximate side at the normal photographing time, the most proximate photographing position at the macroscopic photographing time is far from a photographing position provided in the above varifocal lens having an average photographing performance and is therefore meaningless.

No such a problem is desirable for users. Accordingly, when the varifocal lens is commercially manufactured, it is necessary to design a varifocal lens having both merits.

To satisfy such a condition, the axial distance between the front lens group $L_1$ and the rear lens group $L_2$ at the zooming time must be reduced to increase a distance between the rear lens group $L_2$ and the film face F. Thus, a backward movable amount of the rear lens group $L_2$ is increased. The varifocal lens must be constructed such that the focusing amounts required at the normal photographing time and the macroscopic photographing time are provided by this increased movable amount.

However, in such a structure, the width of a zooming region must be narrowed on the wide angle side.

Namely, if the varifocal lens using the rear focusing system is designed to perform the normal and macroscopic photographing operations, a zoom ratio at this designing time is smaller than that provided in a case in which the varifocal lens is designed in consideration of only the normal photographing operation.

For example, when the varifocal lens is designed without considering the macroscopic photograph, it is possible to perform a zooming operation in the region of a focal length f from 38 to 80 mm. When a function for enabling the macroscopic photograph is added to such a varifocal lens in an entire zooming region, the width of a zooming region requiring an average focusing amount is reduced on the wide angle side. Therefore, only the zooming region of a focal length f from 40 mm to 80 mm is realized.

As a result, the zooming region at the normal photographing time is sacrificed for the macroscopic photographing operation having a low frequency in use, or an increase in proximate range for enabling a photographing operation on the wide angle side. Further, it is impossible to increase the zoom ratio of the varifocal lens as much as possible. Accordingly, in accordance with the general idea of the varifocal lens, it is theoretically impossible to increase a field angle at the normal photographing time while a proximate or macroscopic photograph on the wide angle side can be taken.

This problem is the above-mentioned new problem caused when a wide angle is increased or a macroscopic photographing function is added to a driving device of the varifocal lens of a two-lens group structure for combining the rear focusing system with the lens group moving mechanism having a base frame.

Therefore, the inventors invented a varifocal lens of a two-lens group structure in view of a difference in frequency in use between the normal and macroscopic photographs. In this varifocal lens, while a maximum field angle at the macroscopic photographing time is equal to an average macroscopic field angle obtained in a general designing method, it is possible to increase the field angle at the wide angle end at the normal photographing time until a wide field angle which cannot be obtained in the general designing method. This varifocal lens is proposed in Japanese Utility Model Application Nos. 2-83589 and 2-87846 respectively filed on Aug. 9, 1990 and Aug. 24, 1990. Titles of these utility models are respectively "zoom lens of two-lens group structure" and "zoom lens of two-lens group structure for enabling macroscopic photograph".

In accordance with this proposal, a most proximate photographing position in one photographing mode can be set to at least a position equal to a most proximate photographing position provided in the general average varifocal lens although there is a condition using the difference in frequency in use between the normal and macroscopic photographs. A most proximate photographing position in another photographing mode can be set to a position considerably nearer than a most proximate photographing position provided in the general average varifocal lens.

It is further desirable to set the most proximate photographing positions in both the photographing modes to positions nearer than most proximate photographing positions provided in the general average varifocal lens.

However, it is very difficult to satisfy this requirement by using the rear focusing system in which the rear lens group $L_2$ is moved toward the film face to perform the focusing operation.

As mentioned above, the varifocal lens of a two-lens group structure using the rear focusing system and the lens group moving mechanism having a base frame is structurally advantageous when the varifocal lens is made compact and the zooming region is widened. To realize this varifocal lens, it is necessary to precisely move the front lens group $L_1$ and the rear lens group $L_2$ along predetermined moving lines.

Therefore, it is necessary to dispose a mechanical feeding means for independently moving the base frame B for holding the front lens group $L_1$ and the rear lens group $L_2$ disposed within this base frame along the photographing optical axis O. Further, it is necessary to dispose a driving control means for precisely operating this mechanical feeding means.

However, the mechanical feeding means such as feeding mechanisms of a lead screw system and a gear system has a clearance in engagement between a driving lead screw and a lead nut screwed onto the driving lead screw. Further, there is usually a backlash between driving and driven gears. To realize a high accuracy in operation by using these feeding mechanisms, it is necessary to remove the above engagement clearance and the backlash as much as possible by precisely processing and assembling parts of the feeding mechanisms. In the following description, the engagement clearance and the backlash are generally called a mechanical feeding play.

If the base frame B and a frame for holding the rear lens group are moved in a state in which this mechanical feeding play is caused, an error in stopping position is caused in accordance with this feeding play when these two frames are stopped in respective target positions set at an optical designing stage. Accordingly, no positions of the frames can be exactly set and there is a possibility that no predetermined optical performance can be obtained.

However, many operations are required to process and assemble parts of the mechanical feeding means such that the mechanical feeding play can be removed, thereby greatly increasing cost of the varifocal lens.

When these parts of the mechanical feeding means are mass-produced by using certain engineering and a plastic material, it is difficult to provide a high accuracy in size of these parts in consideration of operating conditions including a temperature condition when the parts are used.

In such a situation, it is very difficult to realize a high accuracy in operation of the varifocal lens in the general technique while no cost of the varifocal lens is increased.

If a method for controlling operations of the base frame B and the rear group holding frame is improved, it is possible to compensate the mechanical feeding play caused by such a mechanical feeding means. However, no technique for improving this control method is known yet at the present stage.

Figure 12:
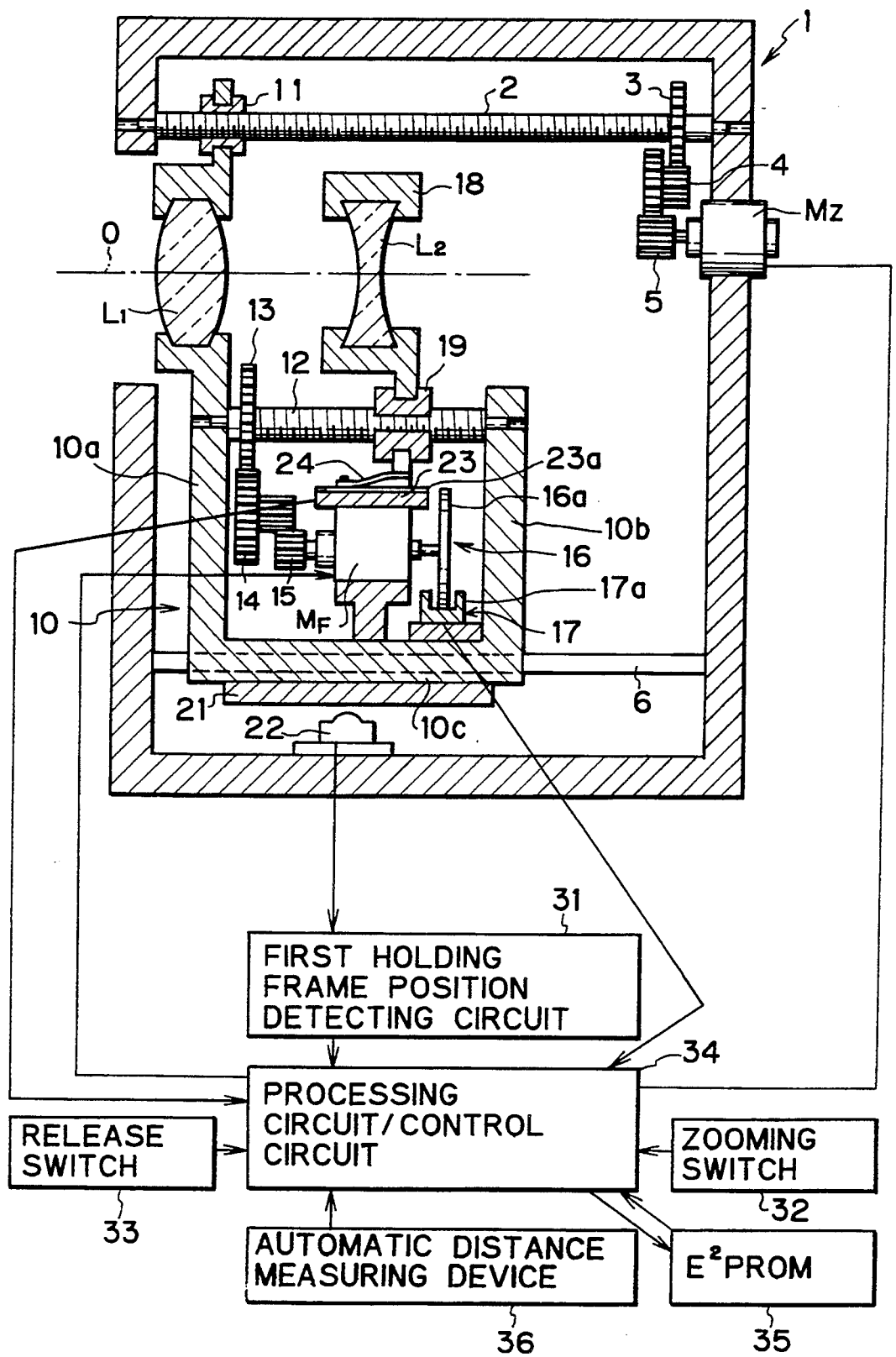
FIG. 12 is a view showing the construction of a zoom lens device of a two-lens group structure in accordance with a first embodiment of the present invention.

FIG. 12 is a view showing the construction of a zoom lens device of a two-lens group structure in accordance with a first embodiment of the present invention. In this zoom lens device, a positive lens group $L_1$ has positive refracting power and a negative lens group $L_2$ has negative refracting power. The positive lens group $L_1$ and the negative lens group $L_2$ are sequentially arranged from the side of a photographing field and can be relatively moved forward and backward on a photographing optical axis O.

In FIG. 12, a body tube 1 has a first lead screw 2 for moving a first holding frame 10 forward and backward along the photographing optical axis O. As described later, the first holding frame 10 holds the positive lens group $L_1$ in an internal space of the body tube 1. This first lead screw 2 is arranged in parallel with the photographing optical axis O. A first lead screw gear 3 is disposed in one end portion of the first lead screw 2 such that the first lead screw gear 3 is integrally rotated together with the first lead screw 2. The first lead screw gear 3 is connected to a driving output gear 5 of a zooming motor $M_z$ through an idle gear 4. The zooming motor $M_z$ moves the first holding frame 10 in a predetermined direction and is fixed to the body tube 1.

An antirotation bar 6 prevents the first holding frame 10 from being rotated when the first lead screw 2 is rotated in normal and reverse directions. The antirotation bar 6 guides a movement of the first holding frame 10 and is arranged between opposite side walls of the body tube 1.

The first holding frame 10 is formed in a recessed shape in which an upper end of a wall portion 10a disposed on the photographing field side and holding the positive lens group $L_1$ is projected from an upper end of a wall portion 10b on a film side. The antirotation bar 6 is inserted into a bottom portion 10c of the first holding frame 10 with play. A first female screw collar 11 is fixed to an upper end portion of the wall portion 10a in the first holding frame 10 and is screwed onto the first lead screw 2. When the first lead screw 2 is rotated in the normal and reverse directions, rotational force of the first lead screw 2 is applied to the first female screw collar 11 so that the first female screw collar 11 is moved. Thus, the first holding body 10 is moved forward and backward along the photographing optical axis O.

A second lead screw 12 is disposed to move a second holding frame 18 forward and backward along the photographing optical axis O. The second lead screw 12 is rotatably arranged in parallel with the photographing optical axis O between the wall portions 10a and 10b of the first holding frame 10.

A second lead screw gear 13 is fixed to the second lead screw 12 such that the second lead screw gear 13 and the second lead screw 12 can be integrally rotated. The second lead screw gear 13 is connected to a driving output gear 15 through an idle gear 14. The driving output gear 15 is attached to one output shaft of a focusing motor $M_F$.

The focusing motor $M_F$ is disposed to move the second holding frame 18 and is arranged on the bottom portion 10c of the first holding frame 10. An encoder blade 16 is fixed to another output shaft of the focusing motor $M_F$. The encoder blade 16 has a series of slits 16a for detecting the number of rotations of this focusing motor in an edge portion thereof.

A photocoupler 17 is combined with the encoder blade 16 and is arranged on the bottom portion 10c of the first holding frame 10. This photocoupler 17 has a photoelectric detecting portion 17a for holding the edge portion of the encoder blade 16 on both sides thereof such that the photocoupler 17 and this edge portion are spaced from each other by a suitable distance. The photoelectric detecting portion 17a detects a pulse light beam passing through the series of slits 16a of the encoder blade 16, thereby detecting the number of rotations of the focusing motor $M_F$.

The second holding frame 18 holds the negative lens group $L_2$ on the photographing optical axis O. A second female screw collar 19 is fixed to a basic portion of the second holding frame 18 and is screwed onto the second lead screw 12. The second female screw collar 19 is moved by rotating the second lead screw 12 in normal and reverse directions so that the second holding frame 18 is moved forward and backward along the photographing optical axis O.

A pattern substrate 21 is fixed onto a lower face of the bottom portion 10c of the first holding frame 10 to detect a position of the positive lens group. An unillustrated reading pattern is formed on a lower face of this pattern substrate 21 to detect a relative position of the positive lens group $L_1$ to the body tube 1.

A magnetic resistance element (MR element) 22 is disposed to read the above reading pattern in a non-contact state. The magnetic resistance element 22 is disposed in a portion of the body tube 1 opposite to the pattern substrate 21. A first holding frame position detecting circuit 31 is connected to the magnetic resistance element 22 and detects a position of the first holding frame 10 on the optical axis on the basis of a position signal transmitted from the magnetic resistance element 22.

A zooming switch 32 is disposed to perform a zooming operation of the zoom lens device. The zooming switch 22 is constructed by a switch for moving the first holding frame 10 from a telescopic side to a wide angle side, and a switch for moving the first holding frame 10 from the wide angle side to the telescopic side. When turning-on and turning-off signals of this zooming switch 32 are inputted to a processing circuit/control circuit 34, the processing circuit/control circuit 34 gives commands for starting and completing the zooming operation. The processing circuit/control circuit 34 functions as a processing circuit and a control circuit and is called a control circuit in the following description.

A release switch 33 is operated in association with the operation of an unillustrated shutter button. Turning-on and turning-off signals of the release switch 33 are inputted to the control circuit 34.

The control circuit 34 constitutes a control means constructed by a micro central processing unit (CPU). The control circuit 34 receives and transmits data with respect to the first photocoupler 17, the holding frame position detecting circuit 31, the zooming switch 32, the release switch 33, the zooming motor $M_z$, the focusing motor $M_F$, a substrate 23 for the detection of a focusing position, and an automatic distance measuring device 36. Further, an $E^2PROM$ (PROM of an electric erasing type) 35 as a memory means is connected to the control circuit 34 and stores moving lines of the first holding frame 10 and the second holding frame 18 in zooming and focusing operations described later.

An operation of the zooming lens device in the above embodiment will next be described.

Figure 13:
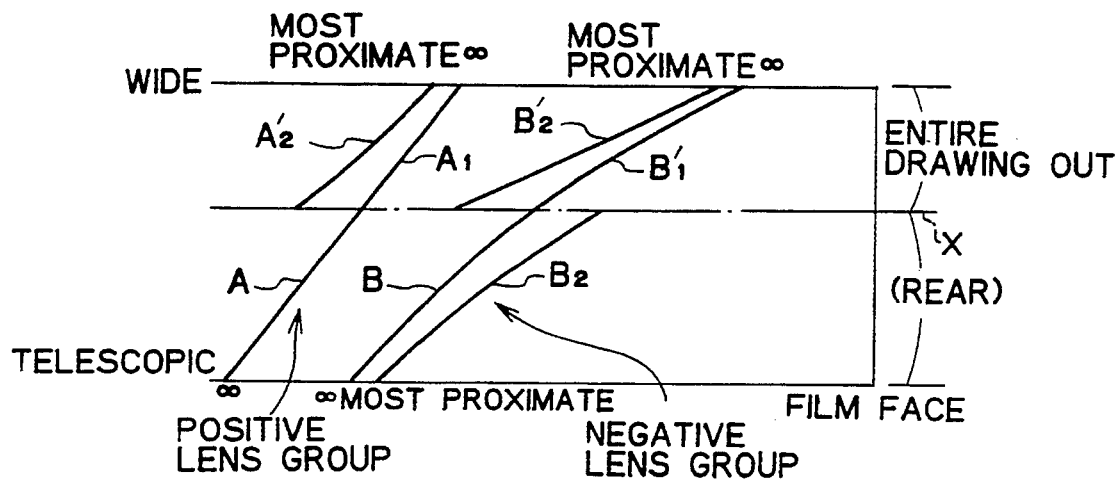
FIG. 13 is a diagram showing moving lines of the lens groups in the first embodiment.

As shown in FIG. 13, in this embodiment, the above moving lines are stored to the $E^2PROM$ 35 such that the zooming and focusing operations are performed by the rear focusing system on the telescopic side and are performed by the entire drawing-out focusing system on the wide angle side. A switching operation of the rear focusing system and the entire drawing-out focusing system is controlled by the control circuit 34 receiving data from the $E^2PROM$ 35.

The rear focusing system and the entire drawing-out focusing system are switched as shown by portion X in FIG. 13 when a lens moving amount at a focusing time in the rear focusing system is larger than that in the entire drawing-out focusing system. The entire drawing-out focusing system is used on the wide angle side from the above time shown by portion X. A lens drawing-out amount is large on the telescopic side in the case of the entire drawing-out focusing system and is large on the wide angle side in the case of the rear focusing system. Accordingly, the rear focusing system and the entire drawing-out focusing system are switched to reduce a time for drawing-out the lens groups. Namely, as mentioned above, the rear focusing system is used on the telescopic side and the entire drawing-out focusing system is used on the wide angle side to reduce the lens drawing-out time.

An operation of the zoom lens device on the telescopic side will next be described. As mentioned above, the rear focusing system is used on the telescopic side. For brevity, FIG. 14 shows moving lines of the lens groups when the rear focusing system is used in an entire zooming region.

First, an operator as a photographer turns on the zooming switch 32. The zooming switch 32 is turned on until a desirable photographing field angle is obtained. When a turning-on signal of this zooming switch 32 is inputted to the control circuit 34, the control circuit 34 outputs a signal for starting the zooming motor $M_z$. Rotational force of this zooming motor $M_z$ is transmitted to the first female screw collar 11 through the driving output gear the idle gear 4, the first lead screw gear 3 and the first lead screw 2. Thus, the first holding frame 10, i.e., the positive lens group $L_1$ is moved along a moving curve A shown in FIG. 14 until the desirable photographing field angle is obtained.

Figure 14:
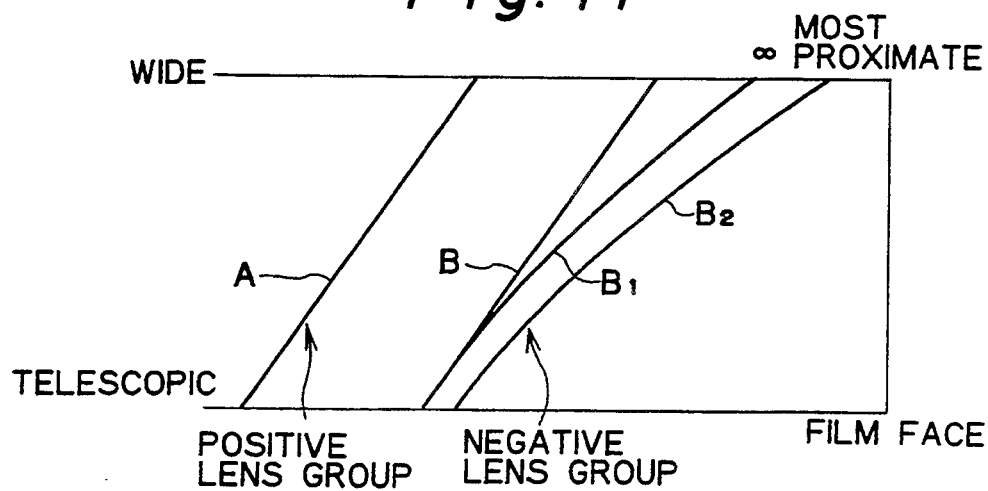
FIG. 14 is a moving line diagram for explaining movements of the lens groups in the first embodiment.

The second holding frame 18 disposed in the first holding frame 10, i.e., the negative lens group $L_2$ is moved along a moving curve B shown in FIG. 14 in parallel with the moving curve A.

When the desirable photographing field angle is obtained, the movement of the first holding frame 10 is stopped by turning off the zooming switch 32 by the operator. A stopping position of the first holding frame 10 is detected by a cooperating action of the pattern substrate 21 and the magnetic resistance element 22. This stopping position is transmitted to the first holding frame position detecting circuit 31 as position information of the first holding frame 10. The first holding frame position detecting circuit 31 then performs analog/digital converting processing of this position information, etc., and outputs converted data to the control circuit 34.

The control circuit 34 judges on the basis of the above position information whether this zooming position is located on the telescopic side and a focusing operation using the rear focusing system is required, or this zooming position is located on the wide angle side and a focusing operation using the entire drawing-out focusing system is required. In this case, the rear focusing system is used.

The automatic distance measuring device 36 automatically measures a distance from the zoom lens device to a photographed object at that time by a turning-on signal of the release switch 33. The control circuit 34 determines a drawing-out amount of the second holding frame 18 based on the above position information and a distance measuring signal transmitted from the automatic distance measuring device 36. The control circuit 34 then rotates the focusing motor $M_F$ such that the negative lens group $L_2$ is moved from a position on the moving curve B to a predetermined position between a moving curve $B_2$ at the time of a most proximate distance and a moving curve $B_1$ at the time of an infinite distance.

Rotational force of the focusing motor $M_F$ is transmitted to the second female screw collar 19 through the driving output gear 15, the idle gear 14, the second lead screw gear 13 and the second lead screw 12. Thus, the second holding frame 18, i.e., the negative lens group $L_2$ is moved to the above predetermined position. At this time, a rotational amount of the focusing motor $M_F$ is detected by the encoder blade 16 and the photocoupler 17 and is outputted to the control circuit 34 as information of a total moving amount of the second holding frame 18.

The control circuit 34 compares this total moving amount with a moving amount set in advance. When these moving amounts are in conformity with each other, the control circuit 34 outputs a rotation stopping signal to the focusing motor $M_F$.

In this state, the zoom lens is stopped at the desirable photographing field angle in a position in which the focusing operation is suitably performed.

An operation of the zoom lens device on the wide angle side will next be described. An operator as a photographer turns on the zooming switch 32. Thus, similar to the above case, the control circuit 34 is operated to move the first holding frame 10 until a desirable photographing field angle is obtained. The movement of the first holding frame 10 is stopped by turning off the zooming switch 32. Thus, the control circuit 34 judges on the basis of the information of a stopping position of the first holding frame 10 transmitted from the first holding frame position detecting circuit 31 whether the zooming position is located on the telescopic or wide angle side as mentioned above. In this case, it is judged that the entire drawing-out focusing system is used on the wide angle side.

Figure 15:
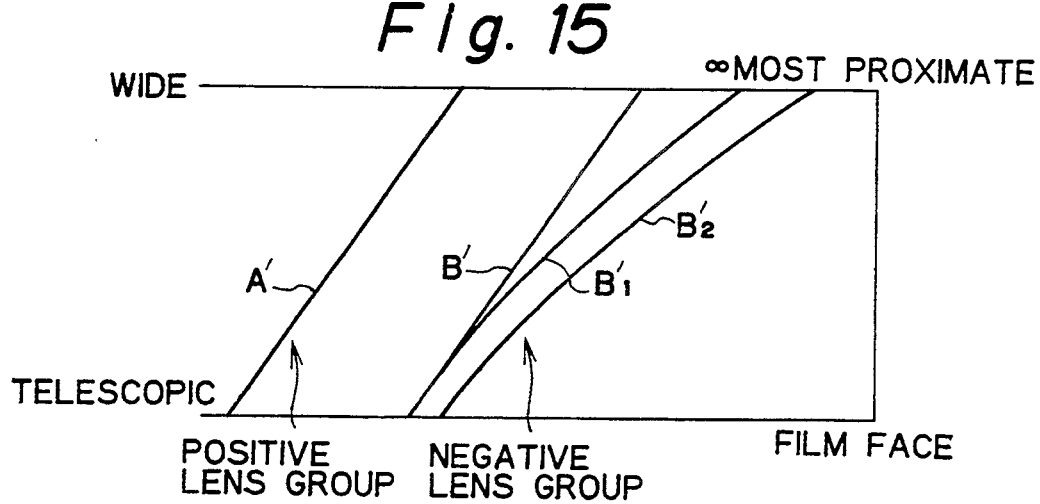
FIG. 15 is a moving line diagram for explaining movements of the lens groups in the first embodiment.

The positive lens group $L_1$ and the negative lens group $L_2$ are moved in parallel with each other as shown by moving curves A' and B' in a moving line diagram of the lens groups in FIG. 15 even in the case of the entire drawing-out focusing system. At a focusing time described later, the negative lens group $L_2$ is moved to a predetermined position between a moving curve $B_2'$ at the time of a most proximate distance and a moving curve $B_1'$ at the time of an infinite distance. To reduce a time for moving the negative lens group $L_2$ to this predetermined position, the control circuit 34 rotates the focusing motor $M_F$ to move the negative lens group $L_2$ to a position at the time of the infinite distance corresponding to a position of the positive lens group $L_1$. Thus, the next focusing operation is prepared.

Thereafter, the release switch 33 is turned on. Thus, similar to the above case, the automatic distance measuring device 36 automatically measures the distance from the zoom lens device to the photographed object. A required focusing amount is then calculated by the control circuit 34 to determine a rotational amount of the zooming motor $M_z$. As mentioned above, the first holding frame 10 is moved by rotating the zooming motor $M_z$ by this rotational amount. Thus, the positive lens group $L_1$ and the negative lens group $L_2$ are moved in parallel with each other by the same distance. As shown in FIG. 13, the lens groups $L_1$ and $L_2$ are respectively moved to predetermined positions between moving curves $A_2'$, $B_2'$ at the time of the most proximate distance and moving curves $A_1'$, $B_1'$ at the time of the infinite distance. Thus, the focusing operation using the entire drawing-out focusing system is performed.

A concrete method for moving the above lens groups $L_1$ and $L_2$ is summarized as follows.

(1) The zooming motor $M_z$ and the focusing motor $M_F$ are driven at the zooming time.

(2) At the focusing time, only the focusing motor $M_F$ is driven on the telescopic side and only the zooming motor $M_z$ is driven on the wide angle side.

In this method, a time for operating the zoom lens device is reduced.

In the above embodiment, the operation of the zoom lens device is controlled such that the rear focusing system is used on the telescopic side and the entire drawing-out focusing system is used on the wide angle side. Thus, it is possible to increase a focal length of the zoom lens device on the telescopic side and decrease the focal length of the zoom lens device on the wide angle side. Accordingly, it is possible to increase a zoom ratio of the zoom lens device as a whole. Further, the zoom lens device can be made compact since a drawing-out amount of the positive lens group is reduced on the telescopic side.

Similar effects can be also obtained when the rear focusing system is used on the telescopic side and the front focusing system is used instead of the entire drawing-out focusing system on the wide angle side.

In this case, in the general front focusing system, a lens moving amount at the focusing time is reduced in comparison with the entire drawing-out focusing system, but a high accuracy in focusing operation is required. Further, a means for moving the positive lens group $L_1$ is required in addition to the structure shown in FIG. 12. Otherwise, after the positive and negative lens groups $L_1$ and $L_2$ are moved by the zooming motor $M_z$ in parallel with each other by front focusing amounts, it is necessary to return the negative lens group $L_2$ by the moving amount thereof using the focusing motor $M_F$.

As mentioned above, in accordance with the present invention, the rear focusing system and the entire drawing-out focusing system are switched in a magnification region of a zoom lens. Otherwise, the rear focusing system and the front focusing system are switched in a magnification region of a zoom lens. Thus, is possible to provide a zoom lens device of a two-lens group structure in which the zoom lens device is made compact and a zoom ratio is increased and a time for performing a focusing operation is reduced.

A driving device of a varifocal lens having a two-lens group structure in accordance with a second embodiment of the present invention will next be described in detail with reference to FIGS. 16 to 29.

Figure 16:
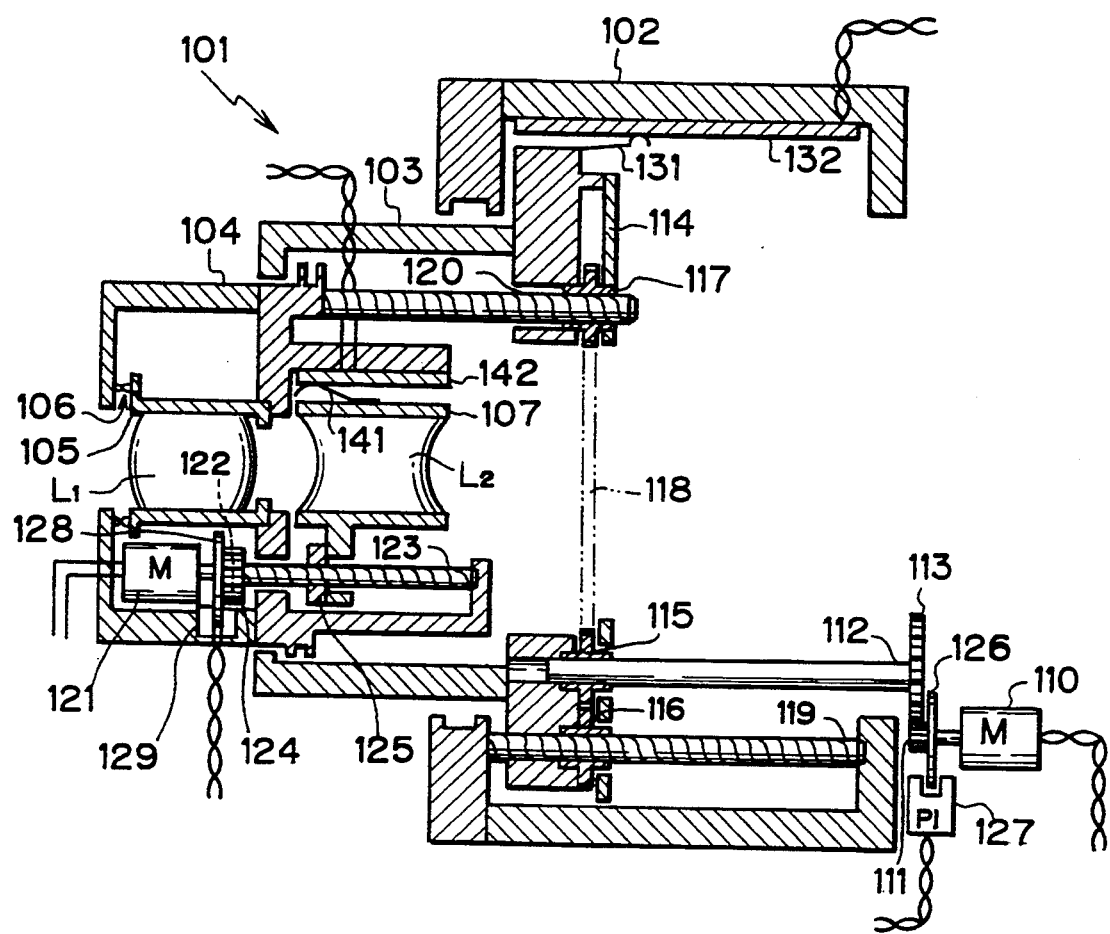
FIG. 16 is a cross-sectional broken view showing the schematic construction of a driving device of a varifocal lens in accordance with a second embodiment of the present invention.
Figure 17:
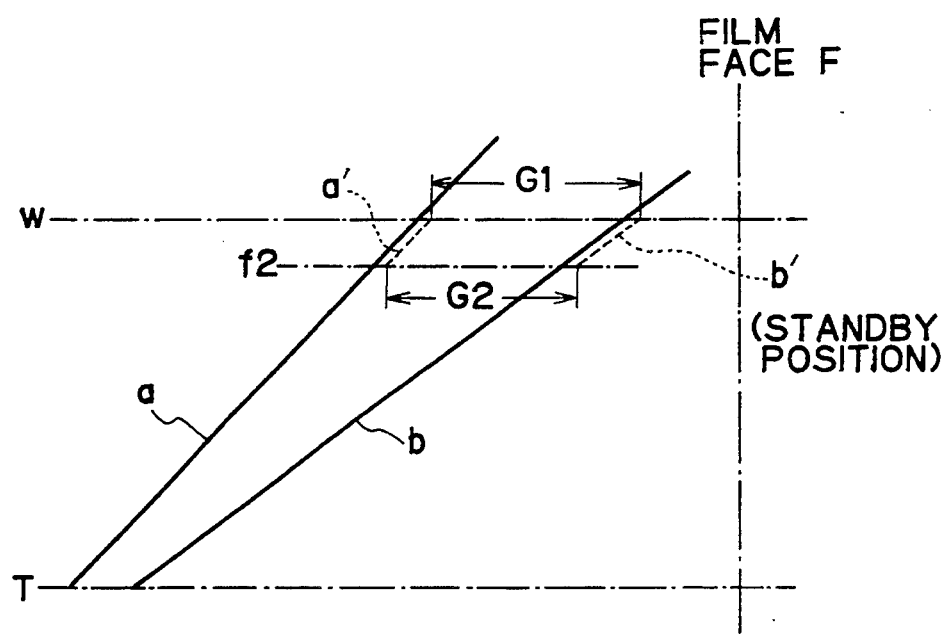
FIG. 17 is a basic optical diagram showing moving lines at zooming and focusing times of a photographing optical system used in the driving device of a varifocal lens shown in FIG. 16.

FIG. 16 is a typical broken view showing the schematic construction of a driving device of a varifocal lens in the present invention. FIG. 17 is a basic optical diagram showing moving lines at zooming, standby and focusing times of a photographing optical system used in the driving device of a varifocal lens shown in FIG. 16.

In the second embodiment, the photographing optical system used for the varifocal lens of a two-lens group structure shown in FIG. 16 has a front lens group $L_1$ having positive refracting power and a rear lens group $L_2$ having negative refracting power. The front lens group $L_1$ and the rear lens group $L_2$ are sequentially arranged from the side of a photographing field. The photographing optical system thus constitutes a zooming optical system of a two-lens group structure.

In this case, the photographing optical system having the front lens group $L_1$ and the rear lens group $L_2$ is optically designed as a step zooming optical system for stepwise realizing focal lengths f1 to f10 at 10 stages from a wide angle end of [he varifocal lens to a telescopic end thereof.

A focusing operation using a simultaneous lens moving system or an entire drawing-out focusing system is performed in partial zooming regions for two focal lengths f1 and f2 on a wide angle side. A focusing operation using a rear focusing system is performed in partial zooming regions for the remaining eight focal lengths f3 to f10. The photographing optical system is optically designed such that these focusing operations are performed.

Namely, all the zooming regions in the photographing optical system are constructed by two optical systems divided into the partial zooming regions on the wide angle side and the remaining partial zooming regions.

A body tube device 101 of the varifocal lens has the front lens group $L_1$ and the rear lens group $L_2$ in the photographing optical system. A fixed body tube 102 constitutes a body tube section in this body tube device 101.

A driving body tube 103 is disposed to move a base frame 104 described later. The driving body tube 103 can be linearly moved forward and backward along a photographing optical axis within the fixed body tube 102.

The base frame 104 is disposed within this driving body tube 103 such that this base frame 104 can be linearly moved forward and backward along the photographing optical axis.

A front group frame 105 holds the front lens group $L_1$ and is fixedly attached to a front internal portion of the base frame 104 by the pressing force of a biasing member 106 for fixture composed of e.g., a coil spring.

A rear group holding frame 107 holds the rear lens group $L_2$ and can be linearly moved forward and backward along the photographing optical axis within a rear portion of the base frame 104.

The fixed body tube 102, the driving body tube 103 and the base frame 104 constitute a cylindrical member having a triple structure in which these three elements can be relatively moved along the photographing optical axis. The base frame 104 (or the front group frame 105) and the rear group holding frame 107 constitute a lens holding frame having a structure for changing an axial distance therebetween.

For example, a suitable known linear guide mechanism using a pole member and a sliding member is used as a mechanism for guiding a linear movement of the driving body tube 103 within the fixed body tube 102. A suitable known linear guide mechanism using a pole member and a sliding member is also used as a mechanism for guiding a linear movement of the base frame 104 within the driving body tube 103. A suitable known linear guide mechanism using a pole member and a sliding member is further used as a mechanism for guiding a linear movement of the rear group holding frame 107 in the base frame 104. These linear guide mechanisms each using a pole member and a sliding member are not shown in FIG. 16.

A first motor 110 of a reversible rotation type moves the driving body tube 103 and the base frame 104 forward and backward along the photographing optical axis. The first motor 110 is disposed in a suitable position of the fixed body tube 102.

For example, this first motor 110 is constructed by a direct current (DC) motor having a core. An operation of the first motor 110 is digitally controlled by the operation of a motor driving circuit 182 described later.

A first driving gear 111 is fixedly attached to an end portion of an output shaft of the first motor 110.

For example, a driving shaft 112 has an elliptical shape in longitudinal cross section and is rotatably disposed within a lower portion of the fixed body tube 102. This elliptical shape is formed by cutting an outer circumferential portion of a column in the shape of parallel planes with axial symmetry in two positions of this cylindrical portion. A first driven gear 113 is disposed in a rear end portion of this driving shaft 112 at a right-hand end in FIG. 16 and is engaged with the above first driving gear 111.

A cover member 114 is formed in shape of a ring and is fixed to a rear end portion of the driving body tube 103. Each of a driving transmission gear 115, two lead nut gears 116, 117 and an associating gear 118 described later is rotatably attached onto an upper face of the cover member 114.

The driving transmission gear 115 is constructed such that the driving transmission gear 115 is integrally rotated with the elliptical driving shaft 112 by an action of the elliptical cross section and can be slid and moved on the elliptical driving shaft 112 together with the cover member 114 in the direction of the optical axis.

Female lead screws are formed in the two lead nut gears 116 and 117 on circumferential faces thereof and can be screwed onto a fixed lead screw 119 and a moving lead screw 120 described later. For example, each of the lead nut gears 116 and 117 can be rotated in a position near an outer circumference of the cover member 114 and is not moved in the direction of the optical axis.

The lower lead nut gear 116 is directly engaged with the driving transmission gear 115. The upper lead nut gear 117 is engaged with the driving transmission gear 115 through the associating gear 118 formed in the shape of a ring. The associating gear 118 may be constructed by a series of gears instead of the ring-shaped gear.

The fixed lead screw 119 is screwed into the lower lead nut gear 116. No fixed lead screw 119 is rotated within a lower portion of the fixed body tube 102.

In this second embodiment, lead driving force between the fixed lead screw 119 and the lower lead nut gear 116 is set in advance to be caused in a direction in which the driving body tube 103 can be linearly moved toward a photographing field when the first motor 110 is rotated in a normal direction.

The moving lead screw 120 is screwed into the upper lead nut gear 117. The moving lead screw 120 is connected to a rear end portion of the base frame 104 such that no moving lead screw 120 is rotated. The moving lead screw 120 can be moved together with the base frame 104 in the direction of the optical axis.

Lead driving force between the moving lead screw 120 and the upper lead nut gear 117 is set in advance to be caused in a direction in which the base frame 104 can be linearly moved toward the photographing field when the first motor 110 is rotated in the normal direction.

It is desirable to maintain a preferable accuracy in engagement as much as possible since mechanical feeding plays such as an engaging clearance and a backlash tend to be caused between the lower lead nut gear 116 and the fixed lead screw 119 screwed into this lower lead nut gear 116. It is also desirable to maintain a preferable accuracy in engagement as much as possible since mechanical feeding plays such as an engaging clearance and a backlash tend to be caused between the upper lead nut gear 117 and the moving lead screw 120, and between gears engaged with each other.

A second motor 121 of a reversible rotation type moves the rear group holding frame 107 forward and backward along the photographing optical axis. The second motor 121 is disposed within the base frame 104.

Similar to the first motor 110, the second motor 121 is constructed by e.g., a direct current (DC) motor having a core. An operation of the second motor 121 is digitally controlled by the motor driving circuit 182 described later.

A second driving gear 122 is fixedly attached to an end portion of an output shaft of the second motor 121.

A rear group lead screw 123 is rotatably disposed within a lower portion of the base frame 104. A second driven gear 124 is integrally formed in a front end portion of the rear group lead screw 123. Otherwise, the second driven gear 124 is fixed to this front end portion of the rear group lead screw 123. The second driven gear 124 is engaged with the second driving gear 122 at any time.

Lead driving force between the rear group lead screw 123 and a rear group lead nut 125 described later is set in advance to be caused in a direction in which the rear group holding frame 107 can be linearly moved toward a film face F when the second motor 121 is rotated in a normal direction.

The rear group lead nut 125 is screwed onto the rear group lead screw 123 and is fixed to the rear group holding frame 107. This structure of the rear group lead nut 125 is different from that of each of the above two lead nut gears 116 and 117. When the rear group lead screw 123 is rotated, the rear group lead nut 125 can be moved forward and backward together with the rear group holding frame 107 along the photographing optical axis.

A first rotary encoder 126 is fixedly attached to the output shaft of the above first motor 110.

Figure 18:
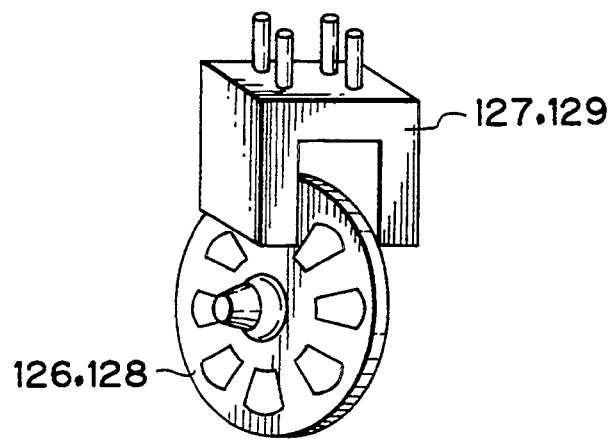
FIG. 18 is a perspective view showing the appearance of a schematic structure of each of first and second digital signal generating means used in the driving device of a varifocal lens shown in FIG. 16.

A firs[photo-interrupter 127 is disposed in a suitable position of the fixed body tube 102. The first photo-interrupter 127 is combined with the first encoder 126 as shown in FIG. 18, thereby constituting a first digital signal generating means.

The first digital signal generating means having the first encoder 126 and the first photo-interrupter 127 detects the number of rotations of the first motor 110 or an angle of rotation thereof as a digital signal. In the following description, the first digital signal generating means detects the number of rotations of the first motor 110. The detected digital signal indicative of the number of rotations of the first motor 110 can be outputted to a pulse detecting circuit 181 described later (see FIG. 19).

A second encoder 128 is fixedly attached to the output shaft of the above second motor 121.

A second photo-interrupter 129 is disposed within the base frame 104. Similar to the case of the above first digital signal generating means having the first encoder 126 and the first photo-interrupter 127, the second photo-interrupter 129 is combined with the second encoder 128 as shown in FIG. 18, thereby constituting a second digital signal generating means.

The second digital signal generating means having the second encoder 128 and the second photo-interrupter 129 detects the number of rotations of the second motor 121 as a digital signal. The detected digital signal indicative of the number of rotations of the second motor 121 can be outputted to the pulse detecting circuit 181.

Figure 19:
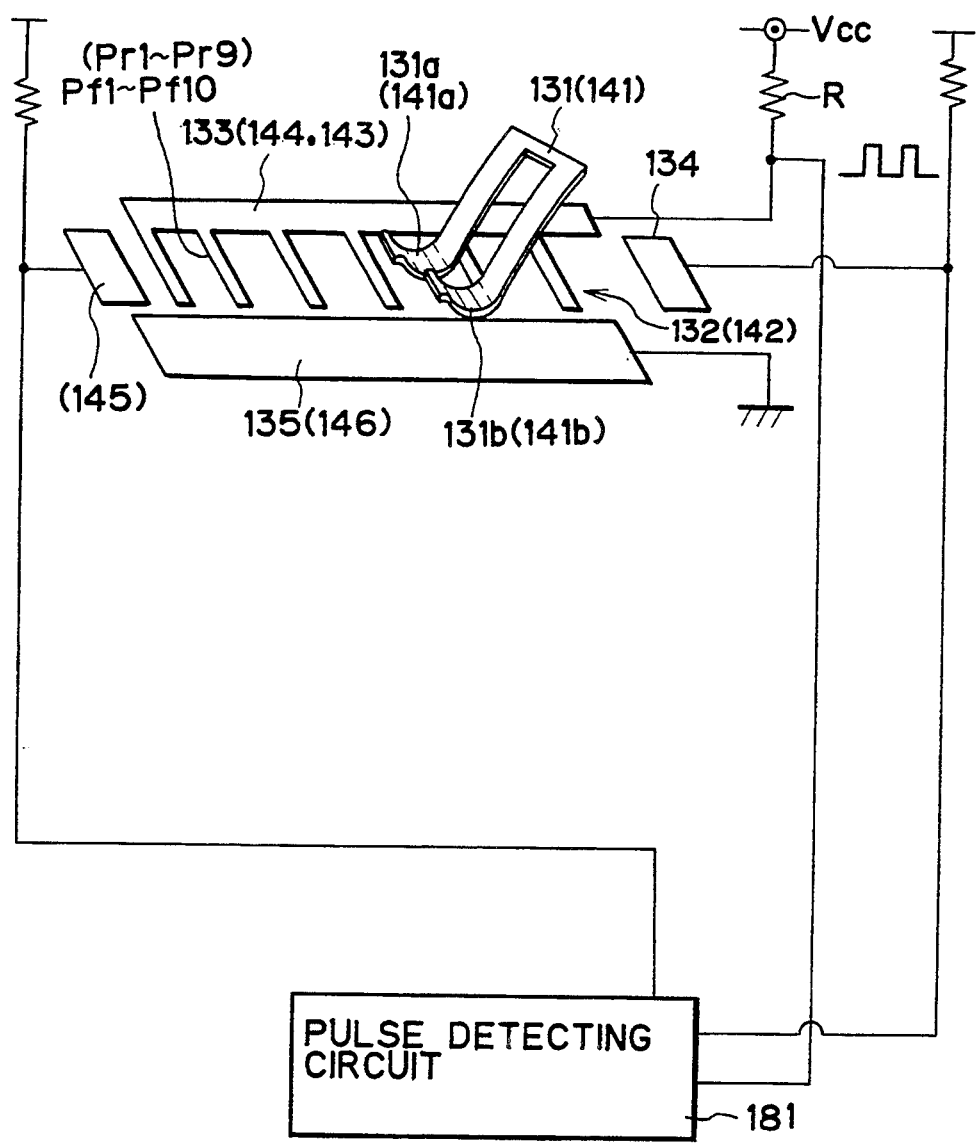
FIG. 19 is a perspective view for explaining a schematic structure of each of a base frame position detecting means and a rear group holding frame position detecting means used in the driving device of a varifocal lens shown in FIG. 16.

A first sliding contact piece 131 of a cantilever type is disposed on an outer circumferential face of the above driving body tube 103 through a suitable insulating material. As shown in FIG. 19, the first sliding contact piece 131 is constructed by two forked sliding portions 131a and 131b at free ends thereof.

A base frame control pattern substrate 132 is disposed in an inside portion of the fixed body tube 102 along a moving path of the forked sliding portion 131a. Conductive control patterns are formed on a surface of the base frame control pattern substrate 132. These conductive control patterns are constructed by ten base frame control plates Pf1 to Pf10, a storing position setting plate 134 and an earth plate 135. No plate 134 is shown in FIG. 19. The relation in position between the conductive control patterns is set as shown in FIG. 20.

The ten base frame control plates Pf1 to Pf10 are disposed as electric signal generating plates for stopping the base frame 104 in optically designed positions or standby line positions Z1f to Z10f described later.

Figure 20:
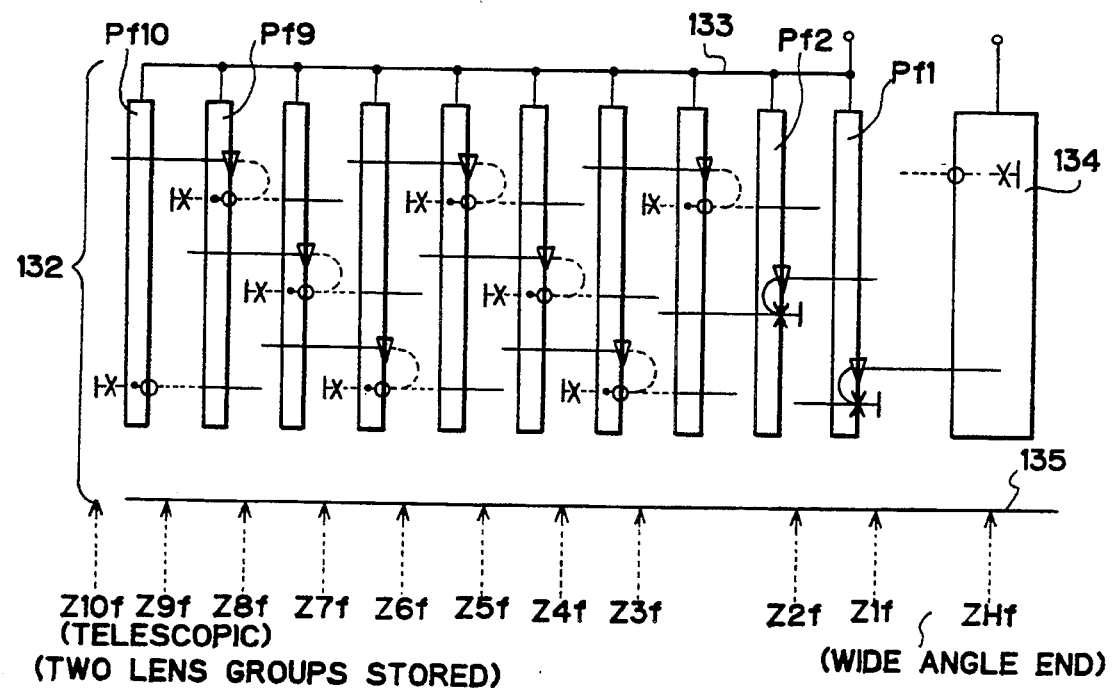
FIG. 20 is a pattern constructional view for explaining the relation in position between respective conductive patterns on a base frame control pattern substrate, and explaining the relation in position between each of base frame control plates and each of base frame target stopping positions $Z1f$ to $Z10f$.

The base frame control plates Pf1 to Pf10 are are constructed by narrow conductive plates formed in the shape of a strip in FIG. 20. The base frame control plates Pf1 to Pf10 are aligned with each other and are sequentially arranged toward the photographing field from a side of the film face F. A right-hand edge portion of each of the base frame control plates is located on the side of the film face F and constitutes an electric signal generating portion for generating turning-on and turning-off signals.

One end of each of the base frame control plates Pf1 to Pf10 is electrically connected to a position control terminal plate 133. The position control terminal plate 133 is connected to a power source Vcc through a pull-up resistor R and is also connected to the pulse detecting circuit 181. An output of the electric signal generating portion is transmitted to the pulse detecting circuit 181.

The storing position setting plate 134 is disposed as an electric signal generating plate for stopping the base frame 104 in a base frame storing position ZHf set within a storing space.

This storing position setting plate 134 is constructed by a wide conductive plate formed in the shape of a strip in FIG. 20. The storing position setting plate 134 is disposed in a position located by a predetermined distance on the side of the film face F from each of the base frame control plates Pf1 to Pf10. Namely, the storing position setting plate 134 is disposed in a position closest to the film face F on the base frame control pattern substrate 132. A left-hand edge portion of the storing position setting plate 134 is located on the side of a photographing field and constitutes an electric signal generating portion for generating turning-on and turning-off signals. An output of this electric signal generating portion is transmitted to the pulse detecting circuit 181.

The earth plate 135 is disposed along a moving path of the forked sliding portion 131b in a position parallel to the above base frame control plates Pf1 to Pf10 and the storing position setting plate 134.

Accordingly, when the first sliding contact piece 131 is moved in the direction of the optical axis in accordance with a movement of the driving body tube 103, the forked sliding portion 131a is moved while this forked sliding portion 131a intermittently comes in slide contact with the respective base frame control plates Pf1 to Pf10 and the storing position setting plate 134. The forked sliding portion 131b is moved while this forked sliding portion 131b comes in slide contact with the earth plate 135 at any time.

As a result, when the first sliding contact piece 131 comes in contact with the right-hand edge portion of each of the base frame control plates Pf1 to PF10 and the left-hand edge portion of the storing position setting plate 134, an electric signal having a low voltage level is outputted from the position control terminal plate 133 and the storing position setting plate 134.

When the first sliding contact piece 131 is located outside the corresponding right-hand edge portion of each of these control plates, an electric signal having a high voltage level is outputted from the position control terminal plate 133 and the storing position setting plate 134.

Namely, a first base frame position detecting means is constructed by the first sliding contact piece 131, the position control terminal plate 133 and the respective base frame control plates Pf1 to Pf10.

A second sliding contact piece 141 of a cantilever type is disposed on an outer circumferential face of the above rear group holding frame 107 through a suitable insulating material. As shown in FIG. 19, the second sliding contact piece 141 is constructed by two forked sliding portions 141a and 141b at free ends thereof.

A rear group holding frame control pattern substrate 142 is disposed inside the base frame 104 along a moving path of the forked sliding portion 141a. Conductive control patterns are formed on a surface of the rear group holding frame control pattern substrate 142. The conductive control patterns are constructed by nine rear group holding frame control plates Pr1 to Pr9 (no Pr10 is included), an odd position control terminal plate 143 and an even position control terminal plate 144. The conductive control patterns are also constructed by a leftmost frame end setting plate 145 and an earth plate 146. The relation in position between the conductive control patterns is set as shown in FIG. 21.

Each of the rear group holding frame control plates Pr1 to Pt9 is disposed as an electric signal generating plate for stopping the rear group holding frame 107 in optically designed positions or standby line positions Z1r to Z10r described later.

Figure 21:
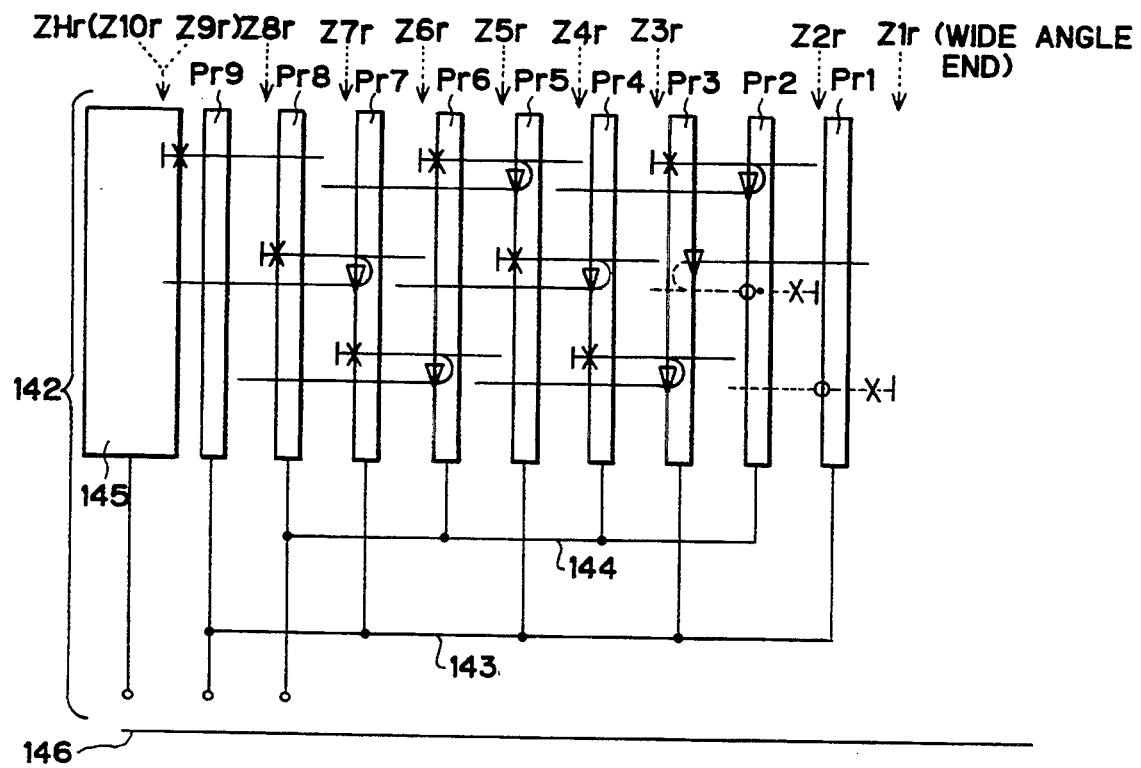
FIG. 21 is a pattern constructional view for explaining the relation in position between respective conductive patterns on a rear group holding frame control pattern substrate, and explaining the relation in position between each of rear group holding frame control plates Pr1 to Pr9 and each of rear group holding frame target stopping positions $Z1r$ to $Z10r$.

The rear group holding frame control plates Pr1 to Pr9 are constructed by narrow conductive plates formed in the shape of a strip in FIG. 21. The rear group holding frame control plates Pr1 to Pr9 are aligned with each other and are sequentially arranged toward the photographing field from the side of the film face F. A left-hand edge portion of each of the rear group holding frame control plates constitutes an electric signal generating portion for generating turning-on and turning-off signals having high and low voltage levels.

The odd position control terminal plate 143 is disposed as a terminal for electrically connecting end portions of five odd control plates Pr1, Pr3, Pr5, Pr7 and Pr9 to each other. An output of this odd position control terminal plate 143 is transmitted to the pulse detecting circuit 181.

The even position control terminal plate 144 is disposed as a terminal for electrically connecting end portions of four even control plates Pr2, Pr4, Pr6 and Pt8 to each other. An output of this even position control terminal plate 144 is transmitted to the pulse detecting circuit 181.

The leftmost frame end setting plate 145 is disposed as an electric signal generating plate for stopping the rear group holding frame 107 in a leftmost frame end position ZHr as a storing position of the rear group holding frame 107 within the base frame 104 when the base frame 104 is stored in a storing space. In FIG. 21, Z10r and Z9r are set to the leftmost frame end position ZHr.

The leftmost frame end setting plate 145 is constructed by a wide conductive plate formed in the shape of a strip in FIG. 21. The leftmost frame end setting plate 145 is disposed in a position located by a predetermined distance on the photographing field side from each of the rear group holding frame control plates Pr1 to Pr9. Namely, the leftmost frame end setting plate 145 is disposed in a position closest to the photographing field on the rear group frame control pattern substrate 142. A right-hand edge portion of the leftmost frame end setting plate 145 constitutes an electric signal generating section for generating turning-on and turning-off signals.

An output of the leftmost frame end setting plate 145 is transmitted to the pulse detecting circuit 181.

The earth plate 146 is disposed along a moving path of the forked sliding portion 141b in a position parallel to the above rear group holding frame control plates Pr1 to Pt9 and the leftmost frame end setting plate 145.

When the second sliding contact piece 141 is moved in accordance with a movement of the rear group holding frame 107 in the direction of the optical axis, the forked sliding portion 141a is moved while this forked sliding portion 141a intermittently comes in slide contact with the respective rear group holding frame control plates Pr1 to Pt9 and the leftmost frame end setting plate 145. The forked sliding portion 141b is moved while this forked sliding portion 141b comes in slide contact with the earth plate 146 at any time.

As a result, when the second sliding contact piece 141 comes in contact with the left-hand edge portion of each of odd rear group holding frame control plates Pr1, Pr3, Pr5, Pr7 and Pr9, an electric turning-on signal having a low voltage level is outputted from the odd position control terminal plate 143. When the second sliding contact piece 141 comes in contact with the left-hand edge portion of each of even control plates Pt2, Pr4, Pr6 and Pr8, a turning-on signal having a low voltage level is outputted from the even position control terminal plate 144. Further, when the second sliding contact piece 141 comes in contact with the right-hand edge portion of the leftmost frame end setting plate 145, a turning-on signal having a low voltage level is outputted from this leftmost frame end setting plate 145.

When the second sliding contact piece 141 is located outside the corresponding edge portion of each of the rear group holding frame control plates, an electric turning-off signal having a high voltage level is outputted from the odd position control terminal plate 143, the even position control terminal plate 144 and the leftmost frame end setting plate 145.

A second base frame position detecting means is constructed by the second sliding contact piece 141, the odd position control terminal plate 143, the even position control terminal plate 144, the leftmost frame end setting plate 145 and the respective rear group holding frame control plates Pr1 to Pr9.

In this second embodiment, the number of rear group holding frame control plates Pr1 to Pr9 is smaller by one than the number of base frame control plates Pf1 to Pf10. Such a structure is used in consideration of a case in which the number of spaces for arranging the rear group holding frame control plates is insufficient by one. Therefore, the number of rear group holding frame control plates is equal to the number of base frame control plates in principle.

Figure 24:
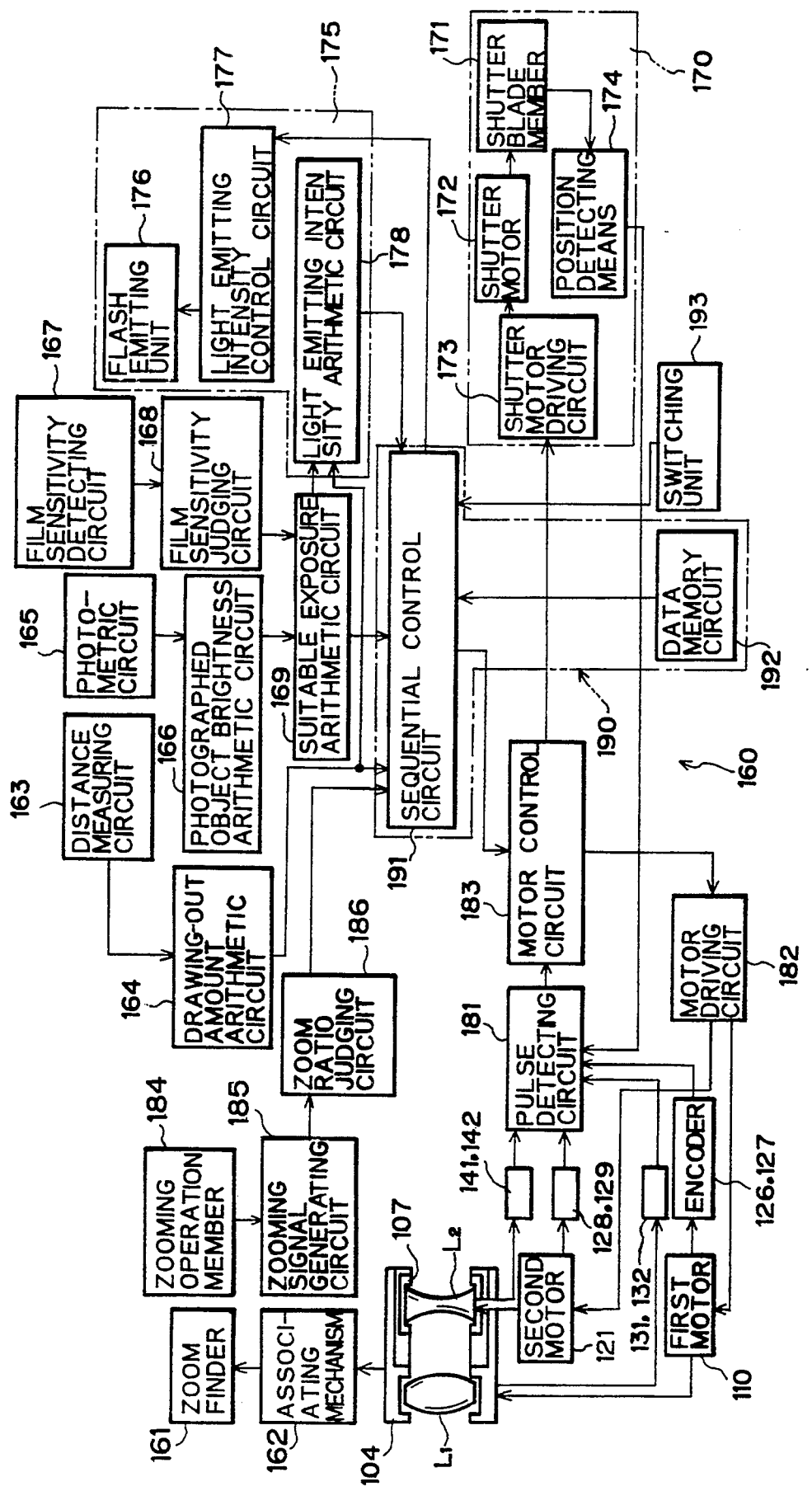
FIG. 24 is a block diagram showing the entire construction of a camera having the driving device of a varifocal lens in the second embodiment of the present invention.

For example, the varifocal lens constructed above is used in a state in which the varifocal lens is built in a camera 160 constructed as shown in FIG. 24 and using a roll film of a normal type.

In FIG. 24, a zoom finder 161 has a well-known finder structure and is operated in association with a base frame 104 or a driving body tube 103 through a suitable associating mechanism 162. For example, ten kinds of focal lengths of the varifocal lens can be realized in stages in accordance with a movement of the base frame 104. Visual fields corresponding to these focal lengths can be represented as an approximate zooming visual field provided by continuously connecting the visual fields at the focal lengths to each other.

For example, an automatic focusing (AF) distance measuring circuit 163 is disposed in an unillustrated automatic photoelectric distance measuring means such as a photoelectric distance measuring means of an infrared ray projecting type. The AF distance measuring circuit 163 detects a photographing distance at each of the focal lengths of the varifocal lens. The AF distance measuring circuit 163 converts information indicative of the detected photographing distance to an electric signal and outputs this electric signal to a drawing-out amount arithmetic circuit 164 described later.

The drawing-out amount arithmetic circuit 164 calculates a focusing amount at each of the focal lengths f1 to f10 based on the photographing distance information of the AF distance measuring circuit 163.

A focusing region of the simultaneous lens moving system is constructed by focusing regions for two focal lengths f1 and f2 on a wide angle side. In this focusing region of the simultaneous lens moving system, the calculated focusing amount of the drawing-out amount arithmetic circuit 164 is further reduced to the number of rotations of a first motor 110. This number of rotations of the first motor 110 is outputted to a sequential control circuit 191 described later. A focusing region of the rear focusing system is constructed by focusing regions for the remaining focal lengths f3 to f10. In this focusing region of the rear focusing system, the above calculated focusing amount is reduced to the number of rotations of a second motor 121. This number of rotations of the second motor 121 is outputted to the sequential control circuit 191.

A photometric circuit 165 measures the brightness of a photographed object at a photographing time. The photometric circuit 165 converts information of this brightness of the photographed object to an electric signal and outputs this electric signal to a photographed object brightness arithmetic circuit 166.

A film sensitivity detecting circuit 167 detects the sensitivity of an unillustrated film attached into the camera 160. The film sensitivity detecting circuit 167 converts information indicative of a detected sensitivity value of the film to an electric signal and outputs this electric signal to a film sensitivity judging circuit 168.

A suitable exposure arithmetic circuit 169 calculates a suitable exposure value based on the information signal indicative of the film sensitivity value from the film sensitivity judging circuit 168 and the information signal indicative of the brightness of the photographed body from the above photographed body brightness arithmetic circuit 166. This calculated exposure value is reduced to the number of rotations of a shutter motor 172 described later or an angle of rotation thereof.

A diaphragm/shutter blade device 170 is constructed by a well-known structure having diaphragm and shutter functions. This diaphragm/shutter blade device 170 is constructed by a shutter blade member 171, a shutter motor 172 of a reversible rotation type, a shutter motor driving circuit 173 and a blade position detecting means 174.

For example, the shutter blade member 171 is constructed by two blades. The shutter motor 172 of a reversible rotation type opens and closes this shutter blade member 171 by a reciprocating rotation thereof. The shutter motor driving circuit 173 rotates this shutter motor 172 in normal and reverse directions on the basis of the calculated exposure value of the above suitable exposure arithmetic circuit 169. The blade position detecting means 174 detects the starting position of an opening operation of the shutter blade member 171 and the completing position of a closing operation of this shutter blade member 171. The blade position detecting means 174 may detect time points of the opening and closing operations in the starting and completing positions.

An automatic stroboscope 175 automatically emits light in accordance with the distance and brightness of the photographed object at the photographing time. This automatic stroboscope 175 is constructed by a flash light emitting unit 176, a light intensity control circuit 177 for variably setting a guide number, and a light intensity arithmetic circuit 178.

The light intensity arithmetic circuit 178 calculates a light emitting amount in conformity with an exposure condition based on the information signal indicative of the photographing distance from the above drawing-out amount arithmetic circuit 164 and the calculated exposure value from the suitable exposure arithmetic circuit 169.

A pulse detecting circuit 181 is disposed within the camera 160 to control the operations of mechanically moved members. The pulse detecting circuit 181 can sequentially or simultaneously detect and process all digital control signals or pulse signals generated from the above first and second digital signal generating means 126 to 129, the base frame position detecting means 131,132, the rear group holding frame position detecting means 141,142, and the blade position detecting means 174 in accordance with sequential control.

A lens frame moving motor driving circuit 182 sequentially or simultaneously rotates the above first motor 110 and the second motor 121.

A motor control circuit 183 controls operations of the above shutter motor driving circuit 173 and the lens frame moving motor driving circuit 182 based on commands from a general control circuit 190 described later.

A zooming operation member 184 has a suitable structure for performing a zooming operation. The zooming operation member 184 can manually operate the above base frame 104, the rear group holding frame 107 and a zoom finder 161 arbitrarily from a wide angle side to a telescopic side, or from the telescopic side to the wide angle side.

A zooming signal generating circuit 185 converts operating amounts of the zooming operation member 184 in telescopic and wide angle directions to electric signals.

A zoom ratio judging circuit 186 is connected to the general control circuit 190.

This zoom ratio judging circuit 186 judges on the basis of an electric signal inputted from the zooming signal generating circuit 185 whether or not an operating amount of the zooming operation member 184 indicates a prescribed zoom ratio for realizing each of the above focal lengths f1 to f10 at ten stages. When the prescribed zoom ratio is indicated, each of prescribed zoom ratio signals $i_1$ to $i_{10}$ indicative of this prescribed zoom ratio is outputted from the zoom ratio judging circuit 186 to the general control circuit 190. In contrast to this, when no prescribed zoom ratio is indicated, each of prescribed zoom ratio signals $i_1$ to $i_{10}$ indicative of a closest prescribed zoom ratio in signal quantity is outputted from the zoom ratio judging circuit 186 to the general control circuit 190.

For example, the general control circuit 190 is constructed by a suitable microcomputer. This general control circuit 190 includes the sequential control circuit 191 and a data memory circuit 192. A switching unit 193 is connected to this general control circuit 190.

The sequential control circuit 191 is constructed such that sequential photographing operations similar to those in a general camera are executed. The sequential control circuit 191 is also constructed such that sequential control operations required to perform zooming and focusing controls explained in items of construction and operation described later can be executed.

The data memory circuit 192 stores data of the front lens group $L_1$ on two moving lines a and a' and data of the rear lens group $L_2$ on three moving lines b, b' and c required to realize the focal lengths f1 to f10 at ten stages. The data memory circuit 192 also stores data for setting distances G1 to G10 between the front lens group $L_1$ and the rear lens group $L_2$. The data memory circuit 192 also stores data for determining the number of rotations of the first motor 110 and the number of rotations of the second motor 121 required to control moving amounts of the base frame 104 and the rear group holding frame 107 when the above body tube device 101 is reduced in length at a storing time thereof and the zooming operation is performed. The data memory circuit 192 also stores data required to take a stroboscopic photograph.

The switching unit 193 has an operating switch for changing an operating state of the camera or the varifocal lens to a using state thereof. The switching unit 193 also has a photographing mode selecting switch for selecting one of normal and stroboscopic photographs. The switching unit 193 further has a macroscopic selecting switch for enabling a macroscopic photograph, and a release switch. These switches are not shown in the drawings.

The following description relates to a moving/stopping control method for stopping each of the base frame 104 and the rear group holding frame 107 in a storing position, a standby position and an optically designed position. The following description also relates to a position setting method for setting each of positions of the base frame 104 and the rear group holding frame 107 determined by using this moving/stopping control method.

The moving/stopping control method and the position setting method will first be described when the base frame 104 and the rear group holding frame 107 are stored in respective storing positions ZHf and ZHr.

In the second embodiment, a storing position of the base frame 104 is set to the base frame storing position ZHf shown in FIG. 20 when the body tube device is reduced in length at the storing time thereof. This position ZHf is set as a position close to the film face F as much as possible within a range in which no base frame 104 comes in contact with an internal structure of the camera around the film face F.

At this time, a storing position of the rear group holding frame 107 is set to the leftmost frame end position ZHr shown in FIG. 21. This position ZHr is a position located on the side of a photographing field from a moving range of the rear group holding frame 107 at the zooming and focusing times at a telescopic end of the varifocal lens. This position ZHr is set such that no rear portion of the rear group holding frame 107 is projected toward the film face F from a rear end portion of the base frame 104 when the rear group holding frame 107 is moved to the leftmost frame end position ZHr.

Further, in this embodiment, in a shortening operation enabling position for shortening the length of the body tube device 101, the base frame 104 is located in a standby line position Z1f on a standby line a' relative to the focal length f1 at the wide angle end of the varifocal lens. Further, in this shortening operation enabling position, the rear group holding frame 107 is located in an optically designed position Z1r on a moving line b at the time of an infinite photographing distance relative to the focal length f1 at the wide angle end of the varifocal lens.

In this embodiment, the moving/stopping control method with respect to the base frame 104 and the rear group holding frame 107 is set as follows.

(a) A case in which the base frame 104 is stored or moved from the standby line position (or the shortening operation enabling position) Z1f to the base frame storing position ZHf.

In this case, the first motor 110 is rotated at a high speed until the first sliding contact piece 131 comes in contact with a left-hand edge portion of the above storing position setting plate 134. Thus, the base frame 104 is moved toward the film face F at a high speed.

The number of rotations of the first motor 110 begins to be counted by using a turning-on signal (o) generated when the first sliding contact piece 131 comes in contact with the above left-hand edge portion. When a predetermined rotational number of the first motor 110 is obtained at a time point shown by a mark (·), the first motor 110 is rotated at a constant speed by rotational control.

Thereafter, the number of rotations of the first motor 110 having the constant rotational speed is again counted. When a predetermined rotational number of the first motor 110 is obtained at a time point shown by a mark (x), an operation of the varifocal lens is controlled such that current supplying paths of the first motor 110 are shunted.

In such control, the movement of the base frame 104 is stopped when a short time has passed since the current supplying paths of the first motor 110 began to be shunted.

A shunting time of the first motor 110 is substantially made constant by a motor structure. Accordingly, the base frame 104 is stopped at any time in a position provided when a constant time has passed since the above turning-on signal (o) were generated. Namely, the base frame 104 is stopped at any time in a position separated by a constant distance from the left-hand edge portion of the storing position setting plate 134.

Accordingly, the base frame 104 can be exactly stopped in the base frame storing position ZHf if a mechanical structural distance on the body tube device 101 from the film face F to the left-hand edge portion of the storing position setting plate 134 is set to a suitable distance and the two predetermined rotational numbers of the first motor 110 are set to suitable numbers in advance such that the above stopping position of the base frame 104 is in conformity with the above base frame storing position ZHf.

(b) A ease in which the rear group holding frame 107 is stored or moved to the leftmost frame end position ZHr from the optically designed position (or the shortening operation enabling position) Z1r.

In this case, the second motor 121 is rotated at a high speed until the second sliding contact piece 141 comes in contact with a right-hand edge portion of the above leftmost frame end setting plate 145. Thus, the rear group holding frame 107 is moved toward the photographing field at a high speed.

The operation of the varifocal lens is controlled such that current supplying paths of the second motor 121 begin to be shunted by using a turning-on signal (x) generated when the second sliding contact piece 141 comes in contact with the above right-hand edge portion.

In such control, the rear group holding frame 107 is stopped in a position approximately separated by a predetermined distance from the right-hand edge portion of the leftmost frame end setting plate 145.

Accordingly, the rear group holding frame 107 can be exactly stopped in the leftmost frame end position ZHr if a mechanical structural distance on the base frame 104 from a moving range of the rear group holding frame 107 at the zooming time to the right-hand edge portion of the leftmost frame end setting plate 145 is set to a suitable distance and two predetermined rotational numbers of the second motor 121 are set to suitable numbers in advance such that this stopping position provided by the second motor 121 is in conformity with the leftmost frame end position ZHr.

To enable such control, the relation between the two predetermined rotational numbers of the first motor 110 and a setting position of the left-hand edge portion of the storing position setting plate 134 relative to the base frame 104 is set as mentioned above in this embodiment. Further, to enable such control, the relation between the two predetermined rotational numbers of the second motor 121 and a setting position of the right-hand edge portion of the leftmost frame end setting plate 145 relative to the rear group holding frame 107 is set as mentioned above in this embodiment.

In the camera or the varifocal lens using a system for shortening the length of the body tube device 101, it is necessary to pull or move the base frame 104 and the rear group holding frame 107 from their storing positions to usable positions when the camera or the varifocal lens is used.

Therefore, in this embodiment, these usable positions are set to starting positions at the zooming time. The above shortening operation enabling position Z1f or Z1r is set as each of the starting positions.

In this embodiment, the moving/stopping control method with respect to the base frame 104 and the rear group holding frame 107 at a pulling time thereof is set as follows.

(c) A case in which the base frame 104 is pulled or moved from the storing position ZHf to the starting position (or the shortening operation enabling position) Z1f at the zooming time.

In this case, the first motor 110 is rotated at a high speed until the first sliding contact piece 131 comes in contact with a right-hand edge portion of the above base frame control plate Pf1. Thus, the base frame 104 is moved toward the photographing field at a high speed.

A rotational direction of the first motor 110 is reversed by using a turning-on signal (v) having a low voltage level and generated when the first sliding contact piece 131 comes in contact with the above right-hand edge portion. Thus, the base frame 104 is moved toward the film face F in an opposite direction.

Further, the operation of the varifocal lens is controlled such that the current supplying paths of the first motor 110 are shunted by using a turning-off signal (x) having a high voltage level and generated when the first sliding contact piece 131 reversed toward the film face F is moved outside the right-hand edge portion of the base frame control plate Pf1.

In such control, the movement of the base frame 104 is stopped at a constant time point after the shunt of the current supplying paths of the first motor 110. Namely, the base frame 104 is stopped in a position separated by a constant distance from the right-hand edge portion of the base frame control plate Pf1.

Accordingly, the base frame 104 can be stopped in the standby line position (or the shortening operation enabling position) Z1f if a mechanical structural distance on the body tube device 101 from the right-hand edge portion of the base frame control plate Pf1 to the standby line position Z1f is set in advance such that this stopping position provided by the first motor 110 is in conformity with the standby line position Z1f of the base frame 104 relative to the focal length f1.

The stopping position of the base frame 104 at this time is an intermediate set position for again moving the base frame 104 in a subsequent focusing operation. Therefore, it is not necessary to set this stopping position with high accuracy.

(d) A case in which the rear group holding frame 107 is pulled or moved from the leftmost frame end position ZHr to the starting position (or the optically designed position) Z1r at the zooming time.

In this case, the second motor 121 is rotated at a high speed until the second sliding contact piece 141 comes in contact with a left-hand edge portion of the rear group holding frame control plate Pr1. Thus, the rear group holding frame 107 is moved toward the film face F at a high speed.

The number of rotations of the second motor 121 begins to be counted by using a turning-on signal (o) having a low voltage level and generated when the second sliding contact piece 141 comes in contact with the above left-hand edge portion. Further, when a predetermined rotational number of the second motor 121 is obtained at a time point shown by a mark (·), the second motor 121 is rotated at a constant speed.

Thereafter, the number of rotations of the second motor 121 having the constant rotational speed is again counted. When a predetermined rotational number of the second motor 121 is then obtained at a time point shown by a mark (x), the operation of the varifocal lens is controlled such that the current supplying paths of the second motor 121 are shunted.

In such control, the rear group holding frame 107 is exactly stopped at any time in a position separated by a constant distance from the left-hand edge portion of the rear group holding frame control plate Pr1.

Accordingly, the rear group holding frame 107 can be exactly stopped in the optically designed position (or the shortening operation enabling position) Z1r if the rotational numbers of the second motor 121 are set in advance in consideration of a mechanical structural distance on the base frame 104 from the left-hand edge portion of the rear group holding frame control plate Pr1 to the stopping position such that this stopping position provided by the second motor 121 is in conformity with the optically designed position Z1r of the rear group holding frame 107 relative to the focal length f1.

At this time, the rear group holding frame 107 is stopped in a fixed position in a subsequent focusing operation. Accordingly, this stopping position of the rear group holding frame 107 is exactly set by using a constant rotational speed operation of the second motor 121.

In this second embodiment, the length of the body tube device 101 can be reduced in accordance with necessity when the base frame 104 and the rear group holding frame 107 are located in positions corresponding to the telescopic end of the varifocal lens. Namely, the length of the body tube device 101 can be reduced in accordance with necessity when the base frame 104 is located in an optically designed position about a focal length f10 and the rear group holding frame 107 is located in a standby position about the focal length f10. This optically designed position is located on a moving line a (see FIG. 17). The standby position is located on a moving line b'.

The next description relates to a moving/stopping control method with respect to the base frame 104 and the rear group holding frame 107 at the zooming and focusing times, and a position setting method for setting stopping positions of these frames 104 and 107 determined by using this moving/stopping control method.

As mentioned above, in this embodiment, a moving operation of the base frame 104 is set at the zooming time and a moving direction of the base frame 104 is set at the focusing time. Further, moving operation and direction of the rear group holding frame 107 are respectively set at the zooming and focusing times. An operation for setting distances G1 to G10 between the front lens group $L_1$ and the rear lens group $L_2$ at the time of an infinite photographing distance is set as one operation during the focusing operation.

The focusing operation including this operation for setting the distances G1 to G10 is integrally constructed by the following continuous operations at two stages.

(1) The base frame 104 or the rear group holding frame 107 is moved at a high speed when the base frame 104 or the rear group holding frame 107 is moved until the standby line position.

(2) The base frame 104 or the rear group holding frame 107 is moved at a constant speed just before at least a focusing position in the moving operation of the base frame 104 or the rear group holding frame 107 from the standby line position to the focusing position.

Accordingly, in the following description, these integrated focusing operation is called a zooming/focusing operation.

The moving/stopping control method about a focusing region for focal lengths f1 and f2 in the simultaneous lens moving system and the position setting method for setting stopping positions of the base frame 104 and the rear group holding frame 107 determined by this moving/stopping control method will next be described in accordance with separate operations of the varifocal lens at the zooming time.

(e) A case in which the base frame 104 is moved from a starting position $Z1f$ at the zooming time as the shortening operation enabling position to a standby line position $Z2f$ at a focal length f2 and is stopped in this standby line position.

In this case., moving and stopping controls are similar to those performed when the base frame 104 is pulled or moved from the storing position ZHf to the shortening operation enabling position (or the starting position at the zooming time) $Z1f$.

Namely, the first motor 110 is rotated at a high speed until the first sliding contact piece 131 comes in contact with a right-hand edge portion of the base frame control plate Pf2 relative to the focal length f2. Thus, the base frame 104 is moved toward the photographing field at a high speed.

A rotational direction of the first motor 110 is reversed by using a turning-on signal (v) generated when the first sliding contact piece 131 comes in contact with the above right-hand edge portion. Thus, the base frame 104 is moved toward the film face F in an opposite direction.

Further, the operation of the varifocal lens is controlled such that the current supplying paths of the first motor 110 are shunted by using a turning-off signal (x) generated when the first sliding contact piece 131 reversed toward the film face F is located outside the right-hand edge portion of the base frame control plate Pf2.

When such moving and stopping operations of the base frame 104 are performed, the rear group holding frame 107 must be synchronously moved to the optically designed position $Z2r$ at the focal length f2 from the starting position $Z1r$ at the zooming time as the shortening operation enabling position, and must be stopped in this optically designed position $Z2r$.

In this case, the moving/stopping control method of the rear group holding frame 107 is set as follows.

(f) In this case, the second motor 121 is rotated at a high speed until the second sliding contact piece 141 exceeds the rear group holding frame control plate Pt2 as a target relative to the focal length f2 and comes in contact with a right-hand edge portion of the next rear group holding frame control plate Pr3. Thus, the rear group holding frame 107 is moved toward the photographing field at a high speed.

A rotational direction of the second motor 121 is reversed by using a turning-on signal (v) generated when the second sliding contact piece 141 comes in contact with the right-hand edge portion of the control plate Pr3. Thus, the rear group holding frame 107 is moved toward the film face F in an opposite direction.

Further, the number of rotations of the second motor 121 begins to be counted by using a turning-on signal (o) generated when the second sliding contact piece 141 reversed toward the film face F comes in contact with a left-hand edge portion of the rear group holding frame control plate Pr2 as a target relative to the focal length f2. When a predetermined rotational number of the second motor 121 is obtained at a time point shown by a mark (·), constant rotational speed control of the second motor 121 is started.

Thereafter, the number of rotations of the second motor 121 having a constant rotational speed is again counted. When a predetermined rotational number of the second motor 121 is then obtained at a time point shown by a mark (x), the operation of the varifocal lens is controlled such that the current supplying paths of the second motor 121 are shunted.

When a zooming operation is performed, it is naturally considered to move the base frame 104 from a photographing field side toward the film face F in addition to a moving operation in which the base frame 104 is moved from a side of the film face F toward the photographing field. In this case, the sides of the film face F and the photographing field are respectively set to the wide angle and telescopic sides.

In this case, the moving/stopping control methods of the base frame 104 and the rear group holding frame 107 are set as follows.

(g) A case in which the base frame 104 is moved from the standby line position $Z2f$ at the focal length f2 to a standby line position $Z1f$ at the focal length f1 as a base frame starting position at the zooming time, and is stopped in this standby line position $Z1f$. Otherwise, a case in which the base frame 104 is moved from a focusing region for focal lengths f3 to f10 in the rear focusing system to standby line positions $Z1f$ and $Z2f$ relative to the focal lengths f1 and f2, and is stopped in the standby line positions $Z1f$ and $Z2f$.

In this case, the first motor 110 is rotated at a high speed until the first sliding contact piece 131 reaches a position of the right-hand edge portion of the base frame control plate Pf1 or Pf2 as a target relative to the focal lengths f1 and f2. Thus, the base frame 104 is moved toward the film face F at a high speed.

The operation of the varifocal lens is controlled such that the current supplying paths of the first motor 110 are shunted by using a turning-off signal (x) generated when the first sliding contact piece 131 is located outside the right-hand edge portion of the base frame control plate Pf1 or Pf2 as a target.

(h) A case in which the rear group holding frame 107 is moved from the optically designed position $Z2r$ at the focal length f2 to the optically designed position $Z1r$ at the focal length f1 as a starting position of the rear group holding frame at the zooming time, and is stopped in the optically designed position $Z1r$. Otherwise, a case in which the rear group holding frame 107 is moved from the focusing region for the focal lengths f3 to f10 in the rear focusing system to the optically designed positions $Z1f$ and $Z2f$ relative to the focal lengths f1 and f2, and is stopped in the optically designed positions $Z1f$ and $Z2f$.

In this case, the second motor 121 is rotated at a high speed until the second sliding contact piece 141 reaches a position of the left-hand edge portion of the rear group holding frame control plate Pr1 or Pr2 as a target relative to the focal lengths f1 and f2. Thus, the rear group holding frame 107 is moved toward the film face F at a high speed.

The number of rotations of the second motor 121 begins to be counted by using a turning-on signal (o) generated when the second sliding contact piece 141 comes in contact with the left-hand edge portion of the rear group holding frame control plate Pr1 or Pr2 as a target. Further, when a predetermined rotational number of the second motor 121 is obtained at a time point shown by a mark (·), the second motor 121 is rotated at a constant speed.

Thereafter, the number of rotations of the second motor 121 having the constant rotational speed is again counted. When a predetermined rotational number of the second motor 121 is then obtained at a time point shown by a mark (x), the operation of the varifocal lens is controlled such that the current supplying paths of the second motor 121 are shunted.

In the above-mentioned controls with respect to the items (e) to (h), the base frame 104 and the rear group holding frame 107 are stopped at any time in positions separated by constant distances from the right-hand edge portions of the base frame control plates Pf1 and Pf2, or the left-hand edge portions of the rear group holding frame control plates Pr1 and Pr2.

At this time, in the stopping positions Z1f and Z2f of the base frame 104, the base frame 104 is again moved in a subsequent focusing operation. Accordingly, it is not necessary to set the stopping positions of the base frame 104 with high accuracy. In contrast to this, the stopping positions Z1r and Z2r of the rear group holding frame 107 are fixed in the subsequent focusing operation. Accordingly, the stopping positions of the rear group holding frame 107 are exactly set by using the constant rotational speed operation of the second motor 121.

Thus, the base frame 104 and the rear group holding frame 107 are moved to the standby line positions or the optically designed positions relative to the focal lengths f1 and f2. Thereafter, a focusing operation of the varifocal lens is performed in the simultaneous lens moving system.

Figure 22:
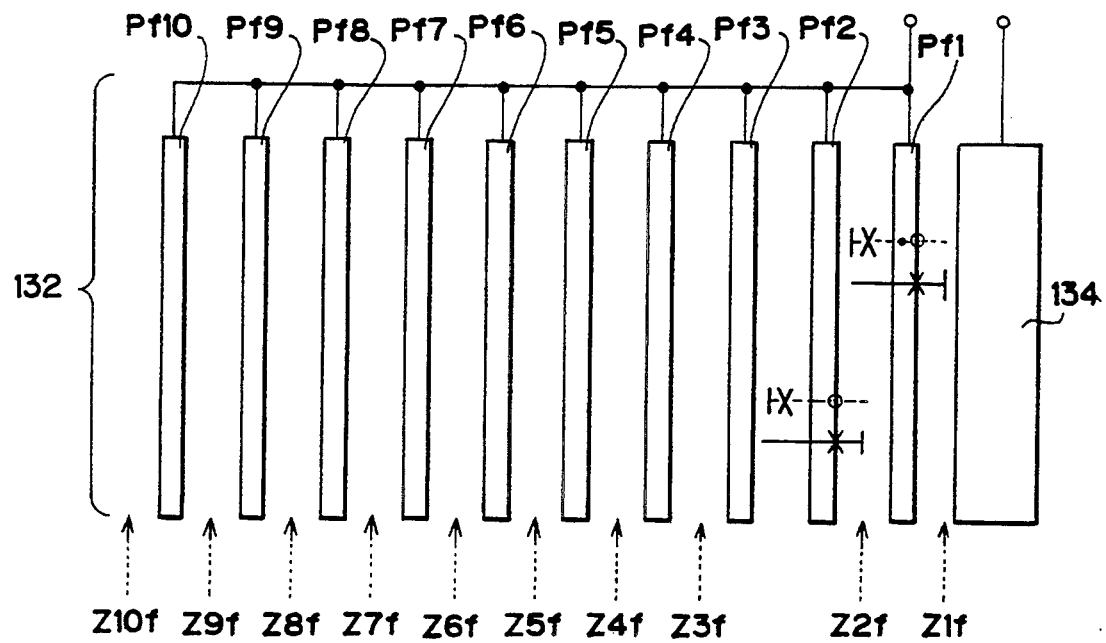
FIG. 22 is a pattern constructional view for explaining a focusing operation of the base frame at each of focal lengths of the varifocal lens.

As shown in FIG. 22, this focusing operation using the simultaneous lens moving system is performed by moving the base frame 104 toward the photographing field by a focusing amount according to a photographing distance in a state in which the rear group holding frame 107 is stopped in the optically designed position Z1r or Z2r at the focal length f1 or f2 as shown in FIG. 21.

In this embodiment, the moving/stopping control method of the base frame 104 is set as follows.

(i) The first motor 110 is rotated at a high speed until the first sliding contact piece 131 is moved from the standby line position Z1f or Z2f to the right-hand edge portion of the rear group holding frame control plate Pf1 or Pf2 relative to the focal length f1 or f2. Thus, the base frame 104 is moved toward the photographing field at a high speed.

The first motor 110 is rotated at a constant speed when a predetermined rotational number of the first motor 110 is obtained at a time point shown by a mark (·). Further, the number of rotations of the first motor 110 having the constant rotational speed is again counted. When a set rotational number of the first motor 110 corresponding to a focusing amount is obtained at a time point shown by a mark (x), the operation of the varifocal lens is controlled such that the current supplying paths of the first motor 110 are shunted.

In such control, as mentioned above, the base frame 104 is stopped in a position corresponding to the focusing amount after a constant time has passed since the current supplying paths of the first motor 110 were shunted. Namely, a suitable focusing operation at a photographing distance is performed.

Finally, the moving/stopping control method about the focusing region for the focal lengths f3 to f10 in the rear focusing system, and the position setting method for setting stopping positions of the base frame 104 and the rear group holding frame 107 determined by this moving/stopping control method will be described in accordance with separate operations of the varifocal lens at the zooming time.

(j) A case in which the base frame 104 is moved from the focusing region for the focal lengths f1 and f2 including the starting position Z1f at the zooming time in the simultaneous lens moving system to optically designed positions Z3f to Z10f at the focal lengths f3 to f10 within the focusing region in the rear focusing system, and is then stopped in the optically designed positions Z3f to Z10f. Otherwise, a case in which a focal length of the varifocal lens is changed by performing a zooming operation toward the photographing field within the focusing region in the rear focusing system.

In this case, the first motor 110 is rotated at a high speed until the first sliding contact piece 131 comes in contact with a right-hand edge portion of each of base frame control plates Pf3 to PF10 as a target relative to the focal lengths f3 to f10. Thus, the base frame 104 is moved toward the photographing field at a high speed.

The number of rotations of the first motor 110 then begins to be counted by using a turning-on signal (o) generated when the first sliding contact piece 131 comes in contact with the right-hand edge portion of each of the base frame control plates Pf3 to PF10 as a target. When a predetermined rotational number of the first motor 110 is obtained at a time point shown by a mark (·), the first motor 110 is rotated at a constant speed.

Thereafter, the number of rotations of the first motor 110 having the constant rotational speed is again counted. When a predetermined rotational number of the first motor 110 is then obtained at a time point shown by a mark (x), the current supplying paths of the first motor 110 are shunted.

When such moving and stopping operations of the base frame 104 are performed, the rear group holding frame 107 must be synchronously moved from the focusing region for the focal lengths f1 and f2 in the above simultaneous lens moving system to each of standby line positions Z3r to Z10r at the focal lengths f3 to f10 within the focusing region in the rear focusing system, and must be stopped in the standby line positions Z3r to Z10r. Otherwise, the rear group holding frame 107 must be synchronously moved and stopped within the focusing region in the rear focusing system.

In this case, the moving/stopping control method of the rear group holding frame 107 is set as follows.

(k) A case in which the rear group holding frame 107 is stopped in each of the standby line positions Z3r to Z10r at the focal lengths f3 to f10 as third to tenth target focal lengths.

In this case, the second motor 121 is rotated at a high speed until the second sliding contact piece 141 reaches a left-hand edge portion of each of rear group holding frame control plates Pr3 to Pr8 relative to the target focal lengths f3 to f8, or reaches a right-hand edge portion of the leftmost frame end setting plate 145. Thus, the rear group holding frame 107 is moved toward the photographing field at a high speed.

A turning-off signal is generated when the second sliding contact piece 141 is located outside the left-hand edge portion of each of the rear group holding frame control plates Pr3 to Pr8 as a target. A turning-on signal is generated when the second sliding contact piece 141 comes in contact with a left-hand edge portion of the leftmost frame end setting plate 145. The turning-off or turning-on signal is shown by a mark (x). The operation of the varifocal lens is controlled such that the current supplying paths of the second motor 121 are shunted by the turning-off or turning-on signal.

In the case of a standby line position Z9r at a target focal length f9, the second motor 121 is rotated at a high speed until the second sliding contact piece 141 reaches a left-hand edge portion of a rear group holding frame control plate Pt9 relative to the ninth focal length f9. Thus, the rear group holding frame 107 is moved toward the photographing field at a high speed.

The number of rotations of the first motor 110 begins to be counted by using a turning-off signal (x) generated when the second sliding contact piece 141 is located outside the left-hand edge portion of the ninth rear group holding frame control plate Pr9. When a predetermined rotational number of the first motor 110 is obtained, the operation of the varifocal lens may be controlled such that the current supplying paths of the first motor 110 are shunted.

The moving/stopping control method with respect to each of the base frame 104 and the rear group holding frame 107 is set as follows when a focal length of the varifocal lens is changed by moving the base frame 104 and the rear group holding frame 107 from the telescopic side to the wide angle side within the focusing region in the rear focusing system.

(1) A case in which the base frame 104 is moved toward the film face F within a range of optically designed positions Z10f to Z3f at the focal lengths f10 to f3, and is stopped in a standby line position Z5f at a target focal length such as f5.

In this case, the first motor 110 is rotated at a high speed until the first sliding contact piece 131 reaches a right-hand edge portion of a base frame control plate Pf5 relative to the target focal length f5. Thus, the base frame 104 is moved toward the film face F at a high speed.

As shown in FIG. 20, a rotational direction of the first motor 110 is then reversed by using a turning-off signal (v) generated when the first sliding contact piece 131 is located outside this right-hand edge portion.

The number of rotations of the first motor 110 begins to be counted by using a turning-on signal (o) generated when the first sliding contact piece 131 revered toward the photographing field again comes in contact with this right-hand edge portion of the base frame control plate Pf5. When a predetermined rotational number of the first motor 110 is obtained at a time point shown by a mark (·), the first motor 110 is rotated at a constant speed.

Thereafter, the number of rotations of the first motor 110 having the constant rotational speed is again counted. When a predetermined rotational number of the first motor 110 is obtained by a time point shown by a mark (x), the operation of the varifocal lens is controlled such that the current supplying paths of the first motor 110 are shunted.

(m) A case in which the rear group holding frame 107 is moved toward the film face F within a range of standby line positions Z10r to Z3r at the focal lengths f10 to f3, and is stopped in a standby line position Z5r at a target focal length such as f5.

In this case, the second motor 121 is rotated at a high speed until the second sliding contact piece 141 exceeds a rear group holding frame control plate Pr5 relative to the target focal length f5 and reaches a left-hand edge portion of the next rear group holding frame control plate Pr4 located on a side of the film face F. Thus, the rear group holding frame 107 is moved toward the film face F at a high speed.

As shown in FIG. 21, a rotational direction of the second motor 121 is reversed by using a turning-on signal (v) generated when the second sliding contact piece 141 comes in contact with this left-hand edge portion. The operation of the varifocal lens is controlled such that the current supplying paths of the second motor 121 are shunted by using a turning-off signal (x) generated when the second sliding contact piece 141 reversed toward the photographing field is located outside the left-hand edge portion of the rear group holding frame control plate Pr5 as a target.

In the above-mentioned controls with respect to the items (j) to (m), the base frame 104 and the rear group holding frame 107 are stopped at any time when a constant time has passed since the current supplying paths of each of the first and second motors 110 and 121 were shunted. Namely, the base frame 104 and the rear group holding frame 107 are stopped at any time in positions separated by constant distances from the right-hand edge portion of each of the base frame control plates Pf3 to Pf10, or the left-hand edge portion of each of the rear group holding frame control plates Pr3 to Pr10.

Mechanical structural distances can be suitably set from the film face F to a right-hand edge portion of each of the base frame control plates Pf3 to Pf10 and a left-hand edge portion of each of the rear group holding frame control plate Pr3 to Pr10. Predetermined rotational numbers of the first and second motors 110 and 121 can be suitably set at these mechanical structural distances. These mechanical structural distances and these predetermined rotational numbers can be suitably set in advance such that signal generating edge portions of the respective control plates Pf3 to Pr10 and Pr3 to Pr10 are in conformity with positions of the base frame 104 and the rear group holding frame 107 provided after constant times have passed since the respective current supplying paths of the first and second motors 110 and 121 began to be shunted. In such a case, the base frame 104 and the rear group holding frame 107 can be stopped in optically designed positions (Z3f to Z10f) or standby line positions (Z3r to Z10r) as targets.

In this case, in the stopping positions Z3r to Z10r of the rear group holding frame 107, the rear group holding frame 107 is again moved in a subsequent focusing operation. Accordingly, it is not necessary to set the stopping positions of the rear group holding frame 107 with high accuracy. In contrast to this, the stopping positions Z3f to Z10f of the base frame 104 are fixed in the subsequent focusing operation. Accordingly, the stopping positions Z3f to Z10f of the base frame 104 are exactly set by using a control operation of the first motor having a constant rotational speed.

Thus, the base frame 104 and the rear group holding frame 107 are moved to the optically designed positions or the standby line positions relative to the focal lengths f3 to f10. Thereafter, a focusing operation using the rear focusing system is performed.

Figure 23:
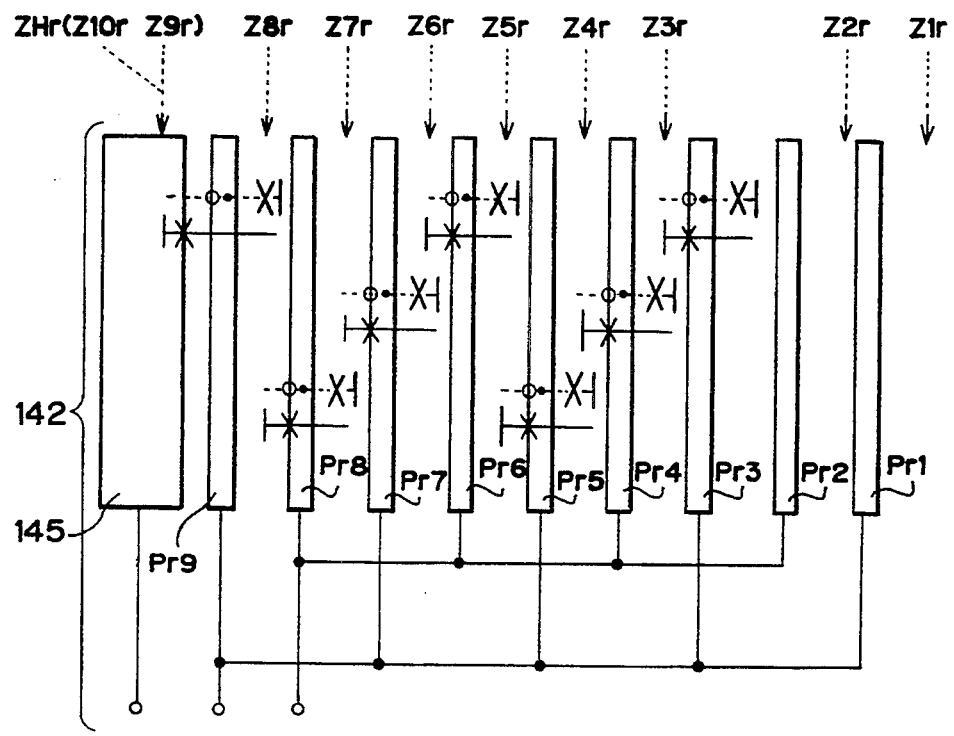
FIG. 23 is a pattern constructional view for explaining a focusing operation of the rear group holding frame at each of the focal lengths.

As shown in FIG. 22, this focusing operation using the rear focusing system is performed by moving only the rear group holding frame 107 toward the film face F by a focusing amount according to a photographing distance within the base frame 104 as shown in FIG. 23 in a state in which the base frame 104 is stopped in each of the optically designed positions Z3f to Z10f at the focal lengths f3 to f10.

In this embodiment, the moving/stopping control method of the rear group holding frame 107 in this case is set as follows.

(n) The second motor 12i is rotated at a high speed until the second sliding contact piece 141 is moved from each of the standby line positions Z3r to Z10r to a left-hand edge portion of each of the rear group holding frame control plates Pr3 to Pr9 relative to the focal lengths f3 to f10. Thus, (he rear group holding frame 107 is moved toward the film face F at a high speed.

The second motor 121 is rotated at a constant speed when a predetermined rotational number of the second motor 121 is obtained at a time point shown by a mark (·). Further, the number of rotations of the second motor 121 having the constant rotational speed is again counted. When a required rotational number of the second motor 121 is then obtained at a time point (x), the operation of the varifocal lens is controlled such that the current supplying paths of the second motor 121 are shunted.

In such control, it is possible to perform a suitable focusing operation in accordance with a photographing distance similar to the focusing operation in the focusing region in the simultaneous lens moving system.

Operations of the driving device of the varifocal lens and the camera in the above second embodiment will next be described in accordance with separate operating items.

[I] Moving operation of the base frame 104.

A moving operation of the base frame 104 using the first motor 110 and a base frame driving system having constructional elements 110 to 120 will first be described with reference to FIGS. 16 and 24.

When the base frame 104 is moved forward and backward along an optical axis, the first motor 110 is rotated in normal and reverse directions.

Namely, when the zooming operation member 184 and an unillustrated release switch within the switching unit 193 are operated, an operating signal of this switch is inputted from the switching unit 193 to the sequential control circuit 191. Thus, control commands for moving the base frame 104 are transmitted from this sequential control circuit 191 to the lens frame moving motor driving circuit 182 through the motor control circuit 183.

Accordingly, the first motor 110 is rotated in one of the normal and reverse directions on the basis of commands of the lens frame moving motor driving circuit 182. Rotational driving force of the first motor 110 is transmitted to the driving shaft 112 having an elliptical shape in cross section through the first driving gear 111 and the first driven gear 113. Further, the rotational driving force is transmitted to the driving transmission gear 115 by an action of the elliptical shape of the driving shaft 112 in cross section.

Therefore, the lower lead nut gear 116 receives this rotational driving force of the driving transmission gear 115 and is rotated in one of normal and reverse directions.

In this case, no fixed lead screw 119 can be rotated and moved in a direction of the optical axis. Accordingly, when the lead nut gear 116 is rotated, rotational force of this lead nut gear 116 acts as lead driving force between the lead nut gear 116 and the fixed lead screw 119.

As a result, this lead driving force is applied to the driving body tube 103 and the cover member 114. Thus, the driving body tube 103 and the cover member 114 are moved within the fixed body tube 102 in the direction of the optical axis.

At time time, a moving amount of the cover member 114 is finally determined by the number of rotations of the first motor 110 and a leading value of the fixed lead screw 119. A moving direction of the cover member 114 is determined by the rotational direction of the first motor 110.

The rotational driving force of the driving transmission gear 115 is also transmitted to the upper lead nut gear 117 through the associating gear 118. Accordingly, lead driving force is also caused by rotational force of the lead nut gear 117 between this upper lead nut gear 117 and the moving lead screw 120.

In this case, the moving lead screw 120 is fixed to a rear end portion of the base frame 104. Accordingly, this lead driving force is applied to the moving lead screw 120 such that the moving lead screw 120 is relatively moved within the driving body tube 103 and the cover member 114 in the direction of the optical axis.

At this time, a moving amount of the moving lead screw 120 with respect to the cover member 114 is determined by the number of rotations of the first motor 110 and a leading value of the moving lead screw 120. A moving direction of the moving lead screw 120 is equal to the above moving direction of the driving body tube 103 and the cover member 114.

Therefore, when the first motor 110 is rotated in the normal direction, the driving body tube 103 is moved by a lead driving amount of the fixed lead screw 119 toward a photographing field within the fixed body tube 102. Further, the base frame 104 is moved by a lead driving amount of the moving lead screw 120 toward the photographing field within the driving body tube 103. Finally, the base frame 104 is projected until a length of the body tube device 101 is longest. Namely, a front end of the body tube device 101 and the base frame 104 is projected as shown in FIG. 16.

When the first motor 110 is rotated in the reverse direction, the base frame 104 is moved toward the film face F within the driving body tube 103 and the driving body tube 103 is also moved toward the film face F within the fixed body tube 102. Finally, the lengths of the base frame 104 and the driving body tube 103 are reduced until the length of the body tube device 101 is shortest.

Namely, the base frame 104 is stored into the driving body tube 103 and the driving body tube 103 is stored into the fixed body tube 102.

[II] Moving operation of the rear group holding frame 107.

A moving operation of the rear group holding frame 107 using the second motor 121 and a rear group holding frame driving system having constructional elements 121 to 125 will next be described with reference to FIGS. 16 and 24.

When the rear group holding frame 107 is moved forward and backward along the optical axis, the second motor 121 is rotated in normal and reverse directions.

Namely, control commands for moving the rear group holding frame 107 are transmitted from the sequential control circuit 191 to the lens frame moving motor driving circuit 182 through the motor control circuit 183. The second motor 121 is rotated in one of the normal and reverse directions on the basis of commands of this lens frame moving motor driving circuit 182. Rotational driving force of the second motor 121 is transmitted to the rear group lead screw 123 through the second driving gear 122 and the second driven gear 124, thereby rotating the rear group lead screw 123.

In this case, no rear group lead screw 123 can be moved in the direction of the optical axis. Accordingly, when the rear group lead screw 123 is rotated, lead driving force is caused by rotational force of the rear group lead screw 123 between this rear group lead screw 123 and the rear group lead nut 125. Thus, the rear group holding frame 107 and the rear group lead nut 125 are moved in the direction of the optical axis.

At time time, a moving amount of the rear group holding frame 107 is finally determined by the number of rotations of the second motor 121 and a leading value of the rear group lead screw 123. A moving direction of the rear group holding frame 107 is determined by the rotational direction of the second motor 121.

Therefore, when the second motor 121 is rotated in the normal direction, the rear group holding frame 107 is moved toward the film face F by a lead driving amount of the rear group lead screw 123 within the base frame 104. Finally, the rear group holding frame 107 reaches the position of a rightmost end of the base frame 104 for realizing a lens group distance G1 at a focal length f1 of the varifocal lens at a wide angle end thereof. In contrast to this, when the second motor 121 is rotated in the reverse direction, the rear group holding frame 107 is moved toward the photographing field within the base frame 104. Finally, the rear group holding frame 107 reaches the above leftmost frame end position ZHr as a position for storing the rear group holding frame.

[III] Shortening operation of the body tube device 101.

The varifocal lens is constructed such that the length of the body tube device 101 can be shortened when the camera or the varifocal lens is not used, or is in an operating state before a photographing operation.

In this case, the length of the body tube device 101 is reduced after the base frame 104 and the rear group holding frame 107 are located in positions for realizing the focal length f1 at the wide angle end. However, the base frame 104 and the rear group holding frame 107 may be moved to storing positions thereof after these frames are once located in positions for realizing a focal length f10 at a telescopic end of the varifocal lens instead of the wide angle end. It is possible to arbitrary select these positions of the base frame 104 and the rear group holding frame 107 at a designing stage.

The shortening operation of the body tube device 101 will next be described with reference to FIGS. 20, 21 and 25 when the base frame 104 and the rear group holding frame 107 are located in the above positions at the focal length f1 at the wide angle end of the varifocal lens.

Figure 25:
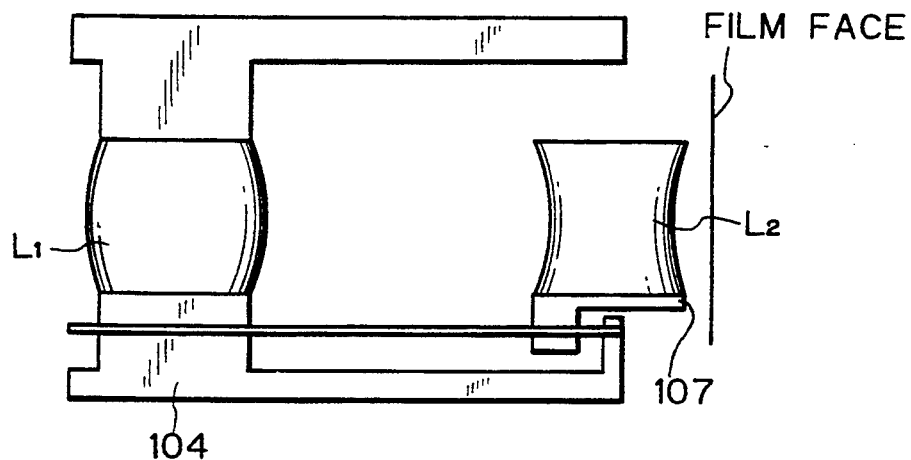
FIG. 25 is a typical constructional view for explaining the relation in position between the base frame and the rear group holding frame at storing times thereof, and showing a state in which the base frame and the rear group holding frame are located in relative positions for realizing a focal length f1 of the varifocal lens at a wide angle end thereof.

In this case, the relation in position between the base frame 104 and the rear group holding frame 107 is set as shown in FIG. 25. The shortening operation of the body tube device 101 is performed by the control methods described in the above items (a) and (b).

In this state, when a body tube shortening switch of the switching unit 193 or an unillustrated power switch is operated, the sequential control circuit 191 first judges whether or not the base frame 104 is located in the above position at the wide angle end of the varifocal lens. When the base frame 104 is located in this position, commands for shorting the length of the body tube device 101 are transmitted to the lens frame moving motor driving circuit 182 through the motor control circuit 183.

These commands are commands for moving the rear group holding frame 107 to the leftmost frame end position ZHr.

Accordingly, the lens frame moving motor driving circuit 182 rotates the second motor 121 in the reverse direction to move the rear group holding frame 107 toward the photographing field from a position shown in FIG. 25 within the base frame 104. At this time, the rear group holding frame 107 is moved in accordance with the moving operation thereof described in the above item [II].

When the rear group holding frame 107 begins to be moved, the forked sliding portion 141a of the second sliding contact piece 141 is moved on the rear group holding frame control pattern substrate 142 while this forked sliding portion 141a intermittently comes in contact with the rear group holding frame control plates Pr1 to Pr9. Thus, the forked sliding portion 141a comes in contact with a right-hand edge portion of the leftmost frame end setting plate 145.

A turning-on signal (x) is generated at this time and is outputted to the motor control circuit 183 through the pulse detecting circuit 181.

Accordingly, the sequential control circuit 191 confirms nine turning-on signals generated by the contact between the second sliding contact piece 141 and each of the rear group holding frame control plates Pr1 to Pr9. Thus, it is confirmed that the second sliding contact piece 141 has reached the right-hand edge portion of the leftmost frame end setting plate 145. The current supplying paths of the second motor 121 are shunted by using the above turning-on signal (x).

When the detected number of rotations of the second motor 121 is in conformity with a number indicated by predetermined control data stored to the above data memory circuit 192, commands for shunting the current supplying paths of the second motor 121 are transmitted to the motor control circuit 183 and the second digital signal generating means having constructional elements 128 and 129.

Figure 26:
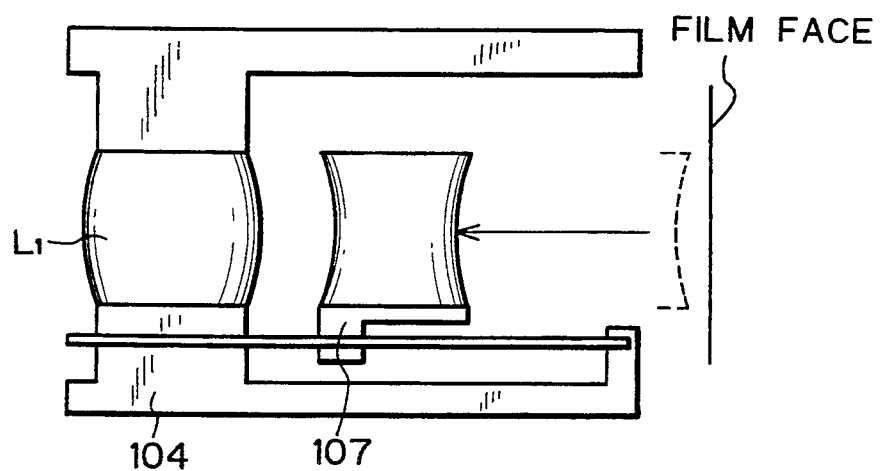
FIG. 26 is a typical constructional view showing a state in which only the rear group holding frame is completely moved to a storing position thereof.

Therefore, the rear group holding frame 107 is stopped in the leftmost frame end position ZHr as a position in which the rear group holding frame 107 is moved by a predetermined distance from a shunt starting position of the second motor 121. Namely, the rear group holding frame 107 is stored into the base frame 104 in its storing position as shown in FIG. 26.

When the storing operation of the rear group holding frame 107 is completed, control commands for moving the base frame 104 to a base frame storing position ZHf are transmitted from the sequential control circuit 191 to the lens frame moving motor driving circuit 182 through the motor control circuit 183.

Therefore, the lens frame moving motor driving circuit 182 rotates the first motor 110 in the reverse direction to move the driving body tube 103 and the base frame 104 toward the film face F from positions shown in FIG. 25. At this time, the base frame 104 is moved in accordance with the moving operation thereof described in the above item [I].

When the base frame 104 begins to be moved, the forked sliding portion 131a of the first sliding contact piece 131 is moved toward the film face F on the base frame control pattern substrate 132. This forked sliding portion 131a then comes in contact with a left-hand edge portion of the storing position setting plate 134. A turning-on signal (o) is generated at this time and is outputted to the motor control circuit 183 through the pulse detecting circuit 181.

Accordingly, the sequential control circuit 191 confirms that this turning-on signal is first generated so that the forked sliding portion 131a has reached the storing position setting plate 134. The sequential control circuit 191 gives commands to the first digital signal generating means having constructional elements 126 and 127 such that the number of rotations of the first motor 110 is detected on the basis of this turning-on signal (o).

Then, the number of rotations of the first motor 110 begins to be counted. When a predetermined rotational number of the first motor 110 is obtained at a time point (·), the first motor 110 is rotated at a constant speed by rotational control.

Thereafter, the number of rotations of the first motor 110 having the constant rotational speed is again counted. When a detected rotational number of the first motor 110 is in conformity with a number indicated by predetermined control data stored to the data memory circuit 192 at a time point (x), the current supplying paths of the first motor 110 are shunted by commands of the sequential control circuit 191.

Therefore, the base frame 104 is exactly stopped in the base frame storing position ZHf.

Figure 27:
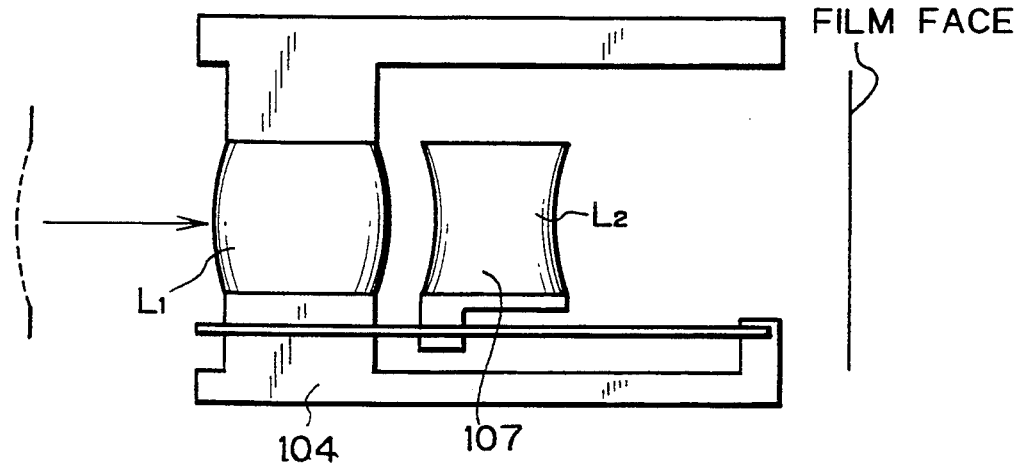
FIG. 27 is a typical constructional view showing a state in which the base frame and the rear group holding frame are completely moved to respective storing positions.

As a result, the base frame 104 and the rear group holding frame 107 are stored into storing spaces of the varifocal lens formed in front of the film face F in a state in which the relation in position between these frames is held as shown in FIG. 27. Thus, the length of the body tube device 101 is reduced to a designed length.

The shortening operation of the body tube device 101 will next be described when the base frame 104 and the rear group holding frame 107 are located in positions at the focal length fIO at the telescopic end of the varifocal lens.

In this case, the base frame 104 is located in the above position at the focal length fIO at the telescopic end. The rear group holding frame 107 is located in the leftmost frame end position ZHr. Therefore, the distance between the base frame 104 and the rear group holding frame 107 is very small in comparison with that at the wide angle end of the varifocal lens.

In this case, it is sufficient to move only the base frame 104 without moving the rear group holding frame 107. A control operation of the varifocal lens in this case is similar to that in the case of the above shortening operation of the body tube device 101 at the wide angle time of the varifocal lens. Therefore, this control operation is performed in accordance with the control method described in the above item (a).

Namely, when the body tube shortening switch is operated, the sequential control circuit 191 first judges whether or not the base frame 104 is located in a position at the focal length f1 at the telescopic end of the varifocal lens. When this position of the base frame 104 is confirmed, commands for shortening the length of the body tube device 101 are transmitted from the sequential control circuit 191 to the lens frame moving motor driving circuit 182 through the motor control circuit 183.

These commands are provided as commands for moving the rear group holding frame 107 to the leftmost frame end position ZHr. However, the rear group holding frame 107 is already located in this leftmost frame end position ZHr. Therefore, the next commands for moving the base frame 104 to the base frame storing position ZHf are transmitted to the lens frame moving motor driving circuit 182. A control operation of the varifocal lens with respect to these commands is similar to that in the case of the above shortening operation of the body tube device 101 at the wide angle time of the varifocal lens. Therefore, for brevity, a detailed explanation about this control operation is omitted in the following description.

In this case, the base frame 104 and the rear group holding frame 107 are also stored into the storing spaces of the varifocal lens formed in front of the film face F in a state in which the relation in position between these frames is held as shown in FIG. 27. Thus, the length of the body tube device 101 is reduced to a designed length.

[IV] Pulling-out operation of the body tube device 101.

As mentioned above, when the camera or the varifocal lens in this embodiment is used, the base frame 104 and the rear group holding frame 107 are pulled out and moved to respective starting positions Z1f and Z1r as positions for enabling the shortening operation at a zooming time of the varifocal lens.

Pulling-out operations of the base frame 104 and the rear group holding frame 107 are performed in accordance with the control methods described in the above items (c) and (d).

Namely, for example, an unillustrated operating or power switch of the camera or the varifocal lens is operated in a state in which the length of the body tube device 101 is shortened. Thus, as shown in FIG. 20, the base frame 104 is first moved toward the photographing field from the base frame storing position ZHf at a high speed. When the first sliding contact piece 131 then comes in contact with a right-hand edge portion of the base frame control plate Pf1, the base frame 104 is reversed and moved toward the film face F.

The current supplying paths of the first motor 104 are shunted by a turning-off signal (x) generated when the first sliding contact piece 131 is located outside the above right-hand edge portion. The base frame 104 is then stopped in a standby line position Z1f as a starting position thereof at the zooming time provided when a predetermined time has passed since the current supplying paths of the first motor 110 began to be shunted.

As shown in FIG. 21, the rear group holding frame 107 is moved toward the film face F from the leftmost frame end position ZHr at a high speed in synchronization with this moving operation of the base frame 104. The rear group holding frame 107 is then moved at a constant speed after a predetermined time from a time point at which the second sliding contact piece 141 comes in contact with a left-hand edge portion of the rear group holding frame control plate Pr1.

The current supplying paths of the second motor 121 are then shunted. The rear group holding frame 107 is stopped in an optically designed position Z1r as a starting position thereof at the zooming time after a predetermined time has passed since the current supplying paths of the second motor 121 began to be shunted.

Thus, the base frame 104 and the rear group holding frame 107 are pulled out and moved to the respective starting positions Z1f and Z1r at the zooming time as shown in FIG. 25.

[V] Zooming operation (1).

A zooming/focusing operation of the varifocal lens in this embodiment is performed in a state in which the base frame 104 and the rear group holding frame 107 are pulled out and moved to the respective starting positions Z1f and Z1r at the zooming time.

As mentioned above, the zooming/focusing operation of the varifocal lens is performed by separately moving the base frame 104 from a wide angle side to a telescopic side and moving this base frame 104 from the telescopic side to the wide angle side. The zooming/focusing operation will be first described with reference to pattern constructional views shown in FIGS. 20 and 21 and a flow chart shown in FIG. 28 when the base frame 104 is moved from the wide angle side to the telescopic side.

In the zooming/focusing operation for moving the base frame 104 from the wide angle side to the telescopic side, the zooming operation member 184 is manually operated from the wide angle side to the telescopic side.

Namely, when the zooming operation member 184 is operated on the telescopic side, an operating amount of the zooming operation member 184 is converted to an electric signal by the zooming signal generating circuit 185. This electric signal is outputted to the zoom ratio judging circuit 186. The zoom ratio judging circuit 186 transmits each of prescribed zoom ratio signals $i_1$ to $i_{10}$ to the sequential control circuit 191 in a step S1.

Therefore, commands for moving the base frame 104 and the rear group holding frame 107 toward the photographing field are transmitted from the sequential control circuit 191 to the lens frame moving motor driving circuit 182 through the motor control circuit 183 based on each of the prescribed zoom ratio signals.

Accordingly, in a step S2, the first motor 110 is rotated in the normal direction to move the base frame 104 toward the photographing field. The base frame 104 is moved until the next step S3 is executed. In the meanwhile, the second motor 121 is also rotated in the normal direction to move the rear group holding frame 107 toward the photographing field by one stepping amount. Then, the movement of the rear group holding frame 107 is stopped in a step S5.

If the zooming operation member 184 is continuously operated, the above processing operations are repeatedly performed in steps S6 and S7 and steps S3 to S6. In steps S7 to S10, the movement of the base frame 104 toward the photographing field is stopped if the base frame 104 reaches the telescopic end of the varifocal lens, thereby completing the above processing operations. If no base frame 104 reaches the telescopic end, the base frame 104 is continuously moved toward the photographing field while a user operates the zooming operation member 184.

In this case, a moving amount of the base frame 104 is transmitted to the zoom finder 161 through the suitable associating mechanism 162. Accordingly, the zoom finder 161 continuously displays a visual field corresponding to the moving amount of the base frame 104.

Therefore, while the user sees the visual field of the zoom finder 161, the base frame 104 is moved until the a desirable focal length of the varifocal lens providing a desirable photographing magnification is obtained. In the step S6, the operation of the zooming operation member 184 is stopped in a position providing the desirable focal length.

In the meanwhile, in a step S11, the sequential control circuit 191 controls an operation of the lens frame moving motor driving circuit 182 based on each of the prescribed zoom ratio signals $i_1$ to $i_{10}$ changed momentarily. In the step S11, the sequential control circuit 191 also controls the movements of the base frame 104 and the rear group holding frame 107 such that these frames are stopped in standby positions relative to the desirable focal length.

A control operation of the sequential control circuit 191 and operations of the base frame 104 and the rear group holding frame 107 will next be described on the basis of a concrete example.

For example, when a user desires a focal length f2 in the focusing region in the simultaneous lens moving system, the sequential control circuit 191 separately performs the control operations described in the above items (e) and (f). Thus, the base frame 104 and the rear group holding frame 107 are respectively moved from starting positions Z1f and Z1r at the zooming time to a standby line position Z2f and an optically designed position Z2r relative to the focal length f2. The base frame 104 and the rear group holding frame 107 are exactly stopped in the respective positions Z2f and Z2r.

When the operation of the zooming operation member 184 is stopped, a prescribed zoom ratio signal $i_2$ relative to the second focal length f2 and closest to an operating amount of the zooming operation member 184 is outputted from the zoom ratio judging circuit 186 to the sequential control circuit 191. Accordingly, the sequential control circuit 191 first rotates the first motor 110 in the normal direction. Thus, the base frame 104 is moved toward the photographing field until the first sliding contact piece 131 comes in contact with a right-hand edge portion of the base frame control plate Pf2.

At this time, the base frame 104 is moved in accordance with the moving operation thereof described in the above item [I].

In this case, the sequential control circuit 191 changes a moving direction of the base frame 104 by using a turning-on signal (∇) generated when the first sliding contact piece 131 comes in contact with this right-hand edge portion. Thereafter, the base frame 104 is moved to the standby line position Z2f by using a turning-off signal (x) generated when the first sliding contact piece 131 is located outside this right-hand edge portion. The sequential control circuit 191 controls the movement of the base frame 104 such that the base frame 104 is exactly stopped in this standby line position Z2f.

Further, the sequential control circuit 191 rotates the second motor 121 in the normal direction (simultaneously or sequentially) in synchronization with the movement of the base frame 104. The rear group holding frame 107 is moved at a high speed until the second sliding contact piece 141 exceeds a rear group holding frame control plate Pr2 relative to the focal length f2 and comes in contact with a left-hand edge portion of a rear group holding frame control plate Pr3 relative to a focal length f3. Then, the sequential control circuit 191 gives commands for rotating the second motor 121 in the reverse direction.

At this time, the rear group holding frame 107 is moved in accordance with the moving operation thereof described in the above item [II].

The number of rotations of the second motor 121 begins to be counted by using a turning-on signal (o) generated when the second sliding contact piece 141 comes in contact with this left-hand edge portion. Further, the rear group holding frame 107 is exactly stopped in the optically designed position Z2r as a target position by using two electric signals (·) and (x) generated subsequently.

As a result, the base frame 104 is stopped in a position on a standby line a' shown in FIG. 17 and relative to the focal length f2. A lens group distance G2 relative to the focal length f2 at the time of an infinite photographing distance is formed by the rear group holding frame 107.

The varifocal lens is constructed such that the rear group holding frame 107 is stopped after the second motor 121 is rotated at a constant speed. Accordingly, it is possible to reduce a moving inertia caused by a high speed movement of the rear group holding frame 107. Further, the rear group holding frame 107 is stopped in a state in which a feeding play toward the film face F between the rear group holding frame 107 and a rear group holding frame driving system having constructional elements 121 to 125 is removed. Therefore, it is possible to improve an accuracy in movement of the rear group holding frame 107 when the focal length f2 is realized.

When the desirable focal length of a user is f8 in the focusing region in the rear focusing system, the sequential control circuit 191 separately performs the control operations described in the above items (d) and (h). For example, the base frame 104 and the rear group holding frame 107 are respectively moved from the starting positions Z1f and Z1r at the zooming time to an optically designed position Z8f and a standby line position Z8r relative to the focal length f8. In this case, the base frame 104 and the rear group holding frame 107 may be moved from positions except for the starting positions at the zooming time. The base frame 104 and the rear group holding frame 107 are then stopped in the positions Z8f and Z8r, respectively.

As a result, the base frame 104 is stopped in the optically designed position on a moving line a at the time of the infinite photographing distance relative to the focal length f8. The rear group holding frame 107 is stopped in the standby line position on a standby line b' at this time.

In this case, a feeding play toward the photographing field between the base frame 104 and a base frame driving system having constructional elements 110 to 120 is removed while the base frame 104 and the rear group holding frame 107 are respectively moved from the starting positions at the zooming time to the optically designed position Z8f and the standby line position Z8r as target positions. At this time, a feeding play toward the photographing field between the rear group holding frame 107 and the rear group holding frame driving system having constructional elements 122 to 125 is also removed. Accordingly, it is possible to improve an accuracy in each of moving and stopping positions of the base frame 104 and the rear group holding frame 107 when the focal length f8 is realized.

The base frame 104 and the rear group holding frame 107 are respectively moved from positions relative to the second focal length f2 to each of optically designed positions Z3f to Z10f and each of standby line positions Z3r and Z10r relative to the focal lengths f3 to f10 within the focusing region in the rear focusing system. Otherwise, a focal length in the focusing region in the rear focusing system is changed by moving the lens groups from the wide angle wide to the telescopic side. In such a case, the base frame 104 and the rear group holding frame 107 are respectively moved to an optically designed position and a standby line position relative to a target focal length in accordance with the control method described in the above item (j). Then, the base frame 104 and the rear group holding frame 107 are respectively stopped in these positions.

At this time, a zooming/focusing operation is basically similar to the above-mentioned operation. Therefore, for brevity, a detailed explanation about the zooming/focusing operation is omitted in the following description.

[VI] Zooming operation (2).

Figure 28:
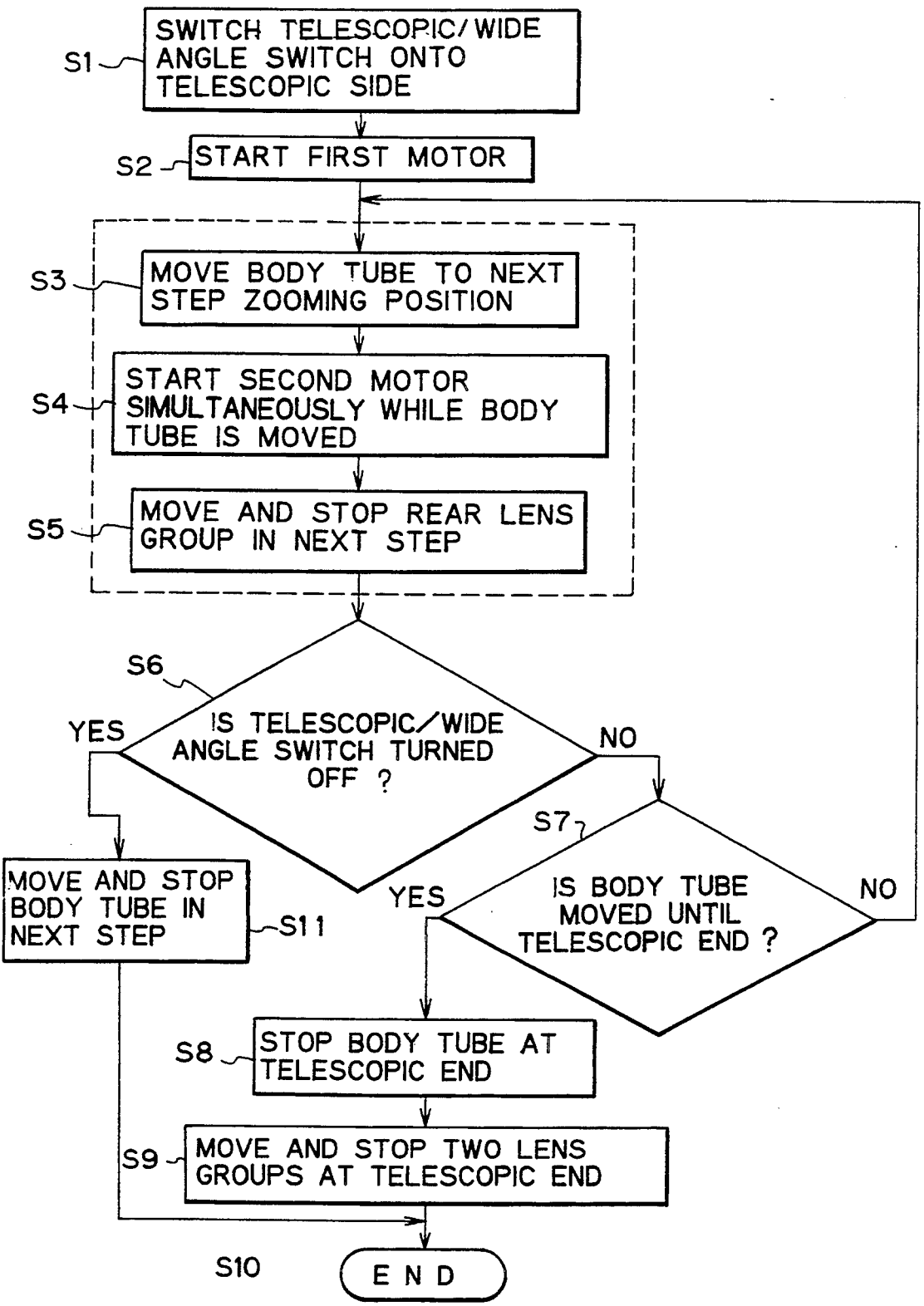
FIG. 28 is a flow chart for explaining a zooming operation of the varifocal lens in the second embodiment.

A zooming operation of the varifocal lens from the telescopic side to the wide angle side will next be described with reference to FIGS. 20, 21 and 28.

As mentioned above, when a user sets a desirable focal length, the base frame 104 is moved until the desirable focal length is obtained while the user sees the visual field of the zoom finder 161.

In this case, the desirable focal length is not necessarily obtained by only moving the base frame 104 from the telescopic side to the wide angle side. In a certain case, after the base frame 104 is once moved to a position relative to a focal length f10 at the telescopic end of the varifocal lens, the desirable focal length is determined by returning the base frame 104 toward the film face F on the wide angle side. In another case, the desirable focal length is determined by returning the base frame 104 toward the film face F in an intermediate portion between the wide angle and telescopic sides without moving the base frame 104 to the position relative to the focal length f10 at the telescopic end.

At this time, in a certain case, in the moving/stopping control, the base frame 104 and the rear group holding frame 107 are moved from the telescopic side to the wide angle side within the focusing region in the simultaneous lens moving system. In another case, the base frame 104 and the rear group holding frame 107 are moved from positions in the focusing region in the rear focusing system to positions relative to the focal lengths f2 and f1 in the focusing region in the simultaneous lens moving system. Namely, in a certain case, the base frame 104 and the rear group holding frame 107 are finally stopped in optically designed positions relative to the focal length f2 or f1. In another case, the base frame 104 and the rear group holding frame 107 are moved from the telescopic side to the wide angle side within the focusing region in the rear focusing system.

In the former case, the sequential control circuit 191 executes a control operation in accordance with each of the above items (g) and (h).

Namely, the base frame 104 is moved by the operation of the sequential control circuit 191 until the first sliding contact piece 131 reaches a right-hand edge portion of the base frame control plate Pf2 or Pf1 as a target. The sequential control circuit 191 controls an operation of the first motor 110 such that the current supplying paths of the first motor 110 are shunted by using a turning-off signal (x) generated when the first sliding contact piece 131 is located outside this right-hand edge portion. Accordingly, the base frame 104 is stopped in the standby line position Z2f or Z1f relative to the focal length f1 or f2 as a target.

In contrast to this, the rear group holding frame 107 is moved by the operation of the sequential control circuit 191 until the second sliding contact piece 141 reaches a left-hand edge portion of the rear group holding frame control plate Pr2 or Pr1 as a target. The number of rotations of the second motor 121 begins to be counted by using a turning-on signal (o) generated when the second sliding contact piece 141 comes in contact with this left-hand edge portion. The current supplying paths of the second motor 121 are shunted by the operation of the sequential control circuit 191 using two electric signals (·) and (x) generated subsequently. Accordingly, the rear group holding frame 107 is stopped in the optically designed position Z2r or Z1r relative to the target focal length f1 or f2 at the time of the infinite photographing distance.

As a result, the base frame 104 and the rear group holding frame 107 are moved to positions relative to the target focal length and are stopped in these positions.

In contrast to this, in the latter case, the sequential control circuit 191 executes a control operation in accordance with each of the above items (l) and (m).

Namely, the base frame 104 is moved by the operation of the sequential control circuit 191 until the first sliding contact piece 131 reaches a right-hand edge portion of one of base frame control plates Pf9 to Pf3 as a target. A moving direction of the base frame 104 is reversed by using a turning-off signal (∇) generated when the first sliding contact piece 131 is located outside this right-hand edge portion.

Thereafter, the number of rotations of the first motor 110 begins to be counted by using a turning-on signal (o) generated when the base frame 104 again comes in contact with the above right-hand edge portion. The current supplying paths of the first motor 110 are shunted by using two electric signals (·) and (x) generated subsequently. Thus, the base frame 104 is stopped in one of optically designed positions Z9f to Z3f relative to target focal lengths f9 to f3 at the time of the infinite photographing distance.

The rear group holding frame 107 is moved without changing a moving direction thereof until the second sliding contact piece 141 exceeds one of rear group holding frame control plates Pr9 to Pr3 as a target and comes in contact with a left-hand edge portion of a rear group holding frame control plate arranged on a right-hand or upper side of this exceeding control plate. The moving direction of the rear group holding frame 107 is then reversed by using a turning-on signal (∇) generated when the second sliding contact piece 141 comes in contact with this left-hand edge portion.

Thereafter, the current supplying paths of the second motor 121 are shunted by using a turning-off signal (x) generated when the second sliding contact piece 141 is located outside the left-hand edge portion of one of the rear group holding frame control plates Pr9 to Pr3 as a target of the rear group holding frame 107. Thus, the rear group holding frame 107 is stopped in one of standby line positions Z9r to Z3r relative to the target focal lengths f9 to f3.

As a result, the base frame 104 and the rear group holding frame 107 are moved to positions relative to a target focal length and are respectively stopped in these positions.

[VII] Focusing operation.

After the desirable focal length is obtained as mentioned above, a focusing operation of the varifocal lens is performed at this focal length.

In this ease, the focusing operation is automatically performed on the basis of photographing distance information from the AF distance measuring circuit 163 in any one of the focusing regions in the simultaneous lens moving system and the rear focusing system.

Figure 29:
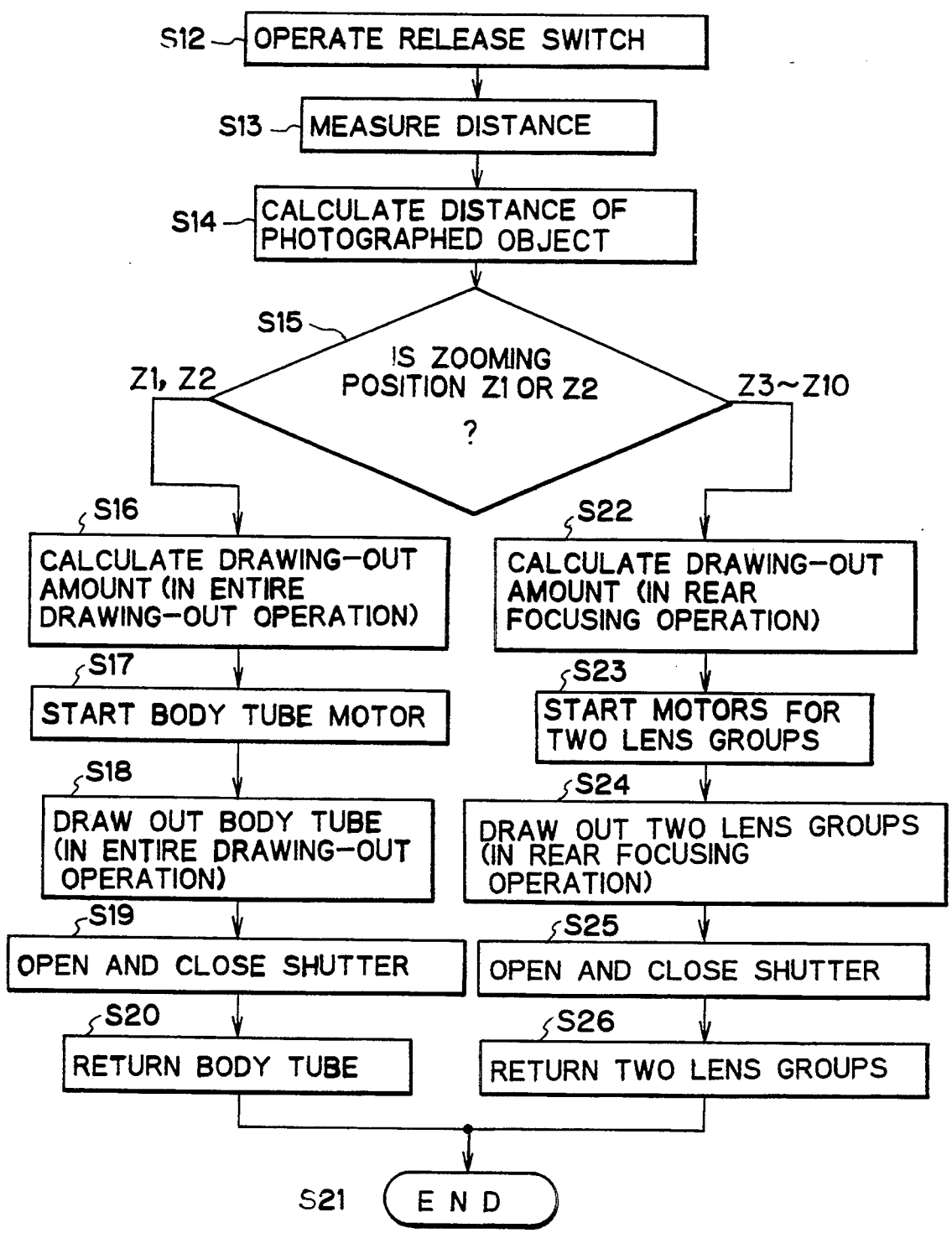
FIG. 29 is a flow chart for explaining a focusing operation of the varifocal lens at each of focal lengths f1 to f10.

Namely, as shown in FIG. 29, when an unillustrated shutter release operating member is operated to take a photograph, an unillustrated release switch is closed in association with this operating member in a step S12. Thus, in a step S13, the AF distance measuring circuit 163 begins to be operated and detects a photographing distance at this time. In a step S14, the AF distance measuring circuit 163 outputs photographing distance information corresponding to this photographing distance to the photographed object distance arithmetic circuit 164.

In a step S16, the photographed object distance arithmetic circuit 164 calculates a focusing amount suitable for a focal length at this time on the basis of the inputted photographing distance information. Further, this focusing amount is reduced to the number of rotations of the first motor 110 or the second motor 121. The reduced number of rotations of the first or second motor is outputted to the sequential control circuit 191. The sequential control circuit 191 executes the control method described in the above item (j) or (n) on the basis of this reduced number.

In this case, for example, when the desirable focal length is a focal length such as a second short focal length f2 in the focusing region in the simultaneous lens moving system, the sequential control circuit 191 executes the control method described in the above item (j) in accordance with a shutter releasing operation.

However, in a focusing operation of the simultaneous lens moving system, the base frame 104 and the rear group holding frame 107 are integrally moved in a state in which a lens group distance required to realize the focal length f2 is held. Accordingly, the sequential control circuit 191 controls only the operation of the base frame 104.

Namely, when a turning-on signal of the release switch is inputted from the switching unit 193 to the sequential control circuit 191, commands for rotating the first motor 110 by a rotational number corresponding to the focusing amount at this time are transmitted from the sequential control circuit 191 to the lens frame moving motor driving circuit 182 through the motor control circuit 183.

Therefore, the first motor 110 is rotated in the normal direction. In a step S17, the base frame 104 is thus moved toward the photographing field from a standby line position Z2f relative to the focal length f2 in accordance with the moving operation described in the above item [I]. At this time, the rear group holding frame 107 is also moved together with the base frame 104 in a state in which a lens group distance G2 at the focal length f2 is held.

As shown in FIG. 22, when the base frame 104 is moved, the number of rotations of the first motor 110 begins to be counted by an operation of the first digital signal generating means having constructional elements 126 and 127 by using a turning-on signal (o) generated when the first sliding contact piece 131 comes in contact with a right-hand edge portion of the base frame control plate Pf2 relative to the focal length f2.

The first motor 110 is rotated at a constant speed at a time point (·) at which a predetermined rotational number of the first motor 110 is obtained. Thereafter, the number of rotations of the first motor 110 having the constant rotational speed is again counted. The current supplying paths of the first motor 110 are shunted at a time point (x) at which a rotational number of the first motor 110 having the constant rotational speed is in conformity with a reduced rotational number about the focusing amount.

Accordingly, the focusing operation of the simultaneous lens moving system at the focal length f2 is completely performed in a step S18.

When the desirable focal length is a focal length f8 in the focusing region in the rear focusing system, the sequential control circuit 191 executes the control method described in the above item (n).

In this case, a focusing operation of the rear focusing system is performed such that the base frame 104 is stopped in an optically designed position at the time of an infinite photographing distance relative to the focal length f8 and only the rear group holding frame 107 is moved. Accordingly, the sequential control circuit 191 controls only the operation of the rear group holding frame 107.

Namely, when a turning-on signal of the release switch is inputted to the sequential control circuit 191, commands for rotating the second motor 121 by a rotational number corresponding to a focusing amount at this time calculated by the photographed object distance arithmetic circuit 164 are transmitted from the sequential control circuit 191 to the lens frame moving motor driving circuit 182 through the motor control circuit 183 in a step S22.

Therefore, the second motor 121 is rotated in the normal direction. In a step S23, the rear group holding frame 107 is moved toward the film face F from a standby line position Z8r relative to the focal length f8 in accordance with the moving operation described in the above item [II].

As shown in FIG. 23, when the rear group holding frame 107 is moved, the number of rotations of the second motor 121 begins to be counted by an operation of the second digital signal generating means having constructional elements 128 and 129 by using a turning-on signal (o) generated when the second sliding contact piece 141 comes in contact with a left-hand edge portion of a rear group holding frame control plate Pr8 relative to the focal length f8.

The second motor 121 is rotated at a constant speed at a time point (·) at which a predetermined rotational number of the second motor 121 is obtained. Thereafter, the number of rotations of the second motor 121 having the constant rotational speed is again counted. The current supplying paths of the second motor 121 are shunted at a time point (x) at which a rotational number of the second motor 121 having the constant rotational speed is in conformity with a reduced rotational number about the focusing amount.

Accordingly, the rear group holding frame 107 is exactly stopped in a position advanced by a constant distance after the current supplying paths of the second motor 121 are shunted. The focusing operation of the rear focusing system at the focal length f2 is completed in a step S24.

When this focusing operation is completed, the sequential control circuit 191 receives a completing signal or an operating signal at a second stroke of the shutter release operating member. The sequential control circuit 191 then transmits control commands for operating the diaphragm/shutter blade device 170 to the shutter motor 172 through the motor control circuit 183 and the shutter motor driving circuit 173.

Accordingly, in a step S19 or S25, the shutter motor 172 opens and closes the shutter blade member 171 in accordance with a prescribed operation on the basis of a suitable exposure signal from the suitable exposure arithmetic circuit 169, thereby realizing a suitable exposure.

When the exposure operation is completed, the blade position detecting means 174 confirms the completion of a closing operation of the shutter blade member 171. In a step S21, the blade position detecting means 174 then outputs an electric signal indicative of this completion to the sequential control circuit 191.

In this embodiment, the focusing operation and the predetermined exposure operation are completed, the base frame 104 and the rear group holding frame 107 can be automatically returned to standby positions relative to one of the focal lengths f1 to f10.

Namely, in this embodiment, when the confirming signal indicative of the completion of the closing operation of the shutter blade member 171 is outputted from the blade position detecting means 174 to the sequential control circuit 191 in accordance with the completion of the exposure operation, the sequential control circuit 191 rotates the first motor 110 and the second motor 121 in predetermined directions. Thus, the base frame 104 and the rear group holding frame 107 can be moved by the control operation of the sequential control circuit 191 to optically designed positions (Z1f to Z10f) or standby line positions (Z1r to Z10r) relative to a focal length at this time.

Accordingly, when the sequential control circuit 191 receives the confirming signal indicative of the completion of the above closing operation from the blade position detecting means 174, commands for returning the base frame 104 and the rear group holding frame 107 to respective positions before exposure are transmitted from the sequential control circuit 191 to the motor control circuit 183.

Thus, the motor control circuit 183 controls driving operations of the first motor 110 and the second motor 121 to return the base frame 104 and the rear group holding frame 107 to the respective positions before exposure.

Thereafter, it is possible to perform a photographing operation with respect to the next film frame. However, when it is desirable to complete the photographing operation, the base frame 104 and the rear group holding frame 107 are moved to respective storing positions by the following operation.

Namely, when a body tube shortening switch or a power switch is operated, a zooming operation of the varifocal lens is performed when the base frame 104 and the rear group holding frame 107 are moved to positions relative to a focal length f1 at the wide angle end of the varifocal lens. Thus, the base frame 104 and the rear group holding frame 107 are respectively moved to starting positions Z1f and Z1r at the zooming time. The control operations described in the above items (a) and (b) are next executed to move the base frame 104 and the rear group holding frame 107 to the respective storing positions.

In this embodiment, when a macroscopic photographing operation is performed, an arithmetic function of the suitable exposure arithmetic circuit 169 is extended in advance such that focusing amounts in the simultaneous lens moving system and the rear focusing system can be calculated until focusing values greater than the focusing amounts at a normal photographing time.

Further, moving distances of the base frame 104 and the rear group holding frame 107 in the body tube device 101 are set to be long so as to take a macroscopic photograph. Further, the sequential control circuit 191 is constructed such that control sequence of the sequential control circuit 191 can be changed to that for the macroscopic photograph from control sequence for a normal photograph. Further, mode changeover switches are disposed.

Further, control sequence for a stroboscopic photograph is additionally set when the stroboscopic photograph is taken.

As mentioned above, in the camera or the varifocal lens in the above second embodiment, it is desirable to increase a potential field angle of the varifocal lens of this kind at the wide angle end thereof as much as possible. It is also desirable to shorten the length of the body tube device as much as possible when the camera or the varifocal lens are not used. Further, it is desirable to improve an accuracy in stopping position of each of the front lens group $L_1$ and the rear lens group $L_2$ at the zooming and focusing times. To satisfy these requirements, the following coping means are used.

(o) The simultaneous lens moving system is used as a focusing system at the focal length f1 at the wide angle end of the varifocal lens. The rear group holding frame is set to be moved toward the photographing field at the focusing time after the focal length f1 at the wide angle end is set.

Thus, the rear group holding frame is set to be located in a position closest to the film face F when the focal length f1 is realized. Thus, the rear group holding frame approaches the film face F as much as possible so that the field angle at the wide angle end is increased as much as possible.

(p) A lens group moving mechanism has the base frame and a storing position ZHr of the rear group holding frame is set to a position near a side of the photographing field within the base frame 104. At a shortening time of the length of the body tube device, the rear group holding frame 107 is moved to this storing position from a position provided at a setting time of the focal length. Thus, no rear portion of the rear group holding frame is projected toward the film face F from a rear end portion of the base frame 104 at the shortening time of the length of the body tube device.

Accordingly, a space for storing the base frame and required to shorten the length of the body tube device is formed in a front portion of the film face F. The storing position ZHf of the base frame is set in a position most proximate to the film face F within this space. Further, the length of the body tube device is shortened when the camera or the varifocal lens is not used.

(q) The base frame 104 and the rear group holding frame 107 are moved to optically designed positions at the time of an infinite photographing distance at a plurality of focal lengths such as f1 to f10 set in stages. Moving operations of the base frame 104 and the rear group holding frame 107 at this time are set to be continuously integrated with those at a focusing time. Thus, the moving operations of the base frame 104 and the rear group holding frame 107 are controlled by a common method when these frames are moved and stopped in respective target positions.

Accordingly, the varifocal lens is designed such that it is possible to remove a mechanical feeding play tending to be caused between each of the frames 104, 107 and a driving system thereof. Further, the varifocal lens is constructed such that it is possible to improve an accuracy in stopping position of each of the base frame 104 and the rear group holding frame 107 with respect to a target position. Thus, the above basic three requirements can be satisfied by a relatively simple structure.

In particular, moving and stopping operations of the front lens group $L_1$ and the rear lens group $L_2$ are controlled by using an electric position detecting means operated with relatively high accuracy and rotational numbers of the driving motors. Accordingly, the camera or the varifocal lens using the present invention is very advantageous in manufacturing technique and cost in comparison with the general camera or varifocal lens in which an accuracy in operation is improved by a mechanical processing method.

Further, an operation for setting a desirable focal length of the varifocal lens is controlled by a plurality of divided steps. Therefore, calculating and memory means required to control this setting operation are simplified in structure and a memory capacity of the memory means is reduced. Thus, a zooming control operation is rapidly performed and cost of the camera or the varifocal lens is reduced.

The present invention is not limited to the above embodiment, but can be changed in various kinds of modifications in the scope of the features of the invention.

For example, it is possible to increase or decrease the number of focal lengths set in stages in accordance with necessity.

Further, it is possible to separately dispose a conductive pattern for detecting an optically designed position or a standby line position for realizing a focal length and a conductive pattern used at the focusing time.

As mentioned above, in a driving device of a varifocal lens having a two-lens group structure in accordance with a second structure of the present invention, a lens group moving mechanism having a base frame is used to make the varifocal lens compact. Focusing control based on the simultaneous lens moving system is used in a zooming region on the side of a short focal length such that a rear lens group can approach a film face as much as possible. Further, focusing control based on the rear focusing system is used in the remaining zooming region having a high frequency in use and providing a sufficient distance between the rear lens group and the film face. It is advantageous to reduce a length of the varifocal lens in the direction of an optical axis in this remaining zooming region when the varifocal lens is used. Accordingly, it is possible to enlarge an area for the zooming region on the side of a shorter focal length and reduce a most proximate distance in comparison with that in the general varifocal lens. Further, it is possible to reduce the length of a body tube device in the direction of the optical axis when the body tube device is used and is not used.

Further, an operation for setting a desirable focal length of the varifocal lens is controlled by a plurality of divided steps. Therefore, calculating and memory means required to control this setting operation are simplified in structure and a memory capacity of the memory means is reduced. Thus, a zooming control operation is rapidly performed and cost of the camera or the varifocal lens is reduced.

Further, when zooming steps are changed and set, one of the base frame and the rear group holding frame is located in a preset standby position. In a focusing operation, one of the base frame and the rear group holding frame is moved from this standby position in one unified direction. Accordingly, it is possible to provide a driving device of a varifocal lens having a two-lens group structure in which the play of a lens driving system is removed and lens groups can be moved and stopped with high accuracy at the zooming and focusing times.

In accordance with a third structure of the present invention, it is possible to provide a driving device of a varifocal lens having a two-lens group structure in which the length of the body tube device in the direction of the optical axis is reduced as much as possible at a storing time thereof.

Further, in accordance with fourth and fifth structures of the present invention, it is possible to provide a driving device of a varifocal lens for improving an accuracy in stoppage of each of the base frame and the rear group holding frame with respect to a target position, and removing the feeding play of a driving transmission system.

Many widely different embodiments of the present invention may be constructed without departing from the spirit and scope of the present invention. It should be understood that the present invention is not limited to the specific embodiments described in the specification, except as defined in the appended claims.

What is claimed is:

1. A driving device of a varifocal lens having a two-lens group structure for changing a focal length of the varifocal lens by displacing each of a front lens group and a rear lens group constituting a zooming optical system along a photographing optical axis, said driving device comprising:

a base frame for fixedly holding the front lens group in a front portion thereof;

the base frame being movable forward and backward along the photographing optical axis with respect to a body tube section; and a rear group holding frame for holding the rear lens group and arranged in a rear portion of said base frame such that the rear group holding frame is moved forward and backward along the photographing optical axis with respect to said base frame;

the driving device being constructed such that said base frame is moved in accordance with a moving line at a zooming time of the front lens group, and said rear group holding frame is moved in accordance with a moving line at a zooming time of the rear lens group in an entire zooming region when said varifocal lens is in a zooming control state;

the driving device being constructed such that, when said varifocal lens is in a focusing control state, said base frame is moved toward a photographing field from a standby position by an amount required to perform a focusing operation at this time in a state in which a relative axial distance between the front and rear lens groups is constantly held in plural zooming steps set on the side of a short focal length in a portion of the entire zooming region; and the driving device being constructed such that only the rear group holding frame is moved from a standby position toward a film face by an amount required to perform the focusing operation in a state in which said base frame is stopped in a position provided at a completing time of zooming operation in other plural zooming steps set in the remaining portion of the entire zooming region.

2. A driving device of a varifocal lens having a two-lens group structure as claimed in claim 1, wherein, when an operating state of the varifocal lens is switched from a using state to an unusing state, the length of a body tube in the varifocal lens can be shortened by moving the base frame onto a side of the film face together with said rear group holding frame after the rear group holding frame is moved to a position near a side of the photographing field within the base frame.

3. A driving device of a varifocal lens having a two-lens group structure as claimed in claim 1, wherein, in said plural zooming steps on the side of the short focal length after an arbitrary photographing frame is photographed, the base frame is moved to a standby position near a film face side close to the zooming steps on the side of the short focal length at a previous photographing time, and the rear group holding frame is moved to an infinite distance position in the zooming steps on the side of the short focal length at the previous photographing time when the next photographing frame is photographed.

4. A driving device of a varifocal lens having a two-lens group structure as claimed in claim 1, wherein, in said other plural zooming steps after an arbitrary photographing frame is photographed, the base frame is stopped in an infinite distance position in said other zooming steps at a previous photographing time, and only the rear group holding frame is moved to a standby position near a photographing field side close to the other zooming steps at the previous photographing time when the next photographing frame is photographed.

* * * * *